United States Patent
SerVaas et al.

(10) Patent No.: US 8,888,921 B2
(45) Date of Patent: Nov. 18, 2014

(54) CATALYTIC CONVERTER, A KIT FOR SERVICING A CATALYTIC CONVERTER, AND METHODS FOR SERVICING A CATALYTIC CONVERTER

(71) Applicant: SerVaas Laboratories, Inc., Indianapolis, IN (US)

(72) Inventors: Paul R. SerVaas, Indianapolis, IN (US); Ryan S. Miller, Indianapolis, IN (US)

(73) Assignee: SerVaas Laboratories, Inc., Indianapolis, IN (US)

(*) Notice: Subject to any disclaimer, the term of this patent is extended or adjusted under 35 U.S.C. 154(b) by 0 days.

(21) Appl. No.: 13/957,961

(22) Filed: Aug. 2, 2013

(65) Prior Publication Data

US 2014/0030159 A1 Jan. 30, 2014

Related U.S. Application Data

(63) Continuation-in-part of application No. PCT/US2013/052321, filed on Jul. 26, 2013, which is a continuation of application No. 13/560,667, filed on Jul. 27, 2012.

(51) Int. Cl.
- *B08B 9/00* (2006.01)
- *F01N 3/28* (2006.01)
- *F01N 3/10* (2006.01)

(52) U.S. Cl.
CPC .............. *F01N 3/2882* (2013.01); *F01N 3/10* (2013.01); *F01N 3/28* (2013.01); *F01N 2260/04* (2013.01); *F01N 2450/00* (2013.01)
USPC ...... 134/21; 134/22.1; 134/22.12; 134/22.18; 134/42; 502/20

(58) Field of Classification Search
USPC .......... 134/21, 22.1, 22.12, 22.18, 42; 502/20
See application file for complete search history.

(56) References Cited

U.S. PATENT DOCUMENTS

| 5,232,513 A | 8/1993 | Suratt et al. |
|---|---|---|
| 6,843,813 B1 | 1/2005 | Collins |

(Continued)

FOREIGN PATENT DOCUMENTS

| JP | 2002224635 A | 8/2002 |
|---|---|---|
| JP | 2008007713 A | 1/2008 |
| WO | WO-2005049239 A1 | 6/2005 |

OTHER PUBLICATIONS

International Search Report and Written Opinion for PCT Application No. PCT/US2013/052321, dated Oct. 18, 2013.

(Continued)

*Primary Examiner* — Bibi Carrillo
(74) *Attorney, Agent, or Firm* — Honigman Miller Schwartz and Cohn LLP

(57) ABSTRACT

A method is disclosed. The method comprises the steps of preparing a serviceable catalytic converter such that a catalyst substrate of the catalytic converter is serviceable while the catalytic converter remains connected to an exhaust system by forming a lower surface of the body of the catalytic converter with an absence of material in order to provide at least one opening in the lower surface of the body of the catalytic converter for permitting selective access to a fluid-flow passage that extends through the body of the catalytic converter that contains the catalyst substrate; and disposing at least one close-out member in the at least one opening for fluidly-sealing the at least one opening. A component of an exhaust system that is serviceable while remaining fluidly-connected and physically-connected to the exhaust system is also disclosed. A kit for servicing a component of an exhaust system that is serviceable while remaining fluidly-connected and physically-connected to the exhaust system is also disclosed.

35 Claims, 30 Drawing Sheets

(56) References Cited

U.S. PATENT DOCUMENTS

| | | | |
|---|---|---|---|
| 8,187,388 B2 * | 5/2012 | Blohm | 134/22.12 |
| 2007/0012342 A1 | 1/2007 | Stansilaw et al. | |
| 2007/0234710 A1 | 10/2007 | Franz | |
| 2009/0011968 A1 | 1/2009 | Hughett | |
| 2010/0086446 A1 * | 4/2010 | Matsunaga et al. | 422/106 |
| 2010/0254862 A1 * | 10/2010 | Sato et al. | 422/171 |
| 2011/0005208 A1 | 1/2011 | Hamill | |
| 2011/0015056 A1 * | 1/2011 | Cooper | 502/27 |
| 2012/0036837 A1 * | 2/2012 | Hodgson et al. | 60/281 |
| 2013/0028792 A1 * | 1/2013 | Yano et al. | 422/107 |
| 2014/0030159 A1 * | 1/2014 | SerVaas et al. | 422/178 |

OTHER PUBLICATIONS

Catalytic Converter, [online], © AA1Car, undated, [retrieved Feb. 19, 2010]. Retrieved from the internet: http://www.aa1car.com/library/converter.htm (5 pages).

Partial Regeneration of an Aged Commercial Automotive Catalyst, Applied Catalysis B: Environmental 12 (1997) pp. 193-206.

* cited by examiner

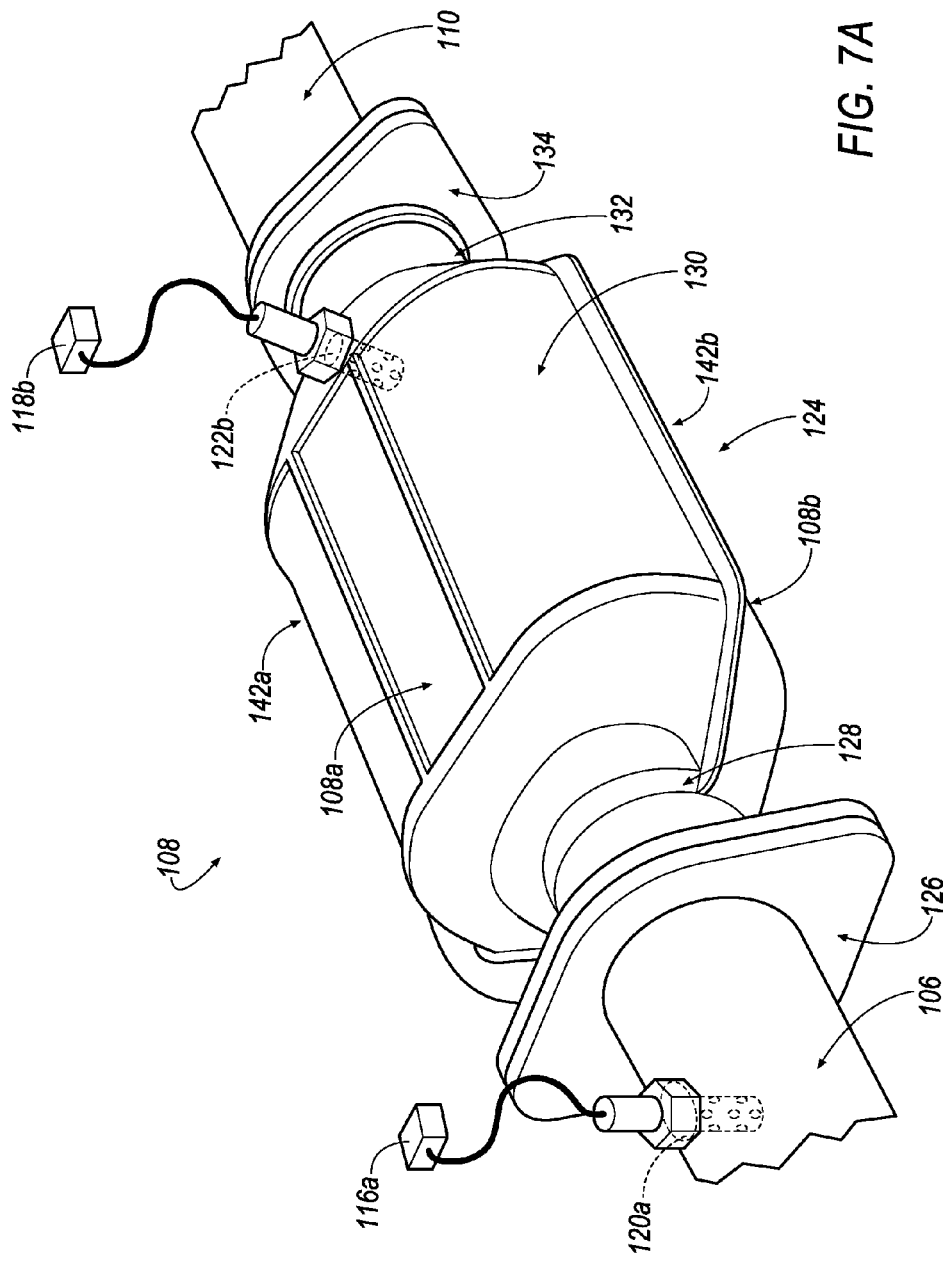

CATALYTIC CONVERTER, A KIT FOR SERVICING A CATALYTIC CONVERTER, AND METHODS FOR SERVICING A CATALYTIC CONVERTER

CROSS-REFERENCE TO RELATED APPLICATIONS

This U.S. patent application is a continuation of, and claims priority under 35 U.S.C. §120 and 365(c) from PCT Patent Application PCT/US2013/052321 filed on Jul. 26, 2013, which is a continuation-in-part of and claims priority to U.S. Non-Provisional application Ser. No. 13/560,667 filed on Jul. 27, 2012, the disclosure of which is considered part of the disclosure of this application and is hereby incorporated by reference in its entirety.

FIELD OF THE INVENTION

The present invention relates to a catalytic converter, a kit for servicing a catalytic converter and methods for servicing a catalytic convert.

DESCRIPTION OF THE RELATED ART

One or more components of a vehicle may be serviced over the life of the vehicle. Costs associated with the vehicle servicing process are typically related to parts and labor. Accordingly, there is a need in the art to improve efficiencies of the vehicle servicing process that will also reduce costs.

SUMMARY

One aspect of the disclosure provides a method. The method includes the steps of preparing a serviceable catalytic converter such that a catalyst substrate of the catalytic converter is serviceable while the catalytic converter remains connected to an exhaust system by: forming a lower surface of the body of the catalytic converter with an absence of material in order to provide at least one opening in the lower surface of the body of the catalytic converter for: permitting selective access to a fluid-flow passage that extends through the body of the catalytic converter that contains the catalyst substrate; and disposing at least one close-out member in the at least one opening for: fluidly-sealing the at least one opening.

In some examples, the forming step is conducted by: post-fabricating the at least one opening in the lower surface of the body of the catalytic converter in an after-market modification to the catalytic converter.

In some implementations, the post-fabricating step is conducted by: utilizing a drill for drilling the at least one opening in the lower surface of the body of the catalytic converter.

In some instances, the forming step is conducted by: pre-fabricating the at least one opening in the lower surface of the body of the catalytic converter by a supplier or original equipment manufacturer.

In some example, the pre-fabricating step is conducted by drilling, welding, casting, molding or stamping the at least one opening in the lower surface of the body of the catalytic converter.

Another aspect of the disclosure provides a method. The method includes the steps of servicing a catalytic converter while the catalytic converter remains connected to an exhaust system by: forming at least one opening in a lower surface of a body of the catalytic converter for permitting access to a fluid-flow passage that extends through the body of the catalytic converter that contains a catalyst substrate; inserting a cleaning instrument into the at least one opening formed in the lower surface of the body of the catalytic converter; directing a cleaning solution from the cleaning instrument toward the catalyst substrate such that the cleaning solution removes contaminates from the catalyst substrate; and disposing at least one close-out member in the at least one opening formed in the lower surface of the body of the catalytic converter for: fluidly-sealing the at least one opening.

In some examples, after the directing step and prior to the disposing step, the method further includes the steps of: removing the cleaning instrument from the at least one opening formed in the lower surface of the body of the catalytic converter; inserting a flushing instrument into the at least one opening formed in the lower surface of the body of the catalytic converter; and directing a flushing medium from the flushing instrument toward the catalyst substrate such that the flushing medium removes the cleaning solution and the contaminates from the catalyst substrate.

In some implementations, after the directing step, the method further includes the step of: fluidly-connecting a vacuum source to exhaust system; and utilizing the vacuum source for drawing the cleaning solution and the contaminates from the catalyst substrate.

In some instances, after the directing step, the method further includes the step of: fluidly-connecting a discharge bucket to a distal end of the exhaust system; keying-on an engine of the vehicle for utilizing an exhaust gas produced by the engine for advancing the cleaning solution and the contaminates away from the catalyst substrate and further downstream through the exhaust system; and utilizing the discharge bucket for capturing the cleaning solution and the contaminates that are discharged from the exhaust system.

In some examples, the forming step, the inserting step and directing step includes: forming the at least one opening in the lower surface of the body of the catalytic converter upstream of a catalyst substrate; inserting the cleaning instrument into the at least one opening formed in the lower surface of the body of the catalytic converter; and directing the cleaning solution from the cleaning instrument toward the catalyst substrate such that the cleaning solution firstly enters an upstream surface of the catalyst substrate and secondly exits a downstream surface of the catalyst substrate.

In some implementations, the at least one opening includes a first opening and a second opening, wherein the forming step includes: forming the first opening in the lower surface of the body of the catalytic converter upstream of a catalyst substrate; and forming the second opening in the lower surface of the body of the catalytic converter downstream of a catalyst substrate.

In some instances, the inserting step and the directing step includes: inserting the cleaning instrument into the first opening formed in the lower surface of the body of the catalytic converter; and directing the cleaning solution from the cleaning instrument toward the catalyst substrate such that the cleaning solution firstly enters an upstream surface of the catalyst substrate and secondly exits a downstream surface of the catalyst substrate.

In some examples, the method includes the step of: arranging a discharge bucket under the second opening formed in the lower surface of the body of the catalytic converter in order to capture the cleaning solution and the contaminates that exit the downstream surface of the catalyst substrate.

In some implementations, the inserting step and the directing step includes: inserting the cleaning instrument into the second opening formed in the lower surface of the body of the catalytic converter; and directing the cleaning solution from the cleaning instrument toward the catalyst substrate such that the cleaning solution firstly enters a downstream surface of the catalyst substrate and secondly exits an upstream surface of the catalyst substrate.

In some instances, the method includes the step of: arranging a discharge bucket under the first opening formed in the lower surface of the body of the catalytic converter in order to capture the cleaning solution and the contaminates that exit the upstream surface of the catalyst substrate.

In some examples, the forming step includes: drilling the at least one opening in the lower surface of the body of the catalytic converter.

In some implementations, the method includes the steps of: inserting the cleaning instrument into the first opening formed in the lower surface of the body of the catalytic converter; and applying a vacuum to both of the second opening and an opening formed by a tailpipe of the exhaust system for removing the cleaning solution that firstly enters an upstream surface of the catalyst substrate and secondly exits a downstream surface of the catalyst substrate.

In some instances, the method further includes the steps of: inserting the cleaning instrument into the second opening formed in the lower surface of the body of the catalytic converter; inserting a fluid-flow plug into the opening formed by the tailpipe; and applying a vacuum to the first opening for removing the cleaning solution that firstly enters the downstream surface of the catalyst substrate and secondly exits the upstream surface of the catalyst substrate.

In some examples, the method includes the steps of: imparting pressurized air into the first opening formed in the lower surface of the body of the catalytic converter; and applying a vacuum to both of the second opening and the opening formed by the tailpipe of the exhaust system for removing the cleaning solution from the catalyst substrate and fluid-flow passage.

In yet another aspect of the disclosure provides a component of an exhaust system that is serviceable while remaining fluidly-connected and physically-connected to the exhaust system. The component of the exhaust system includes a catalytic converter having body, wherein the body forms a fluid-flow passage, wherein a catalyst substrate is disposed within the fluid-flow passage, wherein a lower surface of the body of the catalytic converter defines at least one opening that permits selective access to the catalyst substrate disposed within the fluid-flow passage; and at least one close-out member disposed within the at least one opening that fluidly-seals the at least one opening.

In some examples, the at least one opening is formed upstream of an upstream surface of the catalyst substrate.

In some implementations, the at least one opening includes a first opening and a second opening, wherein the first opening is formed upstream of an upstream surface of the catalyst substrate, wherein the second opening is formed downstream of a downstream surface of the catalyst substrate.

In some instances, the at least one close-out member is a swaging nut or a knurled threaded insert.

In some examples, the at least one opening formed in the lower surface of the body of the catalytic converter is post-fabricated in drilling process in an after-market modification to the catalytic converter.

In some implementations, the at least one opening formed in the lower surface of the body of the catalytic converter is pre-fabricated in a drilling process, a welding process, a casting process, a molding process or a stamping process by a supplier or original equipment manufacturer.

One aspect of the disclosure provides a kit for servicing a component of an exhaust system that is serviceable while remaining fluidly-connected and physically-connected to the exhaust system. The kit includes a first container including a neutralizing medium; and a second container including oxalic acid powder, wherein the oxalic acid powder is adapted to be mixed with water for forming a dilute acidic solution that is utilized for removing contaminates from a catalyst substrate of a catalytic converter, wherein the neutralizing medium is adapted to be mixed with the utilized dilute acidic solution after the dilute acidic solution is applied to the catalyst substrate of the catalytic converter such that the dilute acidic solution is neutralized prior to being disposed.

In some examples, the kit also includes at least one close-out member that is adapted to be disposed within at least one opening that is post-fabricated in a lower surface of a body of the catalytic converter for fluidly-sealing the at least one opening.

BRIEF DESCRIPTION OF THE DRAWINGS

The disclosure will now be described, by way of example, with reference to the accompanying drawings, in which:

FIG. 7A is an enlarged view of an exemplary catalytic converter according to line 7 of FIG. 6.

DETAILED DESCRIPTION OF THE INVENTION

Figure 1:
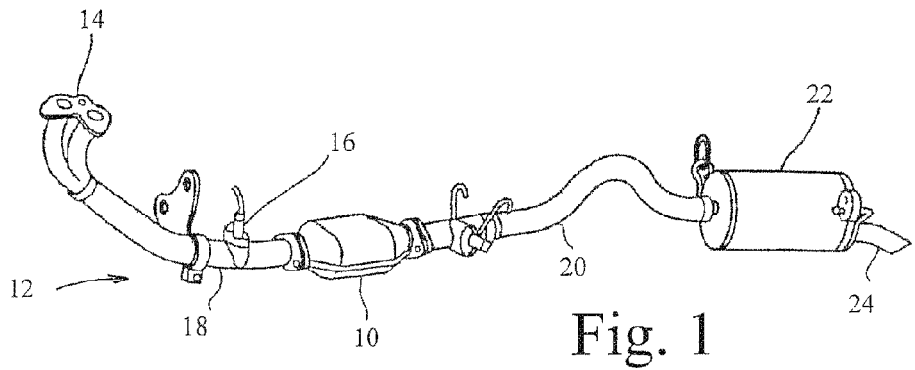
FIG. 1 is a perspective view of an exhaust system of a motor vehicle illustrating the oxygen sensor location which is used as an inlet for cleaning solution in one embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments and such further applications of the principles of the invention as illustrated therein being contemplated as would normally occur to one skilled in the art to which the invention relates.

Referring to FIG. 1, the present invention allows a catalytic converter 10 to be cleaned while installed on a vehicle, connected as shown in an exhaust system 12. In an embodiment, the exhaust system 12 includes an exhaust manifold 14 connected to an internal combustion engine (not shown), an oxygen sensor 16 in a first section 18 of an exhaust pipe between the exhaust manifold 14 and the catalytic converter 10, a second section 20 of the exhaust pipe between the catalytic converter 10 and a muffler 22, and a tailpipe 24. The oxygen sensor 16 is removably mounted, typically by a threaded connection, in a port upstream of the catalytic converter 10, and the oxygen sensor 16 is removed from the port to provide access through the open port to introduce a dilute acidic solution (not shown) into the exhaust pipe to clean the catalytic converter 10. One suitable acidic solution is made using oxalic acid, CAS No. 6153-56-6, which is commercially available from a number of sources, one being Indian Oxalate Limited, Mumbai, India. A concentration level of 5-10% is suitable although other concentrations are contemplated. Alternatively, other acids may be suitable in certain applications, including other organic acids, preferably weak organic acids such as acetic acid and citric acid. Sulphamic acid and phosphoric acid may also be suitable in certain applications.

Figure 2:
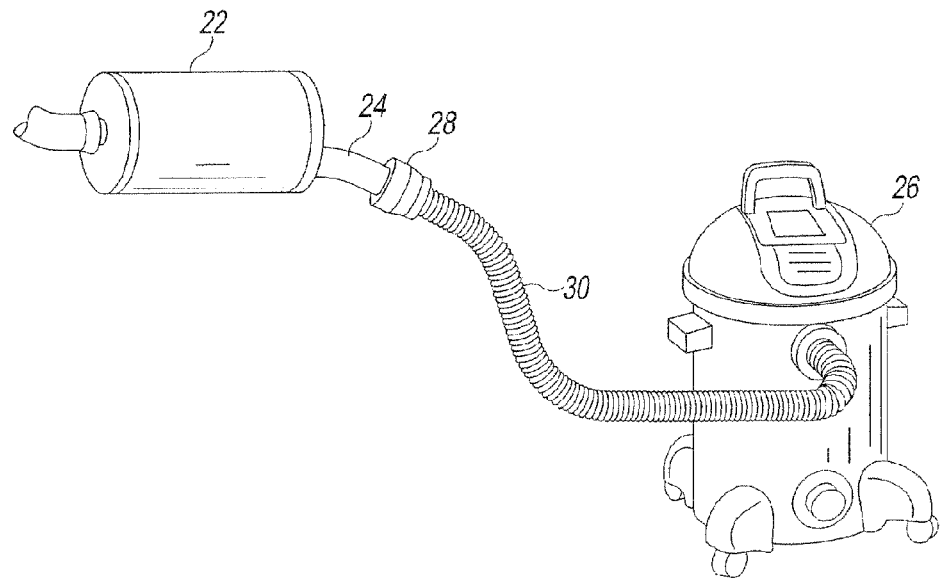
FIG. 2 depicts the tailpipe connection to the vacuum source in an embodiment of the cleaning method according to the present invention.

The acidic solution is preferably sprayed into the exhaust pipe through the oxygen sensor port, and, to facilitate the process, suction is preferably applied to the tailpipe 24 to draw air and acidic solution through the installed catalytic converter 10. As shown in FIG. 2, tailpipe 24 is preferably connected to a vacuum source 26, e.g., a SHOP-VAC®, with a stainless steel tank, via a snugly fitting heat-resistant connector 28 which may be a silicone rubber cup, thereby establishing a substantially airtight seal between the tailpipe 24 and a hose 30 extending from the tank of the vacuum source 26, which may be a clear hose, while thermally insulating the hose 30 from the tailpipe 24, which may be hot in cases where the service is performed immediately upon arrival of a vehicle. The cross-section of tailpipe connector 28 may be round or oval, for example, as appropriate for the shape of the tailpipe 24. Different size connectors 28 may be employed for different size tailpipes 24, or an adjustable exhaust hose connector 28 may be employed. In one embodiment, a spray wand 40 (see, e.g., FIG. 3) extends into the oxygen sensor port without a sealed connection, whereby the suction causes ambient air to be drawn, as make-up air, into the exhaust system 12 through the oxygen sensor port and thence through the installed catalytic converter 10. Alternatively, the oxygen sensor port—with the sensor removed—may be sealed with a nozzle 44 (see, e.g., FIG. 3) in place therein, such as with a rubber, metal or other stopper provided around the gooseneck 42 (see, e.g., FIG. 3) of the wand 40 proximal to the nozzle 44 and configured to sealingly engage the port, e.g., via a mating threaded connection whereby the stopper is screwed into the port after the nozzle 44 is placed therein.

Figure 3:
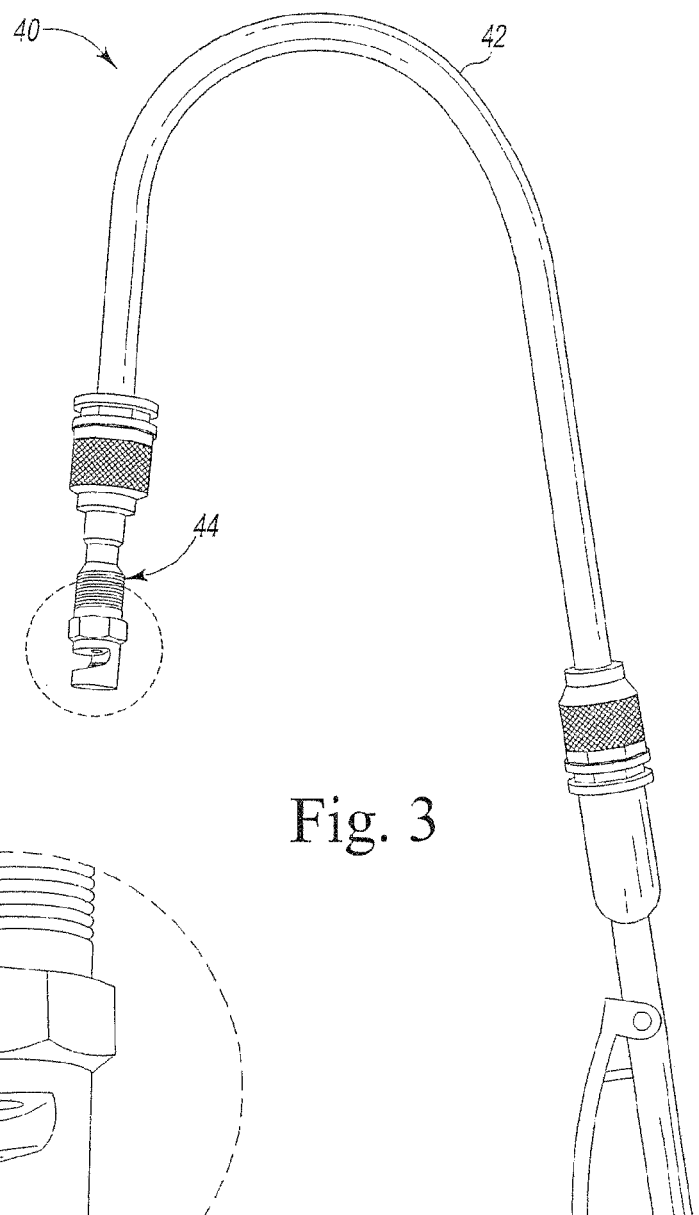
FIG. 3 is a side view of a wand for use in cleaning the catalytic converter of FIG. 1 without removing the catalytic converter from the vehicle.
Figure 4:
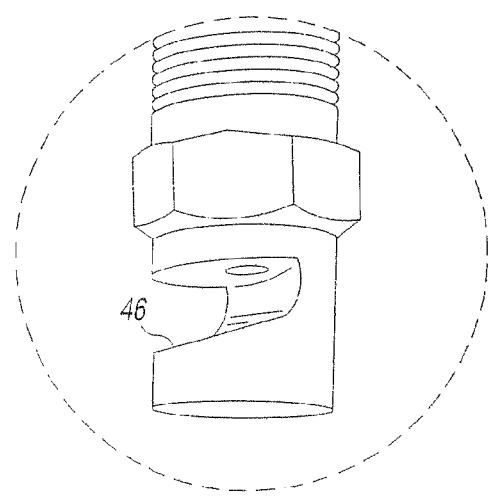
FIG. 4 is an enlarged view of the nozzle on the end of the wand of FIG. 2.

The acidic solution is preferably sprayed into the exhaust pipe through the oxygen sensor port using a spray wand 40 having a gooseneck 42 such as shown in FIG. 3. The spray wand 40 has a distal end nozzle 44 which is sized and shaped to fit into the open oxygen sensor port. The gooseneck wand 40 is particularly advantageous for use with a vehicle raised on a lift or parked over a pit as is customary for maintenance in a service garage. In such a case, the exhaust system 12 is over the head of a mechanic and the distal end of the wand 40 can be raised above the exhaust pipe adjacent the oxygen sensor port and hooked into the open oxygen sensor port from below. The wand 40 is held in place by the distal end extending into the oxygen sensor port. The nozzle 44 includes a right-angle spray deflector 46, shown in greater detail in FIG. 4, which is preferably rotatably mounted so as to allow it to swivel so that, in use, it is oriented so as to direct the acidic solution downstream into the catalytic converter 10. Thus, the same wand 40 may easily be used for the left-side and right-side exhausts of a dual exhaust system, and may be hung on an exhaust pipe from the left or right side, whichever is more accessible or convenient. For example, referring to the exhaust system of FIG. 1, threaded oxygen sensor 16 is unscrewed and removed from its port in exhaust pipe section 18, and the spray wand 40 may be hung on the exhaust pipe from the left side (foreground side of the drawing), in which case deflector 46 is rotated such that its open side is oriented toward the rear, i.e., downstream toward the catalytic converter 10.

Positive pressure is applied to force the acidic solution through the wand 40, preferably using a shop air source, e.g., an air line supplying regulated air pressure at 5-10 psi, for example, or using a manual pump, e.g., an insecticide sprayer such as Model 7044T42 from MCMASTER-CARR®. The spray nozzle 44, which may be a Model 30995K15 from MCMASTER-CARR®, preferably provides a fine mist, for which purpose an orifice size of 0.12" is suitable.

As an optional preliminary step which is useful for expediting the cleaning process, the catalytic converter 10 is flushed with a fluid, e.g., water or air, via the oxygen sensor port to cool the catalytic converter 10 prior to spraying acidic solution into it. For example, the wand 40 may be used to spray a water mist into the exhaust system 12; the wand 40 may be used alone, or in conjunction with the vacuum source 26 to draw the mist through the catalytic converter 10. With this preliminary step, a temperature sensor (not shown), e.g., a thermocouple or thermistor, is temporarily attached to an outer surface of the catalytic converter 10, and the flushing is performed until the temperature sensor indicates a predetermined temperature, e.g., 140° F. The temperature sensor may be held by hand against the catalytic converter 10, or, alternatively, may be attached to the catalytic converter 10 with a VELCRO® strap (not shown). One example of a suitable temperature sensor is Fluke 54 II B.

The cleaning method may be performed for a predetermined period of time deemed effective for cleaning a particular type of catalytic converter 10, or a longer time period considered generally suitable for any catalytic converter 10. Alternatively, the cleaning operation is monitored with a gas analyzer (not shown), e.g., a five-gas analyzer such as Bridge Model 9005. The analyzer is connected to the exhaust system 12, e.g., by inserting a sample probe (not shown) into the tailpipe 24, and the spraying step is performed until a predetermined exhaust gas level is reached, for example, a predetermined level of hydrocarbons (HC), carbon monoxide (CO), and/or oxides of nitrogen ($NO_x$).

Figure 5:
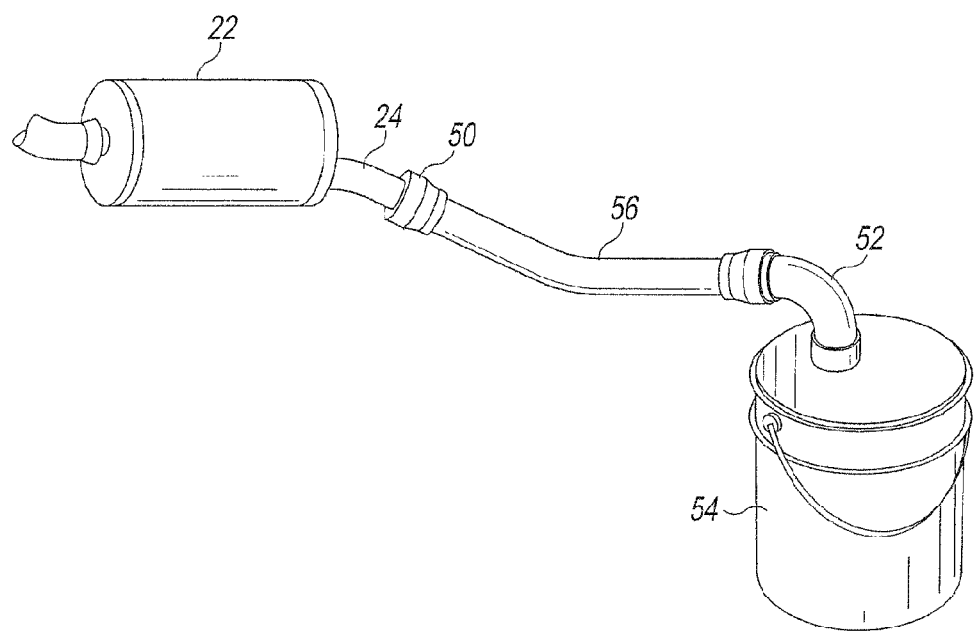
FIG. 5 depicts the tailpipe connection to a collection container used for collecting residual solution flushed from the exhaust system by running the engine after cleaning the catalytic converter.

Any residual acidic solution in the exhaust system 12 after the cleaning is discharged by running the engine (not shown), preferably well above idle speed. The engine acts as an air compressor at this time. Since the discharge is unsightly and acidic, it is preferably collected using a tailpipe connector 50 (see, e.g., FIG. 5) and a 90° PVC elbow 52 (see, e.g., FIG. 5) oriented so as to direct the residual acidic solution into a bucket 54 (see, e.g., FIG. 5) or other collection container. A section of an exhaust hose 56 (see, e.g., FIG. 5) is optionally used between the tailpipe connector 50 and elbow 52. The bucket 54 may be vented, preferably with a vent hole (not shown) in the cover, which preferably includes one or more clamps (not shown) to removably secure the cover to the main body of the bucket. The bucket 54 may be weighted, e.g., with internal weight (not shown) on the bottom of the bucket 54, to keep the bucket 54 upright during use.

The acidic solution used in the process is preferably all collected and neutralized prior to disposal, for example, by mixing it with baking soda (not shown) or soda ash (not shown) or the like. A predetermined amount of powder (not shown) for making the acidic solution to clean the catalytic converter 10 is preferably supplied in one can (not shown) or other container (not shown) as part of a kit (not shown) which also includes a second can (not shown) or other container (not shown) containing a corresponding amount of an alkaline powder (not shown) for neutralizing the acidic solution after use and prior to disposal. For example, the kit may contain a can (not shown) containing 12 oz. of oxalic acid (not shown) in powder form, and a can (not shown) containing 24 oz. of dense soda ash (not shown), e.g., CAS No. 497-19-8. The kit may be bundled, i.e., provided with two containers enclosed inside shrink film.

Figure 6:
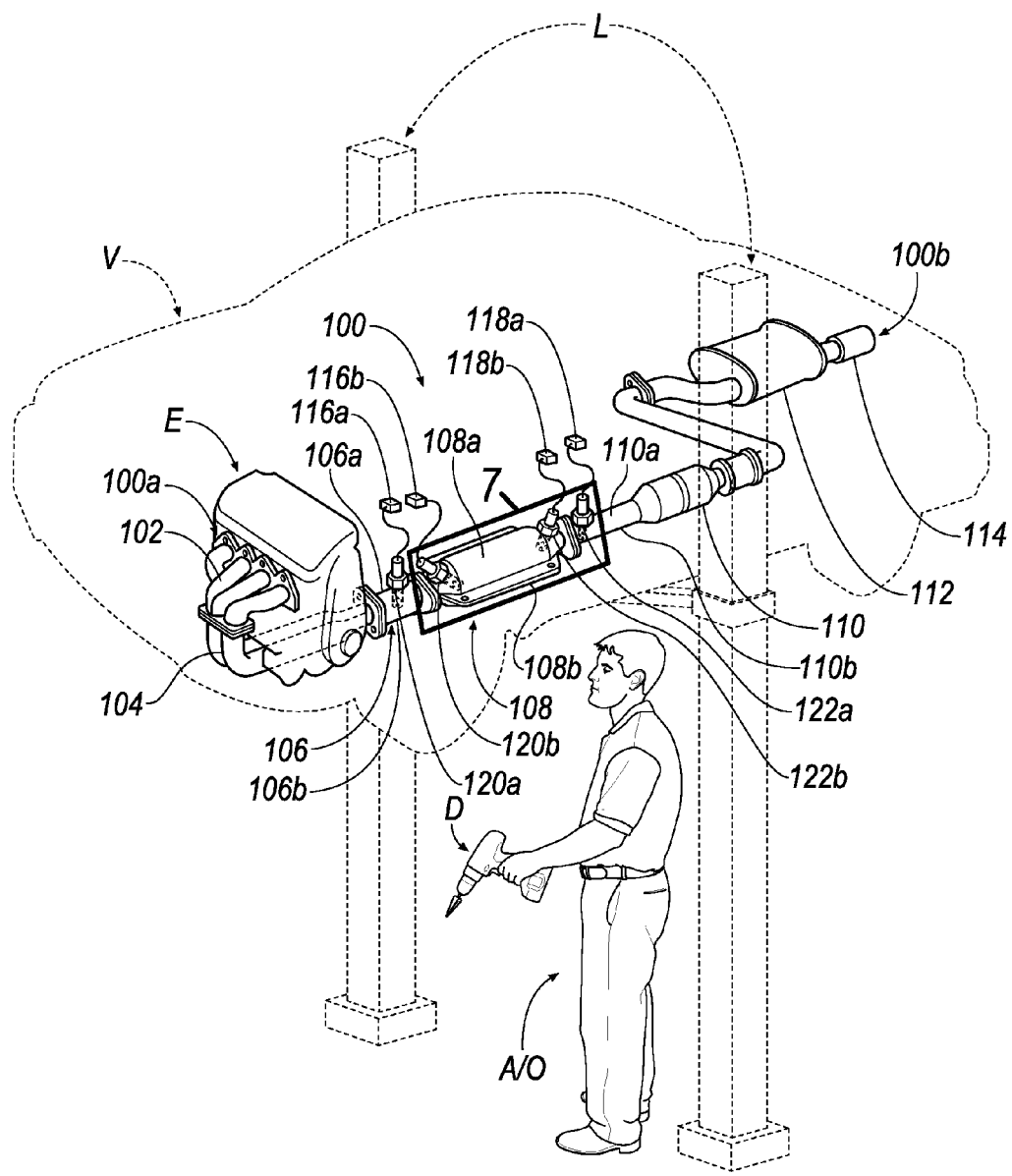
FIG. 6 is a perspective view of an exemplary exhaust system of a motor vehicle.

Referring to FIG. 6, an exhaust system 100 of a vehicle, V, is shown according to an embodiment. The exhaust system 100 includes a proximal, upstream end 100a and a distal, downstream end 100b. The proximal, upstream end 100a is connected to an engine, E. The exhaust system 100 includes a catalytic converter 108 arranged between the proximal, upstream end 100a and the distal, downstream end 100b of the exhaust system 100. As will be described in the following disclosure at, for example, FIGS. 8A-8H, 11A-11L and 12A-12J, the catalytic converter 108 may be serviced while the catalytic converter 108 remains connected to an exhaust system 100 of the vehicle V. In some implementations, the catalytic converter 108 may be serviced while the exhaust system 100 remains connected to the vehicle V. In other implementations, the catalytic converter 108 may be serviced while connected to the exhaust system 100 but also when the exhaust system 100 is disconnected from the vehicle V.

The proximal, upstream end 100a of the exhaust system 100 includes an exhaust manifold 102 that is fluidly-connected to the internal combustion engine, E. The exhaust system 100 may further include a first pipe portion 104 that is fluidly-connected to and is arranged downstream of the exhaust manifold 102; in some arrangements, the first pipe portion 104 may be referred to as 'Exhaust Pipe A.'

The exhaust system 100 may further include a second pipe portion 106 that is fluidly-connected to and is arranged downstream of the first pipe portion 104; in some arrangements, the second pipe portion 106 may be referred to as 'a mid-pipe.' The exhaust system 100 may further include a catalytic converter 108 that is fluidly-connected to and is arranged downstream of the second pipe portion 106.

The exhaust system 100 may further include a third pipe portion 110 that is fluidly-connected to and is arranged downstream of the catalytic converter 108; in some arrangements, the third pipe portion 110 may be referred to as 'Exhaust Pipe B.' The exhaust system 100 may further include a muffler 112 that is fluidly-connected to and is arranged downstream of the third pipe portion 110. The exhaust system 100 may further include a tailpipe 114 that is fluidly-connected to and is arranged downstream of the muffler 112.

The exhaust manifold 102 may generally define the proximal, upstream end 100a of the exhaust system 100. The tailpipe 114 may generally define the distal, downstream end 100b of the exhaust system 100.

The exhaust system 100 may also include one or more oxygen sensors, which are shown generally at 116a, 116b, 118a, 118b. Either of the oxygen sensors 116a, 116b may be generally referred to as a first, upstream oxygen sensor. Either of the oxygen sensors 118a, 118b may be generally referred to as a second, downstream oxygen sensor.

The mid-pipe 106 may include an upper surface 106a and a lower surface 106b. The upper surface 106a of the mid-pipe 106 may form a port 120a for supportably-receiving the first, upstream oxygen sensor 116a. Once the first, upstream oxygen sensor 116a is disposed within the port 120a, the first, upstream oxygen sensor 116a is in fluid communication with the exhaust system 100. The third pipe portion 110 may include an upper surface 110a and a lower surface 110b. The upper surface 110a of the third pipe portion 110 may form a port 122a for supportably-receiving the second, downstream oxygen sensor 118a. Once the second, downstream oxygen sensor 118a is disposed within the port 122a, the second, downstream oxygen sensor 118a is in fluid communication with the exhaust system 100.

The catalytic converter 108 may include an upper surface 108a and a lower surface 108b. The upper surface 108a of the catalytic converter 108 may form a port 120b for supportably-receiving the first, upstream oxygen sensor 116b. Once the first, upstream oxygen sensor 116b is disposed within the port 120b, the first, upstream oxygen sensor 116b is in fluid communication with the exhaust system 100. The upper surface 108a of the catalytic converter 108 may also form another port 122b for supportably-receiving the second, downstream oxygen sensor 118b. Once the second, downstream oxygen sensor 118b is disposed within the port 122b, the second, downstream oxygen sensor 118b is in fluid communication with the exhaust system 100.

Figure 7B:
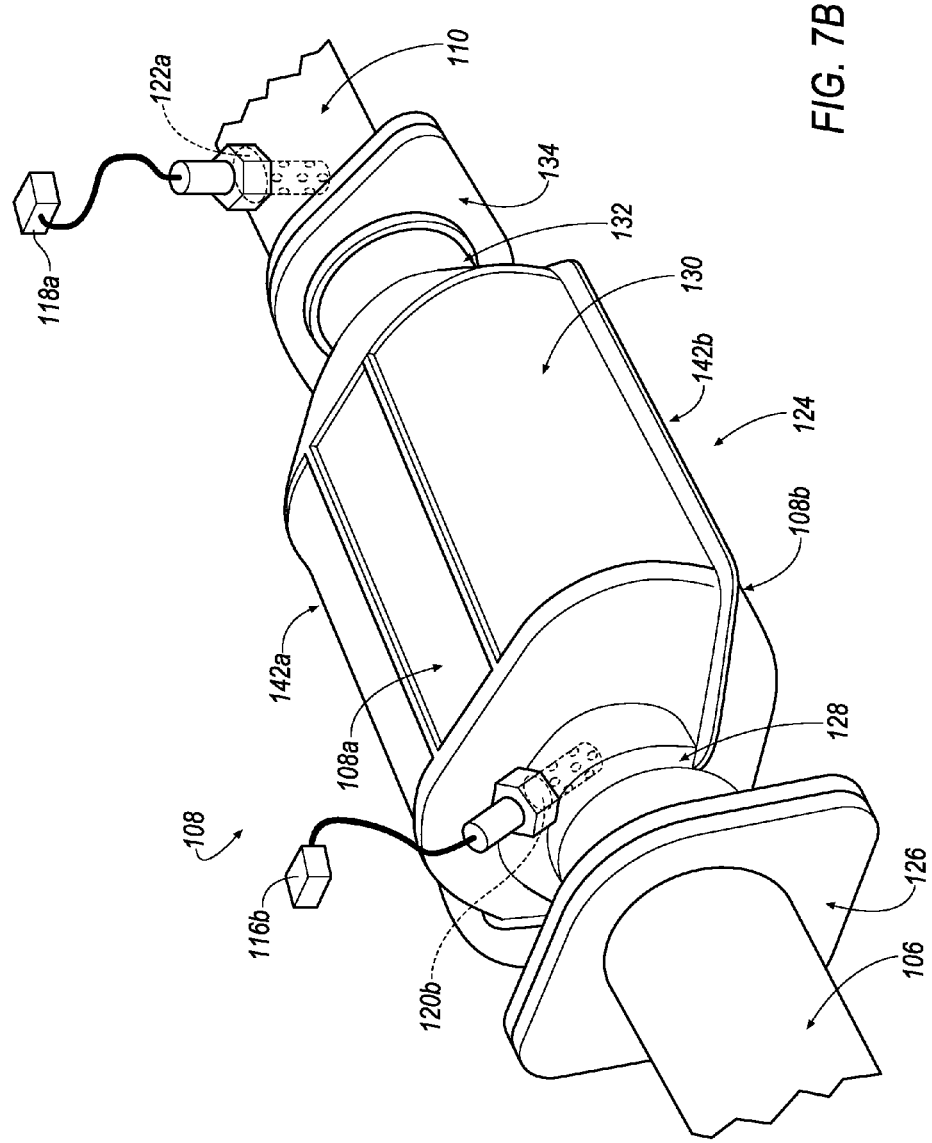
FIG. 7B is an enlarged view of an exemplary catalytic converter according to line 7 of FIG. 6.
Figure 7C:
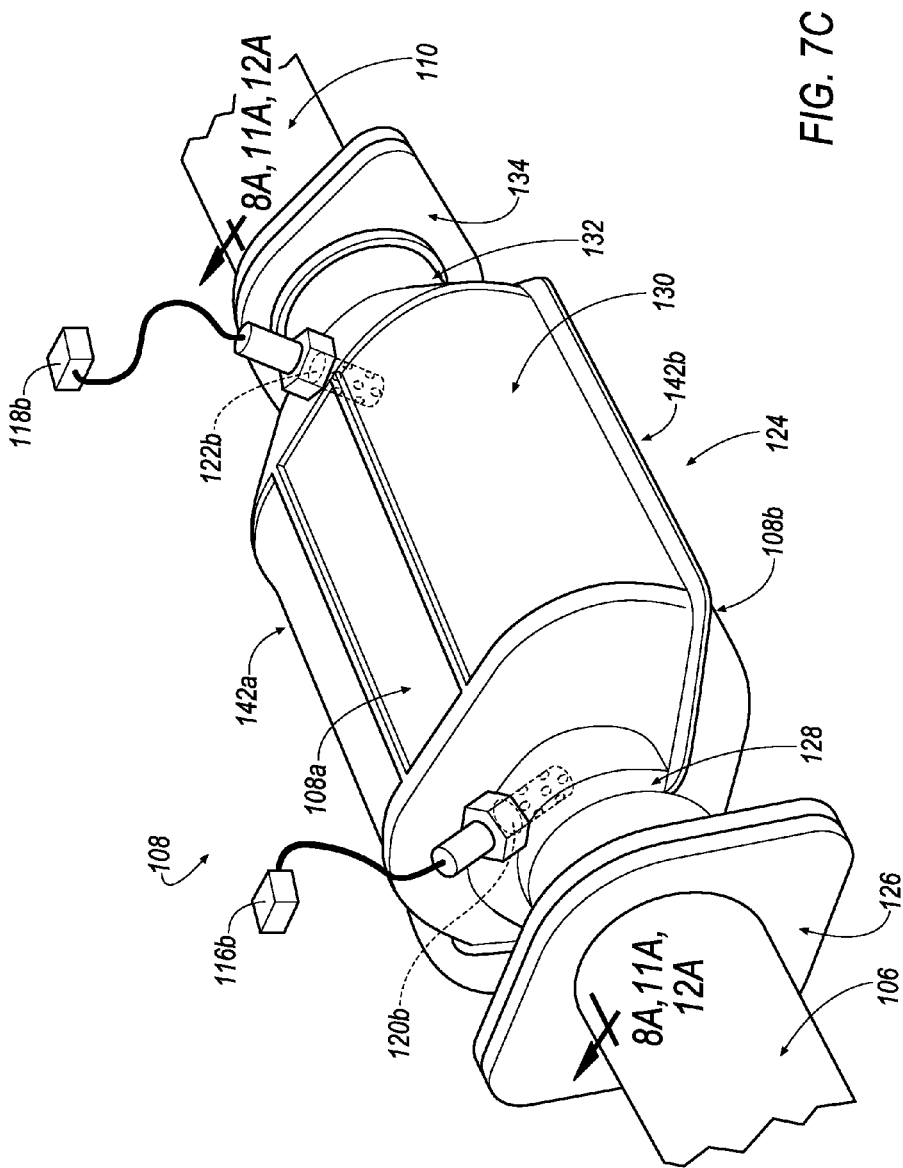
FIG. 7C is an enlarged view of an exemplary catalytic converter according to line 7 of FIG. 6.
Figure 7D:
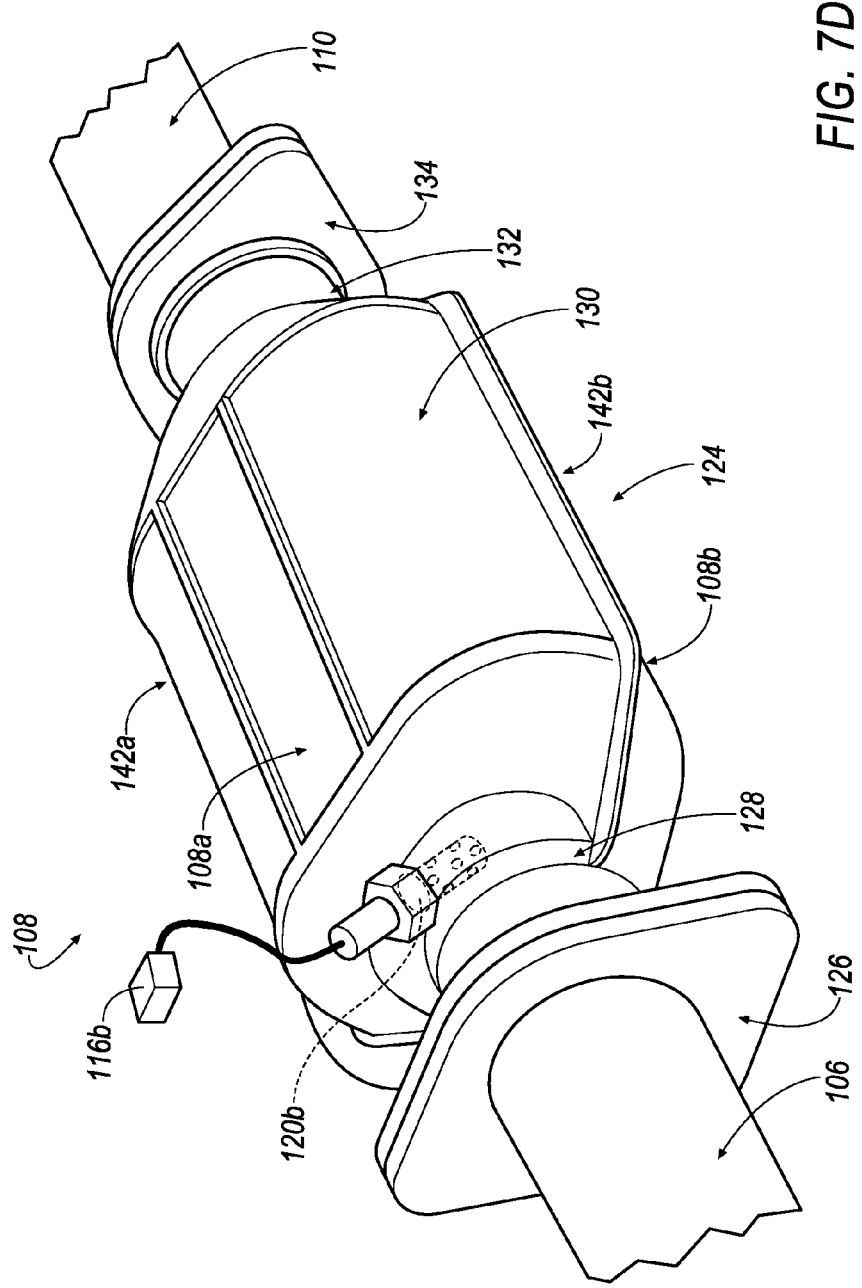
FIG. 7D is an enlarged view of an exemplary catalytic converter according to line 7 of FIG. 6.

Although four ports 120a, 120b, 122a, 122b and four oxygen sensors 116a, 116b, 118a, 118b are shown at FIG. 6, the four ports 120a, 120b, 122a, 122b and the four oxygen sensors 116a, 116b, 118a, 118b shown at FIG. 6 are exemplary locations of where the four ports 120a, 120b, 122a, 122b and the four oxygen sensors 116a, 116b, 118a, 118b may be located along the exhaust system 100. As seen in, for example, FIGS. 7A-7C, an implementation of the exhaust system 100 may only include one of the upstream ports 120a, 120b and one of the upstream oxygen sensors 116a, 116b and one of the downstream ports 122a, 122b and one of the downstream oxygen sensors 118a, 118b. Further, as seen in, for example, FIG. 7D, an implementation of the exhaust system 100 may only include one of the upstream ports 120a, 120b and one of the upstream oxygen sensors 116a, 116b.

Referring to FIGS. 7A-7D, an enlarged view of an embodiment of the catalytic converter 108 of the exemplary exhaust system 100 is shown. The catalytic converter 108 generally includes a body 124; in some implementations, the body 124 is constructed from a stainless steel material. The body 124 may generally define: an upstream connecting flange 126 connected to an upstream neck portion or transition portion 128, a housing portion 130 connected to the upstream neck or transition portion 128, a downstream neck portion or transition portion 132 connected to the housing portion 130, and a downstream connecting flange 134 connected to the downstream neck portion or transition portion 132.

Figure 8A:
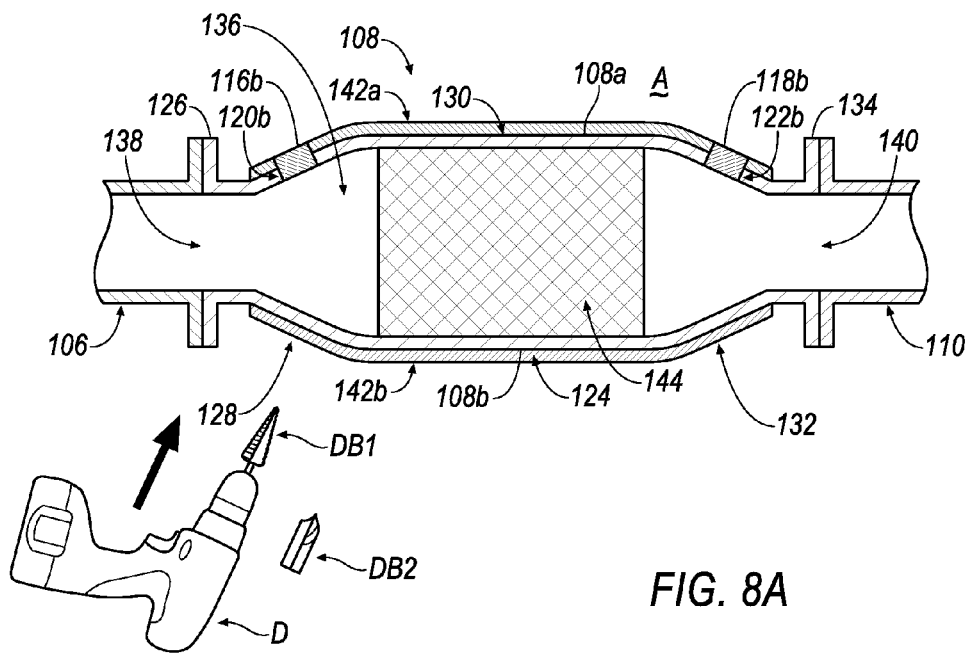
FIG. 8A is a cross-sectional view of the catalytic converter according to line 8A-8A of FIG. 7C but may alternatively be any of FIG. 7A, 7B or 7D.

Referring to FIG. 8A, a fluid-flow passage 136 may extend through the body 124 of the catalytic converter 108. Besides the catalytic converter 108, the fluid-flow passage 136 also extends through all of the components 102-106, 110-114 of the exhaust system 100. As seen in FIG. 8A, the fluid-flow passage 136 is isolated from the surrounding atmosphere, A (except for the opening of the tailpipe 114 that defines the distal, downstream end 100b of the exhaust system 100).

Access to the fluid-flow passage 136 is permitted by an upstream opening 138 formed by the upstream connecting flange 126 and a downstream opening 140 formed by the downstream connecting flange 134. The upstream connecting flange 126 is coupled (e.g., welded, bolted or the like) and fluidly-coupled to the mid-pipe 106, and, the downstream connecting flange 134 is coupled (e.g., welded, bolted or the like) and fluidly-coupled to the third pipe portion 110.

An upper heat shield 142a (see also FIGS. 7A-7D) may be arranged upon the upper surface 108a of the catalytic converter 108, and, a lower heat shield 142b (see also FIGS. 7A-7D) may be arranged upon the lower surface 108b of the catalytic converter 108. A honeycomb catalyst substrate 144 may be disposed within the fluid-flow passage 136 formed by the housing portion 130 of the body 124 of the catalytic converter 108; the honeycomb catalyst substrate 144 reduces NOx emissions when the vehicle is operated.

After a prolonged use of the vehicle, V, the honeycomb catalyst substrate 144 may be coated and/or plugged with contaminants, which may result in the exhaust system 100 failing an emissions test. The contaminants may be removed from the honeycomb catalyst substrate 144 by introducing a cleaning solution 146 (e.g., a dilute acidic solution as seen in, e.g., FIG. 8C-8D) into the passage 136 formed by the housing portion 130 of the body 124 of the catalytic converter 108 that contains the contaminated honeycomb catalyst substrate 144. An exemplary dilute acidic solution 146 may be made from oxalic acid, CAS No. 6153-56-6, which may be commercially available from Indian Oxalate Limited, Mumbai, India. An exemplary concentration level of the dilute acidic solution 146 that may be suitable for removing contaminants from the honeycomb catalyst substrate 144 may be approximately about 5-10%. While an oxalic acid is described above as exemplary acid that is utilized for preparing the dilute acidic solution 146, it will be appreciated that other acids may be utilizing for preparing the dilute acidic solution 146; for example, another type of acid that may be utilized for preparing the dilute acidic solution 146 may include, for example, an organic acid. An exemplary organic acid may include, for example, an acetic acid, a citric acid or the like. Other acids that may be utilized for preparing the dilute acidic solution 146 may include, for example, a sulphamic acid, a phosphoric acid or the like.

Figure 8B:
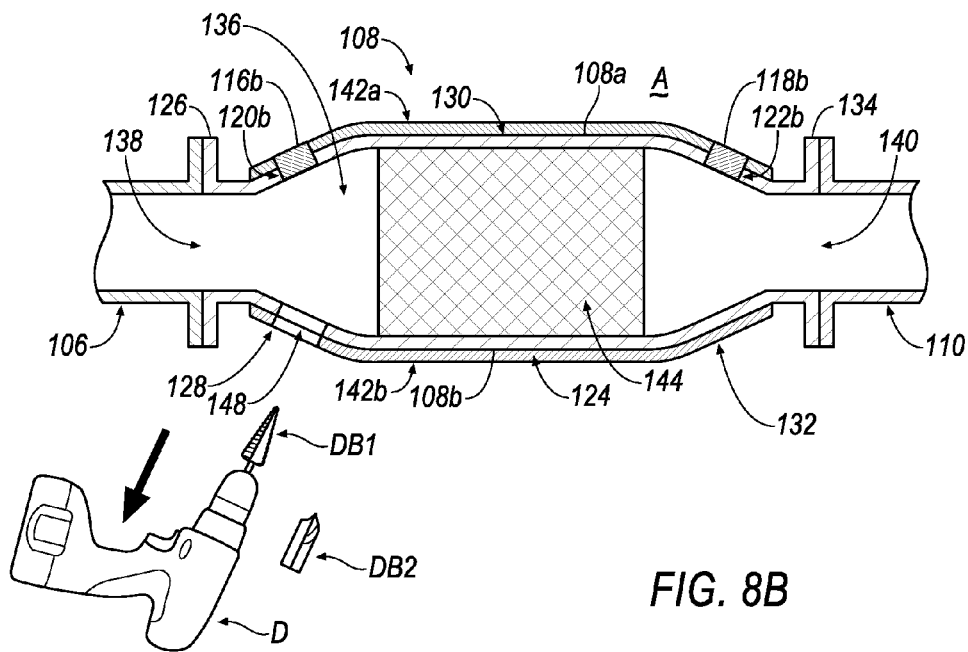
FIGS. 8B-8H are cross-sectional views illustrating a method for servicing the exemplary catalytic converter of FIG. 8A.

Referring to FIGS. 8A-8B, the dilute acidic solution 146 may be introduced into the passage 136 formed by the housing portion 130 of the body 124 of the catalytic converter 108 by 'post-fabricating' at least one opening 148 (see, e.g., FIG. 8B) in the body 124 of the catalytic converter 108. According to the embodiment shown at FIGS. 8A-8H, the 'post-fabricated' at least one opening 148 is prepared at the upstream neck portion or transition portion 128 of the body 124 of the catalytic converter 108 such that the 'post-fabricated' at least one opening 148 is located upstream of the honeycomb catalyst substrate 144.

The term, 'post-fabricating' may be defined as an act that occurs after the catalytic converter 108 has been released by the manufacturer of the catalytic converter 108. The term, 'post-fabricating' may alternatively be defined as an act that occurs after the vehicle, V, has been released by an original equipment manufacturer (OEM) that assembled the vehicle, V. Other definitions of the term, 'post-fabricating' may mean that the 'post-fabricated' at least one opening 148 is formed in an 'after-market' environment by, for example, a servicing agent or owner, A/O (see, e.g., FIG. 6), of the vehicle, V.

The 'post-fabricated' at least one opening 148 may be formed in the body 124 of the catalytic converter 108 by removing material from the lower surface 108b of the body 124 of the catalytic converter 108. Referring to FIGS. 6 and 8A-8B, an exemplary method for removing material from the lower surface 108b of the body 124 of the catalytic converter 108 is the utilization of a drill, D. In an example, the drill, D, may include a drill bit, DB1/DB2, having a diameter for 'post-fabricating' the at least one opening 148; the 'post-fabricated' at least one opening may be any diameter, and, in some implementations may be as small as approximately about 0.25" and as large as approximately about 0.75". In an example, the drill bit, DB1, may be a conical/tapered, step drill bit. In an example, the drill bit, DB2, may be a spotting, stubby drill bit.

The lower surface 108b of the body 124 of the catalytic converter 108 may be a preferable location for post-fabricating the 'post-fabricated' at least one opening 148. As seen in, for example, FIG. 6, accessibility of the lower surface 108b of the body 124 of the catalytic converter 108 by the servicing agent or owner, A/O, (when the servicing agent or owner, A/O, is locate under the vehicle, V) is not impeded when, for example, the vehicle, V, is arranged upon a lift, L, or, alternatively, when the vehicle, V, is arranged over a servicing pit, P.

Figure 8C:
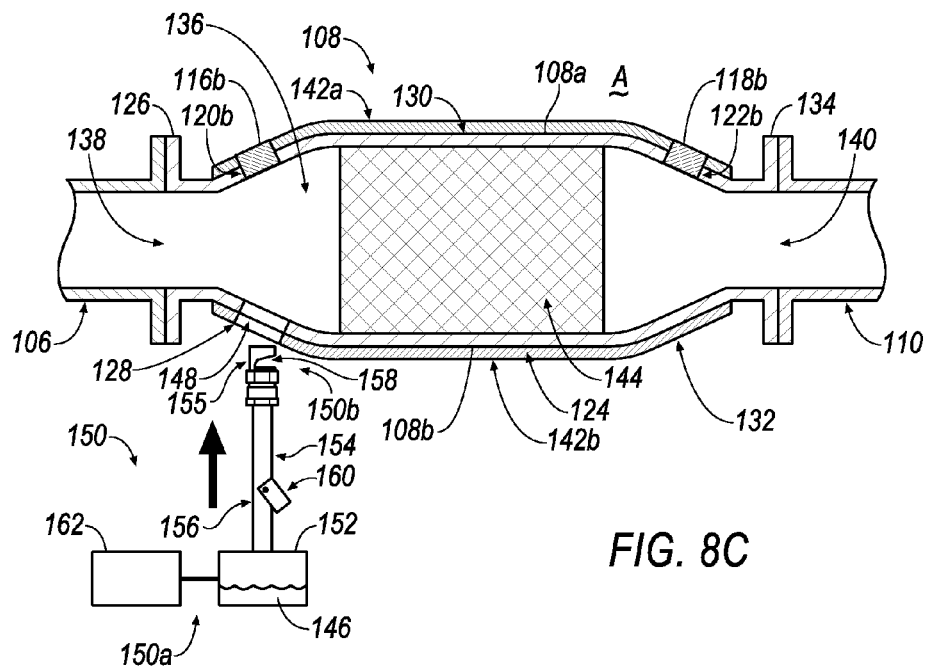
Figure 8D:
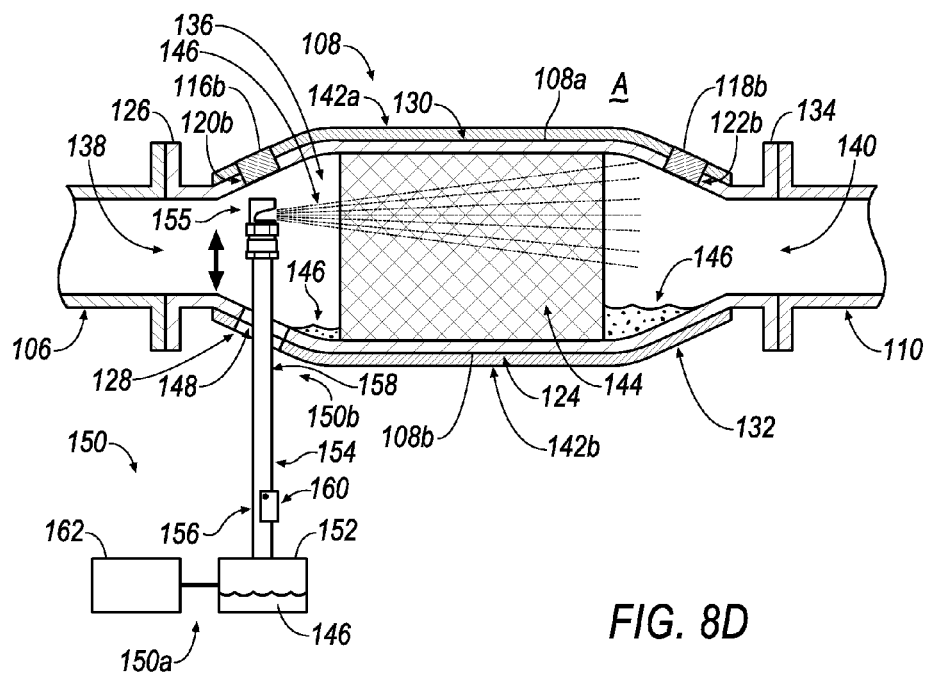

Referring to FIGS. 8C-8D, a dilute acidic solution dispensing system 150 is shown according to an embodiment. The dilute acidic solution dispensing system 150 includes a proximal end 150a and a distal end 150b. The proximal end 150a of the dilute acidic solution dispensing system 150 may include a source, reservoir or container 152 of the dilute acidic solution 146, and, the distal end 150b of the dilute acidic solution dispensing system 150 may include a dispenser 154 that dispenses the dilute acidic solution 146 into the passage 136 formed by the housing portion 130 of the body 124 of the catalytic converter 108.

As seen in FIG. 8D, the servicing agent/owner, A/O, of the vehicle, V, may insert the distal end 150b of dilute acidic solution dispensing system 150 into the 'post-fabricated' at least one opening 148. The dispenser 154 that is formed by distal end 150b of the dilute acidic solution dispensing system 150 may be defined by a nozzle 155 of an elongated fluid-dispensing wand 156. The nozzle 155 may have an orifice size of approximately about 0.12" in order to dispense the dilute acidic solution 146 as a fine mist.

The nozzle 155 may include a right-angle spray deflector 158 for directing the dilute acidic solution 146 in a particular direction. The fluid-dispensing wand 156 may also include an actuating handle 160 that permits the servicing agent/owner, A/O, of the vehicle, V, to selectively dispense the dilute acidic solution 146 from the nozzle 155. When the vehicle, V, is arranged upon a lift, L (as seen in, e.g., FIG. 6), or, alternatively, when the vehicle, V, is arranged over a servicing pit, P (not shown), the servicing agent/owner, A/O, of the vehicle, V, may be located under the exhaust system 100, and, therefore, may easily insert the distal end 150b of the dilute acidic solution dispensing system 150 into the 'post-fabricated' at least one opening 148 that is formed in the lower surface 108b of the body 124 of the catalytic converter 108.

The proximal end 150a of the dilute acidic solution dispensing system 150 may include a positive pressure source 162 that is fluidly-connected to the source, reservoir or container 152 of the dilute acidic solution 146. The positive pressure source 162 may include, for example, a shop air source (e.g., an air line supplying regulated air pressure at 30-60 psi), or, alternatively, a manually-operated pump that pressurizes the source, reservoir or container 152 of the dilute acidic solution 146 in order to force the dilute acidic solution 146 through the fluid-dispensing wand 156 and out of the nozzle 155 as described above. In an embodiment, the actuating handle 160 may open or close a valve (not shown) disposed in the fluid-dispensing wand 156; when the valve is arranged in the open orientation, the positive pressure source 162 may force the dilute acidic solution 146 out of the nozzle 155 (as seen in, e.g., FIG. 8D), and, conversely, when the valve is arranged in the closed orientation, the dilute acidic solution 146, which is pressurized by the positive pressure source 162, is not permitted to be expelled from the nozzle 155 (as seen in, e.g., FIG. 8C).

The dilute acidic solution dispensing device 150 may commercially available from MCMASTER-CARR® and sold as Model 7044T42. The nozzle 155 may be commercially available from MCMASTER-CARR® and sold as Model 30995K15.

The cleaning method performed by the dilute acidic solution dispensing device 150 may be conducted for a predetermined period of time deemed effective for cleaning a particular type of catalytic converter 108, or, alternatively, a longer time period considered generally suitable for any catalytic converter 108. The cleaning operation performed by the dilute acidic solution dispensing device 150 may be verified using a gas analyzer, GA (see, e.g., FIG. 13). The gas analyzer, GA, may be, for example, a five-gas analyzer that is commercially available from Snap-On Tools and sold as model HHGA5BP. The gas analyzer, GA, may be fluidly-connected to the exhaust system 100 by, for example, by inserting a sample probe, P, of the gas analysis, GA, into the tailpipe 114 of the exhaust system 100 in order to detect an acceptable, predetermined exhaust gas level (e.g., a predetermined level of hydrocarbons (HC), carbon monoxide (CO), and/or oxides of nitrogen ($NO_x$)) when the engine, E, is keyed-on. Accordingly, the step of introducing the dilute acidic solution 146 into the catalytic converter 108 may be repeated until the gas analyzer, GA, detects a predetermined exhaust gas level.

Figure 13:
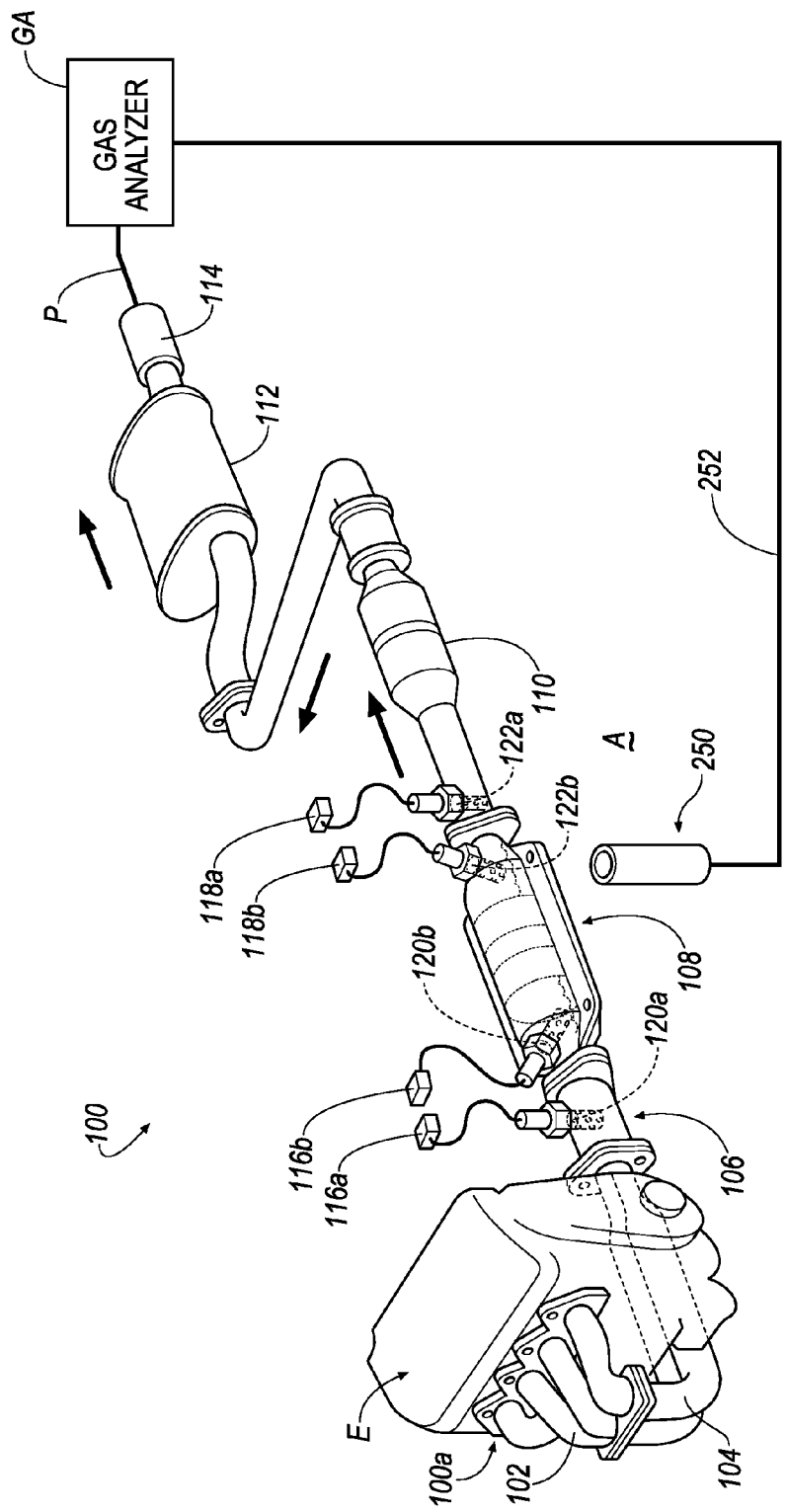
FIG. 13 is a perspective view of the exemplary exhaust system of FIG. 6 attached to a gas analyzer.

In another embodiment, the gas analyzer, GA, may be utilized for determining if the close-out member 175 seals the 'post-fabricated' at least one opening 148 that is formed in the lower surface 108b of the body 124 of the catalytic converter 108. Referring to FIG. 13, in an example, a heat-resistant flexible tube 250 formed by, for example, a silicone material may be fluidly-connected to the gas analyzer by a hose 252. The heat-resistant flexible tube 250 may be placed adjacent the lower surface 108b of the body 124 of the catalytic converter 108 and circumferentially about the close-out member 175 for fluidly-isolating the at least one opening 148 and the close-out member 175 from the surrounding atmosphere. After keying-on the engine, E, if an exhaust leak occurs about the close-out member 175, the heat-resistance flexible tube 250 may isolate the exhaust leak which may then be detected by the gas analyzer, GA.

Figure 8E:
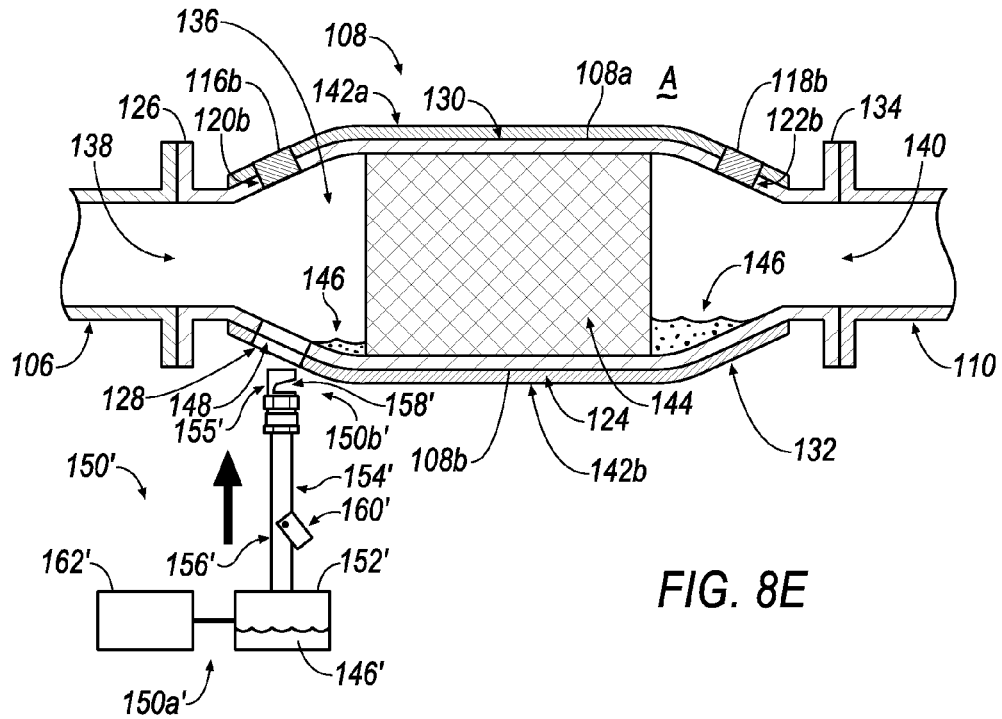
Figure 8F:
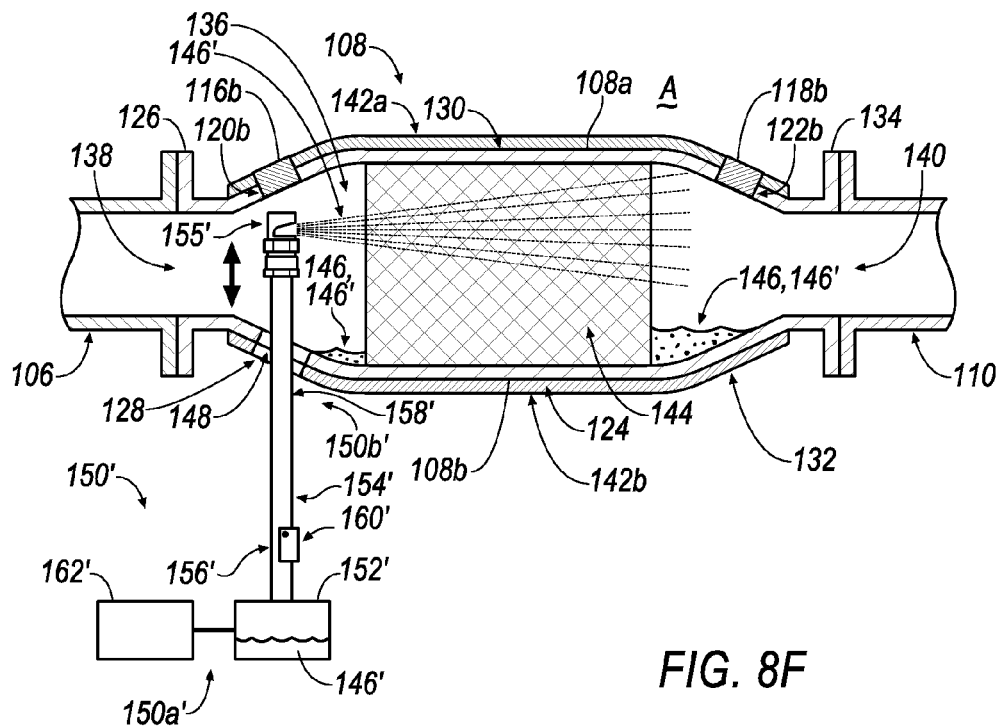

Referring to FIGS. 8E-8F, a dilute acidic solution flushing system 150' is shown according to an embodiment. The dilute acidic solution flushing system 150' may be substantially similar to the dilute acidic solution dispensing system 150 as described above with the exception that the source, reservoir or container 152' of the dilute acidic solution flushing system 150' does not include the dilute acidic solution 146, but, rather, includes a flushing medium/fluid 146', such as, for example, water (i.e., a fluid, such as water, is utilized for flushing the dilute acidic solution 146 and contaminates off of the honeycomb catalyst substrate 144). In some implementations, however, the source, reservoir or container 152' of the dilute acidic solution flushing system 150' may be omitted and the fluid (e.g., air) of the positive pressure source 162 (e.g., a shop air source) may be utilized for flushing the dilute acidic solution 146 and contaminates off of the honeycomb catalyst substrate 144.

With reference to FIGS. 8E-8F, in a substantially similar manner as described above at FIGS. 8C-8D, when the vehicle, V, is arranged upon a lift, L (as seen in, e.g., FIG. 6), or, alternatively, when the vehicle, V, is arranged over a servicing pit, P (not shown), the servicing agent/owner, A/O, of the vehicle, V, may be located under the exhaust system 100, and, therefore, may easily insert a distal end 150b' of the dilute acidic solution flushing system 150' into the 'post-fabricated' at least one opening 148 that is formed in the lower surface 108b of the body 124 of the catalytic converter 108. Upon the servicing agent/owner, A/O, of the vehicle, V, actuating the actuating handle 160' of the dilute acidic solution flushing system 150', the actuating handle 160' may open or close a valve (not shown) disposed in the fluid-dispensing wand 156'; when the valve is arranged in the open orientation, the positive pressure source 162' may force the flushing medium 146' out of the nozzle 155' (as seen in FIG. 8F), and, conversely, when the valve is arranged in the closed orientation, the flushing medium 146', which is pressurized by the positive pressure source 162', is not permitted to be expelled from the nozzle 155' (as seen in FIG. 8E). Upon the flushing medium 146' being directed through the passage 136 formed by the housing portion 130 of the body 124 of the catalytic converter 108, the flushing medium 146' may remove the earlier-dispensed dilute acidic solution 146 and the contaminates from the honeycomb catalyst substrate 144.

Figure 8G:
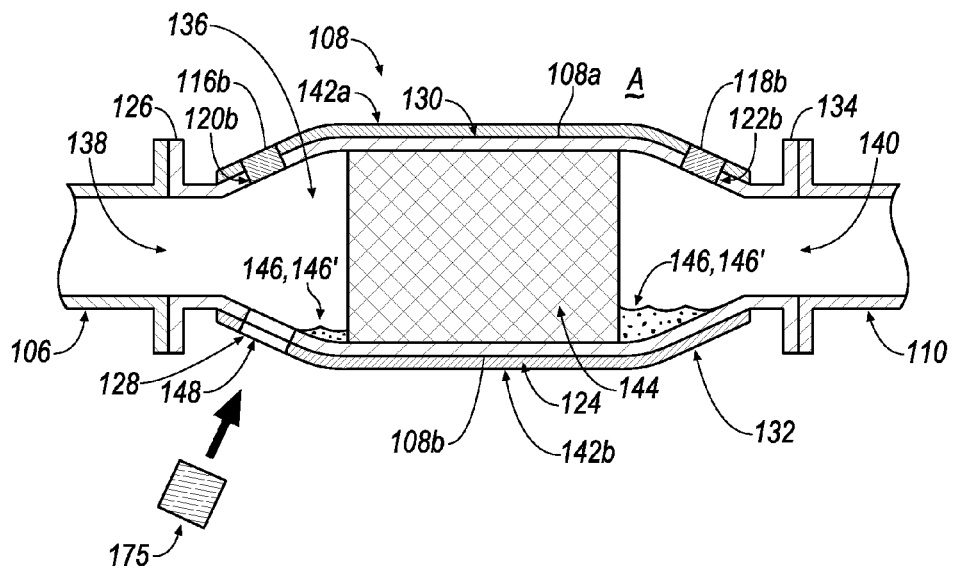
Figure 8H:
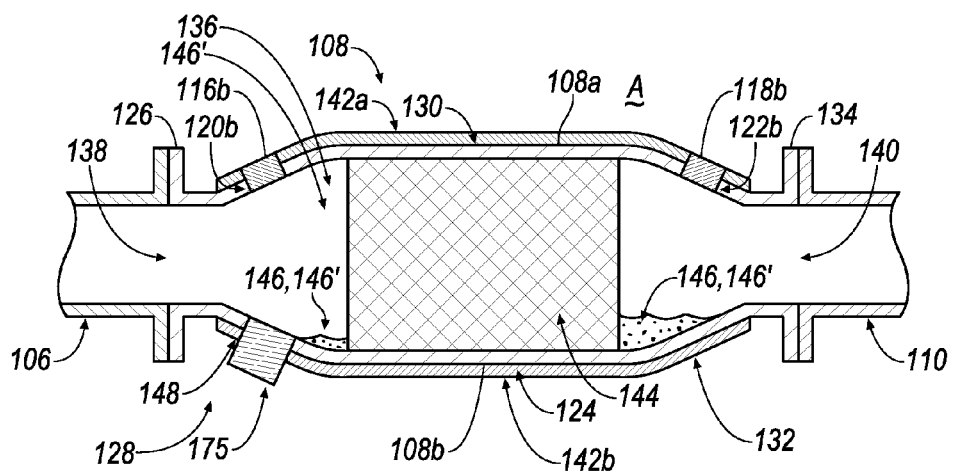

Referring to FIGS. 8G-8H, once the step of flushing the dilute acidic solution 146 and contaminates from the honeycomb catalyst substrate 144 with the flushing medium 146' is complete, the servicing agent/owner, A/O, of the vehicle, V, may close-out the 'post-fabricated' at least one opening 148 of the body 124 of the catalytic converter 108 by disposing a close-out member 175 in the 'post-fabricated' at least one opening 148. The close-out member 175 may include a material that is resistant to, for example road debris, salt, sand, rocks and the like while also being suitable for withstanding automotive heat cycles while sealing exhaust fumes (resulting from, for example, approximately 3 psi of internal exhaust pressure) contained within the fluid-flow passage 136. In an implementation the close-out member 175 may be a 'swaging nut' that is commercially available from MCMASTER-CARR® and sold under the trade-name 'A-T Series Insert.' In another implementation, the close-out member 175 may be a knurled threaded insert commercially available from AVK Industrial Products and sold as model number ATC2-813; an installation tool sold as model number AAT916-813 commercially available from AVK Industrial Products may be utilized for swaging the knurled threaded insert 175 into the 'post-fabricated' at least one opening 148. In the event that the catalytic converter 108 has to be re-serviced at a later time in a substantially similar manner as described above, the close-out member 175 may be selectively removed from the 'post-fabricated' at least one opening 148 in order to permit one or more of the dilute acidic solution dispensing system 150 and the dilute acidic solution flushing system 150' to remove contaminates from the honeycomb catalyst substrate 144 in a subsequent cleaning process.

Figure 9:
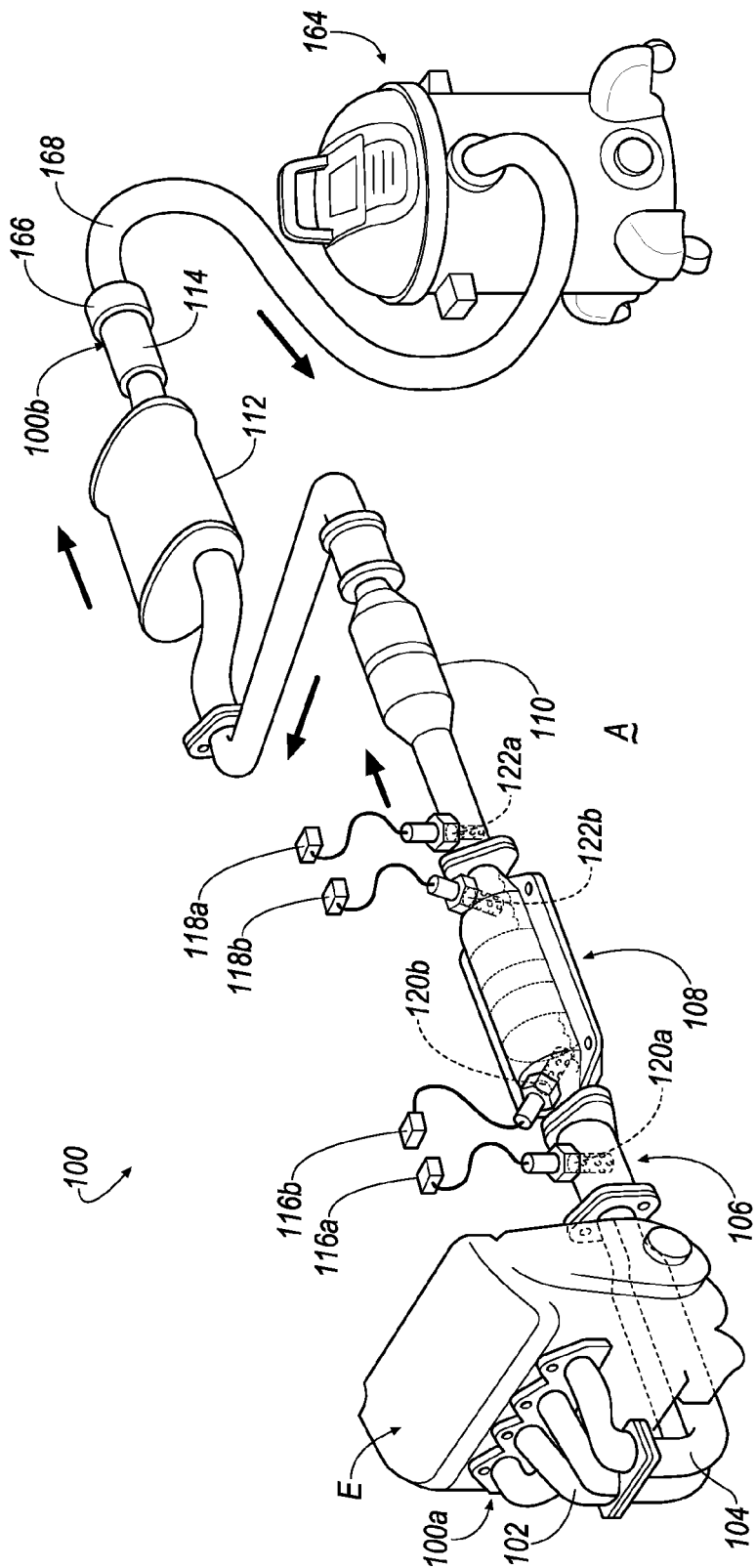
FIG. 9 is a perspective view of the exemplary exhaust system of FIG. 6 attached to a vacuum source.

During or after the step of applying the dilute acidic solution 146 upon the honeycomb catalyst substrate 144 with the dilute acidic solution dispensing system 150, or, alternatively, before, during or after the step of flushing the dilute acidic solution 146 from the honeycomb catalyst substrate 144 with the flushing medium 146' of the dilute acidic solution flushing system 150', the dilute acidic solution 146 and/or the flushing medium 146' may be removed from the exhaust system 100 in a fluid removal step. Referring to FIG. 9, in an embodiment, the fluid removal step may be conducted by a vacuum source 164. If desired, the fluid removal step conducted by the vacuum source 164 may be alternatively conducted after the 'post-fabricated' at least one opening 148 of the body 124 of the catalytic converter 108 is closed-out by the close-out member 175; by closing-out the 'post-fabricated' at least one opening 148 with the close-out member 175, a vacuum imparted to the exhaust system 100 by the vacuum source 164 will be greater due to the fact that ambient air, from the surrounding atmosphere, A, will not be pulled into the 'post-fabricated' at least one opening 148 due to the fact that the close-out member 175 seals the body 124 of the catalytic converter 108 from the surrounding atmosphere, A.

The vacuum source 164 may be attached to the tailpipe 114 of the exhaust system 100 such that the vacuum source 164 may be fluidly-connected to the distal, downstream end 100*b* of the exhaust system 100. In an embodiment, the vacuum source 164 may be attached to the tailpipe 114 by a heat-resistant connector 166 and a hose 168. The vacuum source 164 may be commercially sold under the trade-name, a SHOP-VAC®, and may include, for example, a stainless steel tank that receives one or more of the dilute acidic solution 146 and/or the flushing medium 146' that is pulled, by way of a vacuum applied by the vacuum source 164, from the catalytic converter 108, the third pipe portion 110, the muffler 112 and then the tailpipe 114.

The heat-resistant tailpipe connector 166 may be formed by a silicone material in the form of a cylindrical or oval sleeves that frictionally-attaches to the tailpipe 114. In some instances, if a vehicle, V, has been driven for a period of time prior to being arranged upon a lift, L (as seen in, e.g., FIG. 6), or, alternatively, over a servicing pit, P (not shown), the catalytic converter 108 may be heated to a temperature that would delay the contaminate removal process associated with the application of the dilute acidic solution 146 upon the honeycomb catalyst substrate 144; additionally, the tailpipe 114 may be heated in a substantially similar manner. Accordingly, the heat-resistant tailpipe connector 166 is formed from a material that will thermally insulate the hose 168 from the tailpipe 114 if the tailpipe 114 is heated. The cross-section of the heat-resistant tailpipe connector 166 may be any desirable shape that corresponds to the geometry of the tailpipe 114; accordingly, in some circumstances, the heat-resistant tailpipe connector 166 may be sized to a fixed dimension that corresponds to a specific tailpipe 114 of a specific vehicle, V, or, alternatively, the heat-resistant tailpipe connector 166 may be adjustable in order to 'universally' correspond to tailpipes 114 of different sizes.

The hose 168 may fluidly-connect the heat-resistant tailpipe connector 166 to the vacuum source 164. The hose 168 may be formed from a rubber or plastic material and include, for example, a corrugated body. In some implementations, the hose 168 may be transparent in order for the servicing agent/owner, A/O, of the vehicle, V, to inspect the amount of dilute acidic solution 146 and/or the flushing medium 146' being drawn from the exhaust system 100 and into the stainless steel tank of the vacuum source 164.

Figure 10:
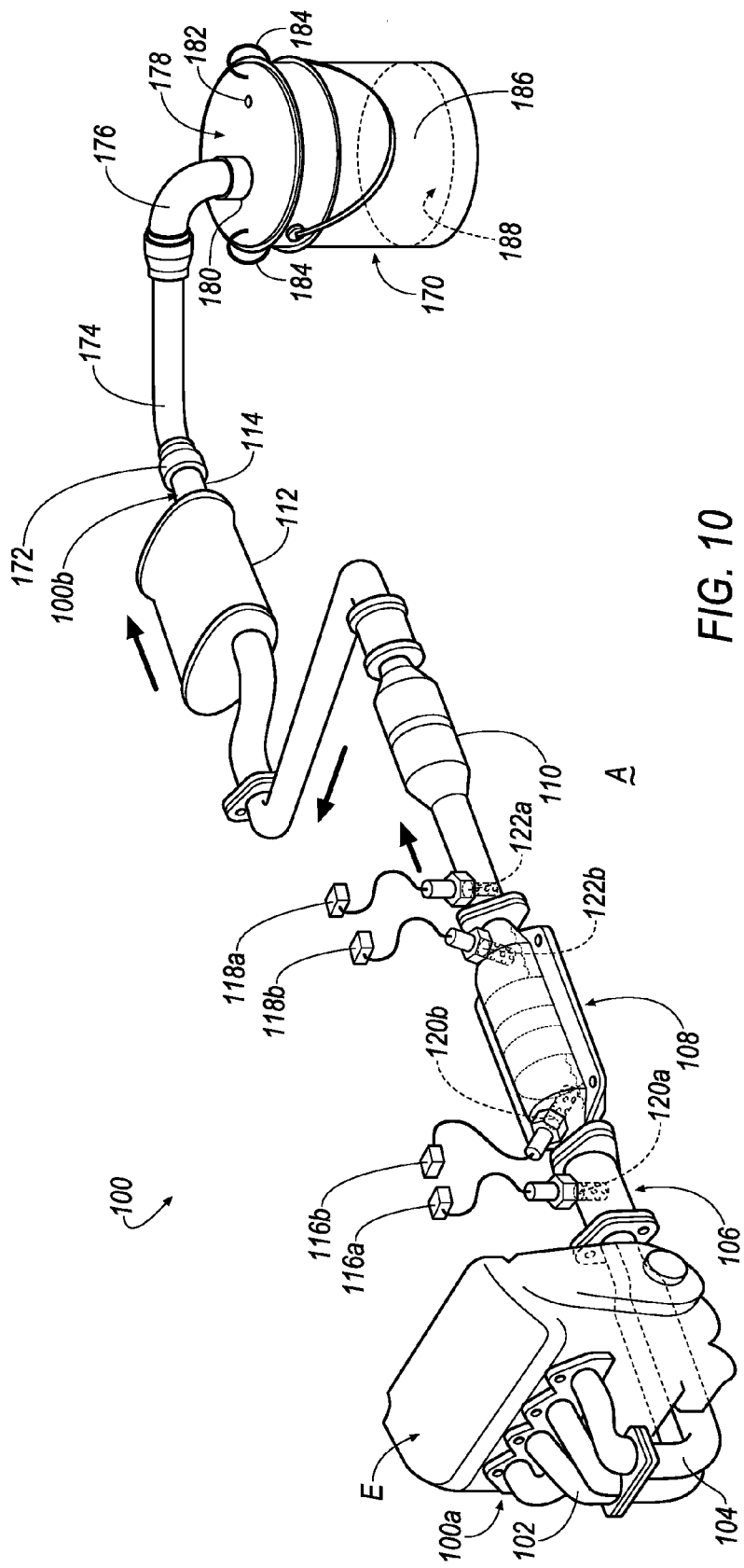
FIG. 10 is a perspective view of the exemplary exhaust system of FIG. 6 attached to a discharge bucket.

Referring to FIG. 10, a fluid removal step may be performed after the 'post-fabricated' at least one opening 148 of the body 124 of the catalytic converter 108 is closed-out by the close-out member 175 in order to remove the dilute acidic solution 146 and/or the flushing medium 146' from the exhaust system 100. In some implementations, the fluid removal step of FIG. 10 may be performed after the fluid removal step is performed by the vacuum source 164 as described above. The purpose of utilizing the fluid removal step of FIG. 10 after performing the fluid removal step of FIG. 9 is to flush out a remainder of the dilute acidic solution 146 and/or the flushing medium 146' that is contained by the catalytic converter as seen in, for example, FIG. 8H.

The fluid removal step of FIG. 10 may be performed by keying-on the engine, E. In an example, the exhaust gas produced by the engine, E, may 'push' the dilute acidic solution 146 and/or the flushing medium 146' downstream through the exhaust system 100 such that the dilute acidic solution 146 and/or the flushing medium 146' are expelled through the catalytic converter 108, the third pipe portion 110, the muffler 112 and out of the tailpipe 114. Although some implementations may utilize the engine, E, for removing the dilute acidic solution 146 and/or the flushing medium 146' from the exhaust system 100 after the vacuum source 164 has removed the dilute acidic solution 146 and/or the flushing medium 146', some implementations for removing the dilute acidic solution 146 and/or the flushing medium 146' from the exhaust system 100 may be conducted by utilizing the engine, E, alone without using the vacuum source 164. In some implementations, the engine, E, may be ran above idle speed in order to discharge exhaust gas with an adequate amount of force for removing the dilute acidic solution 146 and/or the flushing medium 146' from the exhaust system 100.

When the engine, E, is utilized for discharging the dilute acidic solution 146 and/or the flushing medium 146' from the exhaust system 100, the servicing agent/owner, A/O, of the vehicle, V, may fluidly-connect a discharge bucket 170 to the tailpipe 114. In an implementation, the discharge bucket 170 may be attached to the tailpipe 114 by, for example, one or more of a tailpipe connector 172, a hose portion 174 and an elbow portion 176. In some implementations, the discharge bucket 170 may include a cover 178 having a first opening 180 that is fluidly-connected to one or more of the tailpipe connector 172, the hose portion 174 and the elbow portion 176. The cover 178 may also include a second opening 182 that permits the discharge bucket 170 to be vented to atmosphere, A. In some implementations, the discharge bucket 170 may also include one or more clamps 184 for removably-securing the cover 178 to the body 186 of the discharge bucket 170. In some instances, the body 186 of the discharge bucket 170 may be formed from a relatively heavy material in order to maintain the discharge bucket 170 in an upright orientation. In other instances, a weight 188 may be arranged within the body 186 of the discharge bucket 170 for maintain the discharge bucket 170 in an upright orientation.

Irrespective of the method for removing the dilute acidic solution 146 and/or the flushing medium 146' from the exhaust system 100 (i.e., by way of the vacuum source 164 as seen in FIG. 9 or by keying-on the engine, E, as seen in FIG. 10), the dilute acidic solution 146 and/or the flushing medium 146' are neutralized prior to disposal. In an implementation, the dilute acidic solution 146 and/or the flushing medium 146' may be neutralized by mixing the dilute acidic solution 146 and/or the flushing medium 146' with a neutralizing medium, NM (see, e.g., FIG. 14) that is disposed within a first container, C1 (see, e.g., FIG. 14). The neutralizing medium, NM, may include, for example, baking soda, soda ash (e.g., CAS No. 497-19-8), alkaline powder or the like. A predetermined amount of oxalic acid in powder form, AP (see, e.g., FIG. 14), for making the dilute acidic solution 146 that is utilized for cleaning the catalytic converter 108 as described above may be supplied in a second container, C2 (see, e.g., FIG. 14).

Figure 14:
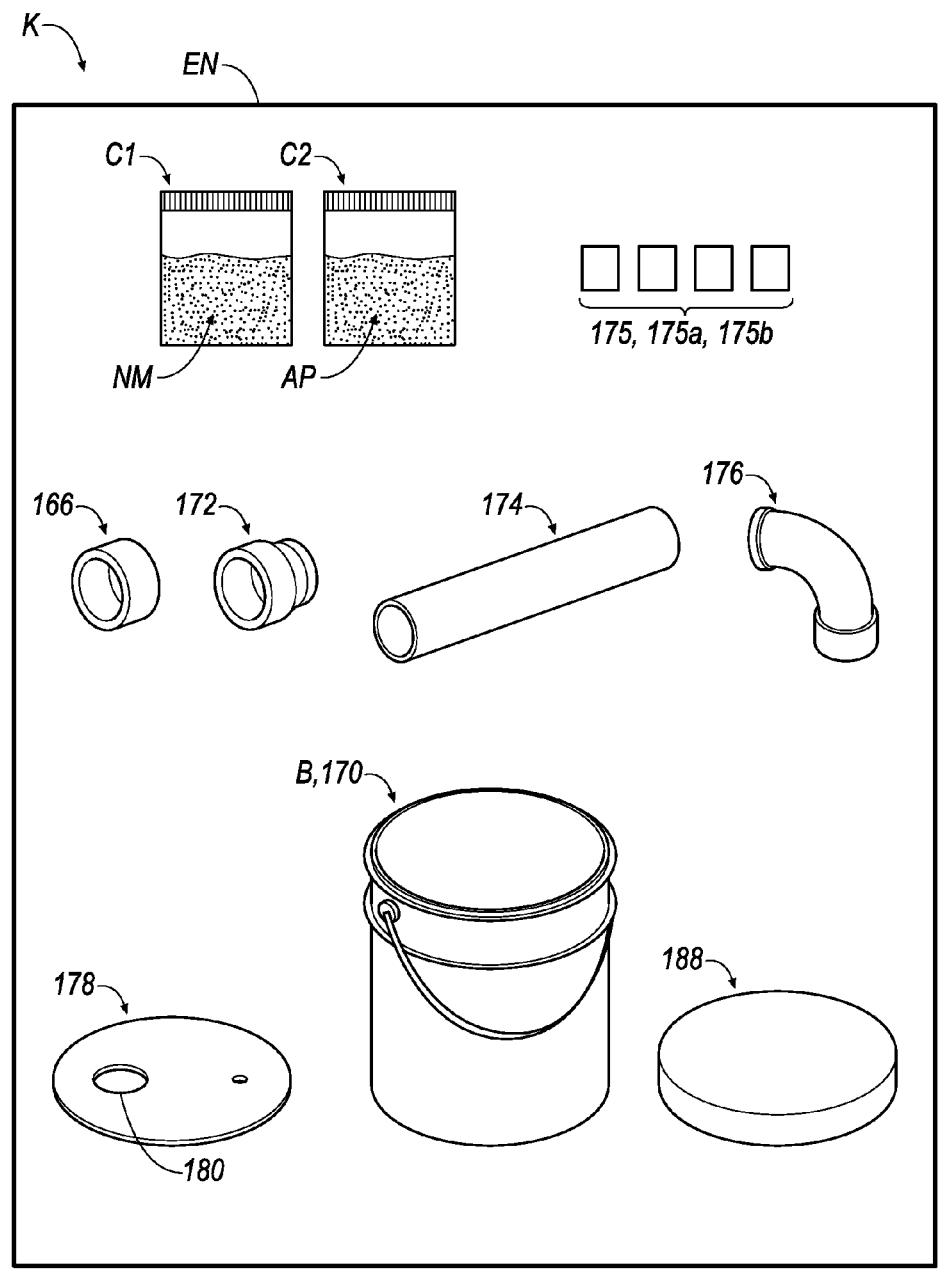
FIG. 14 is an exemplary view of a kit for servicing a catalytic converter.

Referring to FIG. 14, the first container, C1, including the neutralizing medium, NM, and the second container, C2, including the predetermined amount of oxalic acid in powder form, AP, may be included in a kit, K. The kit, K, may be bundled (i.e., enclosed together) in an enclosure, EN (e.g., a box, shrink-wrap film bag or the like).

Although an exemplary kit, K, is described above, the kit, K, is not limited to including the first container, C1, including the neutralizing medium, NM, and the second container, C2, including the predetermined amount of oxalic acid in powder form, AP. For example, the kit, K, may include any of the components described above that are interfaced with the exhaust system 100. In one example, the kit, K, may include one or more of: one or a plurality of close-out member(s) 175, the heat-resistant connector 166, the discharge bucket 170, the tailpipe connector 172, the hose portion 174 and the elbow portion 176, the cover 178 and the weight 188. In some implementations, the kit, K, could also include the drill, D, the drill bit, DB1/DB2, the dilute acidic solution dispensing system 150, the dilute acidic solution flushing system 150' and the vacuum source 164.

In an optional step, the dilute acidic solution flushing system 150' may be utilized in a substantially similar manner as described above prior to the introduction of the dilute acidic solution 146 by the dilute acidic solution dispensing system 150. In some instances, if a vehicle, V, has been driven for a period of time prior to being arranged upon a lift, L (as seen in, e.g., FIG. 6), or, alternatively, over a servicing pit, P (not shown), the catalytic converter 108 may be heated to a temperature that would delay the contaminate removal process associated with the application of the dilute acidic solution 146 upon the honeycomb catalyst substrate 144. Therefore, if the flushing medium 146' of the dilute acidic solution flushing system 150' is water, the water 146' may be utilized in a preliminary step for the purpose of cooling the honeycomb catalyst substrate 144 of the catalytic converter 108; once the honeycomb catalyst substrate 144 of the catalytic converter 108 has been sufficiently cooled, the dilute acidic solution dispensing system 150 may be utilized for applying the dilute acidic solution 146 to the honeycomb catalyst substrate 144. In an implementation, a temperature sensor (not shown), such as for example, a thermocouple or thermistor, an infrared temperature sensor, or the like may be temporarily attached to one or more of the upper surface 108a and/or the lower surface 108b of the catalytic converter 108, and, the application of the water 146' by the dilute acidic solution flushing system 150' may be performed until the temperature sensor indicates a predetermined temperature (e.g., approximately about 140° F.) of the catalytic converter 108 has been reached. In some implementations, the temperature sensor may be held by hand against the catalytic converter 108, or, alternatively, the temperature sensor may be attached to the catalytic converter 108 with, for example, a VELCRO® strap (not shown). An exemplary temperature sensor may be sold under the trade name Fluke 54 II B.

As a result of post-fabricating' the 'post-fabricated' at least one opening 148 in the body 124 of the catalytic converter 108, the catalytic converter 108 may be serviced without removing and disconnecting the catalytic converter 108 from the exhaust system 100 such that the catalytic converter 108 is permitted to be cleaned while remaining installed on the vehicle, V. Further, by post-fabricating the 'post-fabricated' at least one opening 148 in the lower surface 108b of the body 124 of the catalytic converter 108, accessibility to the fluid-flow passage 136 extending through the body 124 of the catalytic converter 108 is improved when, for example, a servicing agent/owner, A/O, of the vehicle, V, is located under the vehicle, V, when the vehicle, V, is arranged upon a lift, L (as seen in, e.g., FIG. 6), or, alternatively, when the vehicle, V, is arranged over a servicing pit, P (not shown).

Further, although the at least one opening 148 formed in the lower surface 108b of the catalytic converter 108 is described as being 'post-fabricated,' the 'post-fabricated' at least one opening 148 is not limited to being formed in such a fashion. For example, the at least one opening 148 formed in the lower surface 108b of the catalytic converter 108 may be formed by the manufacturer of the catalytic converter 108, or, alternatively, the at least one opening 148 formed in the lower surface 108b of the catalytic converter 108 may be formed by the OEM before the vehicle, V, has been released by the OEM. Accordingly, in such an implementation, the at least one opening 148 formed in the lower surface 108b of the catalytic converter 108 may be referred to as a 'pre-fabricated' at least one opening 148 (i.e., the at least one opening is not formed in an 'after-market' environment by, for example, a servicing agent or owner, A/O (see, e.g., FIG. 6), of the vehicle, V); in an implementation, the at least one opening 148 formed in the lower surface 108b of the catalytic converter 108 may be pre-fabricated in any desirable manner such as, for example: drilling, welding, casting, molding, stamping or the like. In the event that the at least one opening 148 is 'pre-fabricated' as described above, the manufacturer of the catalytic converter 108 or the OEM may pre-dispose the close-out member 175 in the 'pre-fabricated' at least one opening 148. Therefore, the step of removing material from the lower surface 108b of the body 124 of the catalytic converter 108 by utilizing, for example, a drill, D, for forming the at least one opening 148 in an after-market modification step by a servicing agent or owner, A/O (see, e.g., FIG. 6), of the vehicle, V, may be omitted. In the implementation of 'pre-fabricating' the at least one opening 148 as described above, the 'pre-fabricated' at least one opening 148 is not the port 120b that supportably-receives the first, upstream oxygen sensor 116b, and, further, the close-out member 175 is not the first, upstream oxygen sensor 116b.

Figure 11A:
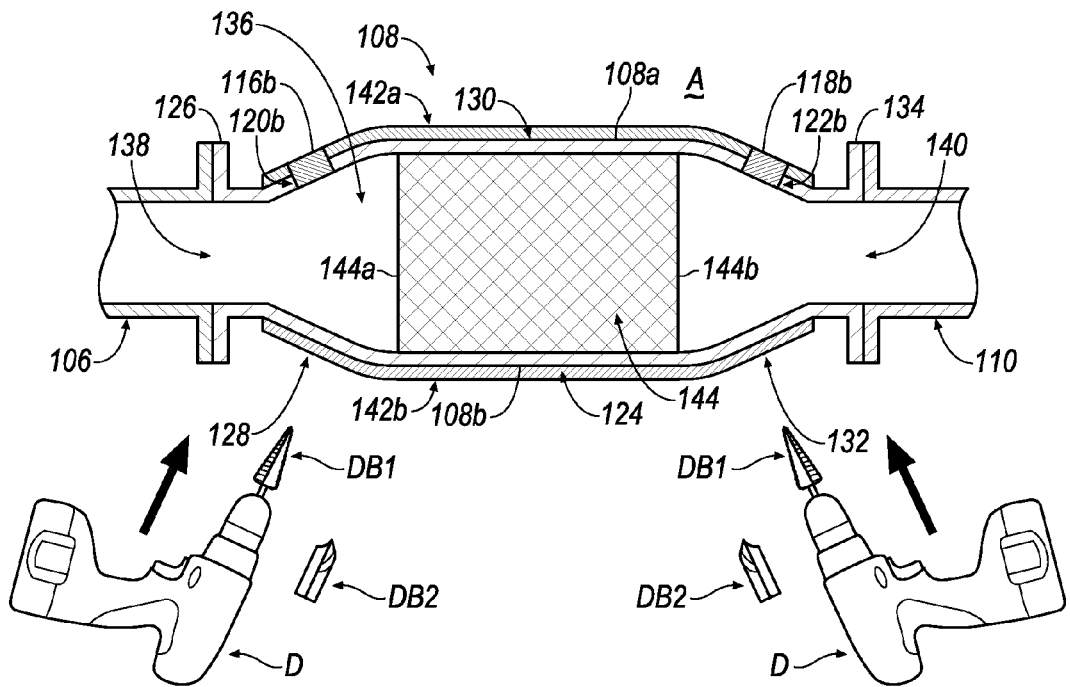
FIG. 11A is a cross-sectional view of the catalytic converter according to line 11A-11A of FIG. 7C but may alternatively be any of FIG. 7A, 7B or 7D.

Referring to FIGS. 11A-11L, another embodiment for removing contaminates from the honeycomb catalyst substrate 144 disposed within the fluid-flow passage 136 formed by the housing portion 130 of the body 124 of the catalytic converter 108 is described. Firstly, referring to FIG. 11A, the fluid-flow passage 136 may extend through the body 124 of the catalytic converter 108. Besides the catalytic converter 108, the fluid-flow passage 136 also extends through all of the components 102-106, 110-114 of the exhaust system 100. As seen in FIG. 11A, the fluid-flow passage 136 is isolated from the surrounding atmosphere, A (except for the opening of the tailpipe 114 that defines the distal, downstream end 100b of the exhaust system 100).

Access to the fluid-flow passage 136 is permitted by an upstream opening 138 formed by the upstream connecting flange 126 and a downstream opening 140 formed by the downstream connecting flange 134. The upstream connecting flange 126 is coupled (e.g., welded, bolted or the like) and fluidly-coupled to the mid-pipe 106, and, the downstream connecting flange 134 is coupled (e.g., welded, bolted or the like) and fluidly-coupled to the third pipe portion 110.

An upper heat shield 142a (see also FIGS. 7A-7D) may be arranged upon the upper surface 108a of the catalytic converter 108, and, a lower heat shield 142b (see also FIGS. 7A-7D) may be arranged upon the lower surface 108b of the catalytic converter 108. A honeycomb catalyst substrate 144 may be disposed within the fluid-flow passage 136 formed by the housing portion 130 of the body 124 of the catalytic converter 108; the honeycomb catalyst substrate 144 reduces NOx emissions when the vehicle is operated.

After a prolonged use of the vehicle, V, the honeycomb catalyst substrate 144 may be coated and/or plugged with contaminants, which may result in the exhaust system 100 failing an emissions test. The contaminants may be removed from the honeycomb catalyst substrate 144 by introducing a cleaning solution 146 (e.g., a dilute acidic solution as seen in, e.g., FIG. 11C-11F) into the passage 136 formed by the housing portion 130 of the body 124 of the catalytic converter 108 that contains the contaminated honeycomb catalyst substrate 144. An exemplary dilute acidic solution 146 may be made from oxalic acid, CAS No. 6153-56-6, which may be commercially available from Indian Oxalate Limited, Mumbai, India. An exemplary concentration level of the dilute acidic solution 146 that may be suitable for removing contaminants from the honeycomb catalyst substrate 144 may be approximately about 5-10%. While an oxalic acid is described above as exemplary acid that is utilized for preparing the dilute acidic solution 146, it will be appreciated that other acids may be utilizing for preparing the dilute acidic solution 146; for example, another type of acid that may be utilized for preparing the dilute acidic solution 146 may include, for example, an organic acid. An exemplary organic acid may include, for example, an acetic acid, a citric acid or the like. Other acids that may be utilized for preparing the dilute acidic solution 146 may include, for example, a sulphamic acid, a phosphoric acid or the like.

Figure 11B:
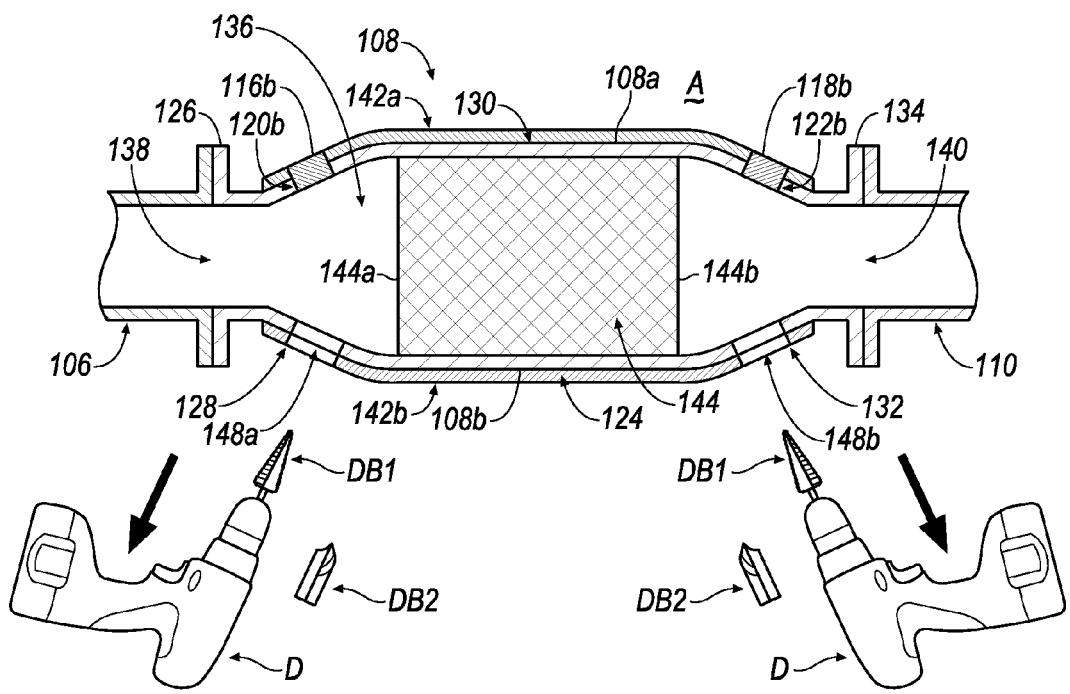
FIGS. 11B-11L are cross-sectional views illustrating a method for servicing the exemplary catalytic converter of FIG. 11A.

Referring to FIGS. 11A-11B, the dilute acidic solution 146 may be introduced into the passage 136 formed by the housing portion 130 of the body 124 of the catalytic converter 108 by 'post-fabricating' at least two openings 148a, 148b (see, e.g., FIG. 11B) in the body 124 of the catalytic converter 108. According to the embodiment shown at FIGS. 11A-11L, a first 'post-fabricated' opening 148a of the 'post-fabricated' at least two openings 148a, 148b is prepared at the upstream neck portion or transition portion 128 of the body 124 of the catalytic converter 108 such that the first 'post-fabricated opening 148a of the' 'post-fabricated' at least two openings 148a, 148b is located upstream of the honeycomb catalyst substrate 144. According to the embodiment shown at FIGS. 11A-11L, a second 'post-fabricated' opening 148b of the 'post-fabricated' at least two openings 148a, 148b is prepared at the downstream neck portion or transition portion 132 of the body 124 of the catalytic converter 108 such that the second 'post-fabricated' opening 148b of the 'post-fabricated' at least two openings 148a, 148b is located downstream of the honeycomb catalyst substrate 144.

The term, 'post-fabricating' may be defined as an act that occurs after the catalytic converter 108 has been released by the manufacturer of the catalytic converter 108. The term, 'post-fabricating' may alternatively be defined as an act that occurs after the vehicle, V, has been released by an original equipment manufacturer (OEM) that assembled the vehicle, V. Other definitions of the term, 'post-fabricating' may mean that the 'post-fabricated' at least two openings 148a, 148b are formed in an 'after-market' environment by, for example, a servicing agent or owner, A/O (see, e.g., FIG. 6), of the vehicle, V.

The 'post-fabricated' at least two openings 148a, 148b may be formed in the body 124 of the catalytic converter 108 by removing material from the lower surface 108b of the body 124 of the catalytic converter 108. Referring to FIGS. 6 and 11A-11B, an exemplary method for removing material from the lower surface 108b of the body 124 of the catalytic converter 108 is the utilization of a drill, D. In an example, the drill, D, may include a drill bit, DB1/DB2, having a diameter for 'post-fabricating' the at least two openings 148a, 148b; the 'post-fabricated' at least two openings may any diameter, and, in some implementations may be as small as approximately about 0.25" and as large as approximately about 0.75". In an example, the drill bit, DB1, may be a conical/tapered, step drill bit. In an example, the drill bit, DB2, may be a spotting, stubby drill bit.

The lower surface 108b of the body 124 of the catalytic converter 108 may be a preferable location for post-fabricating the 'post-fabricated' at least two openings 148a, 148b. As seen in, for example, FIG. 6, accessibility of the lower surface 108b of the body 124 of the catalytic converter 108 by the servicing agent or owner, A/O, (when the servicing agent or owner, A/O, is locate under the vehicle, V) is not impeded when, for example, the vehicle, V, is arranged upon a lift, L, or, alternatively, when the vehicle, V, is arranged over a servicing pit, P (not shown).

Referring to FIGS. 11C-11F, a dilute acidic solution dispensing system 150 is shown according to an embodiment. The dilute acidic solution dispensing system 150 includes a proximal end 150a and a distal end 150b. The proximal end 150a of the dilute acidic solution dispensing system 150 may include a source, reservoir or container 152 of the dilute acidic solution 146, and, the distal end 150b of the dilute acidic solution dispensing system 150 may include a dispenser 154 that dispenses the dilute acidic solution 146 into the passage 136 formed by the housing portion 130 of the body 124 of the catalytic converter 108.

Figure 11C:
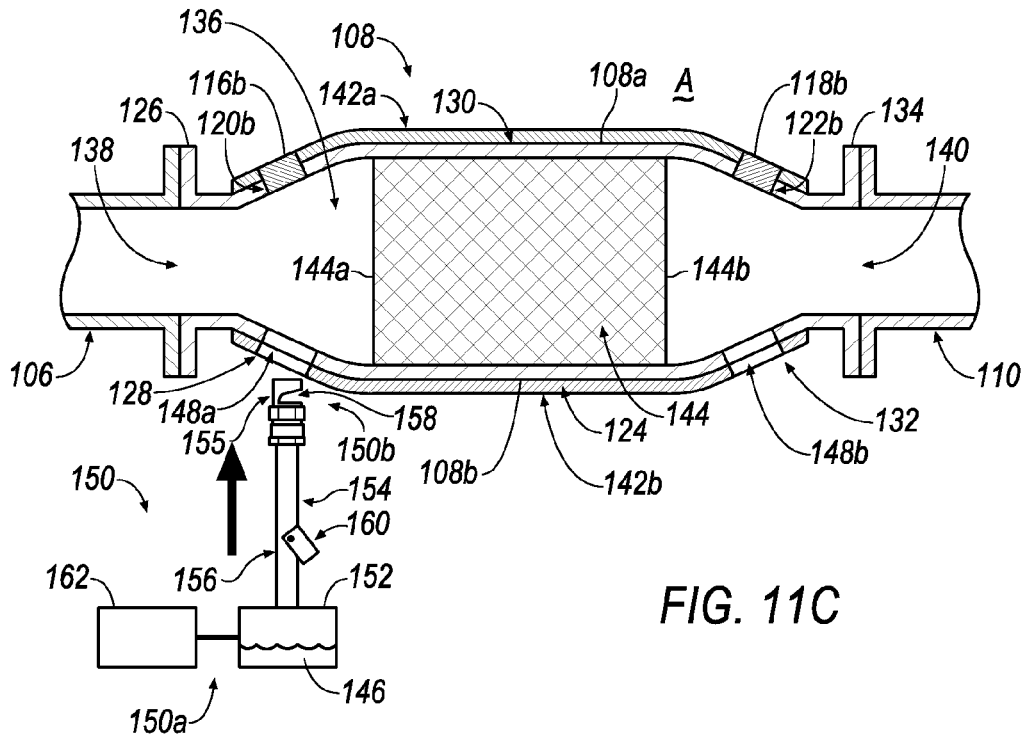
Figure 11D:
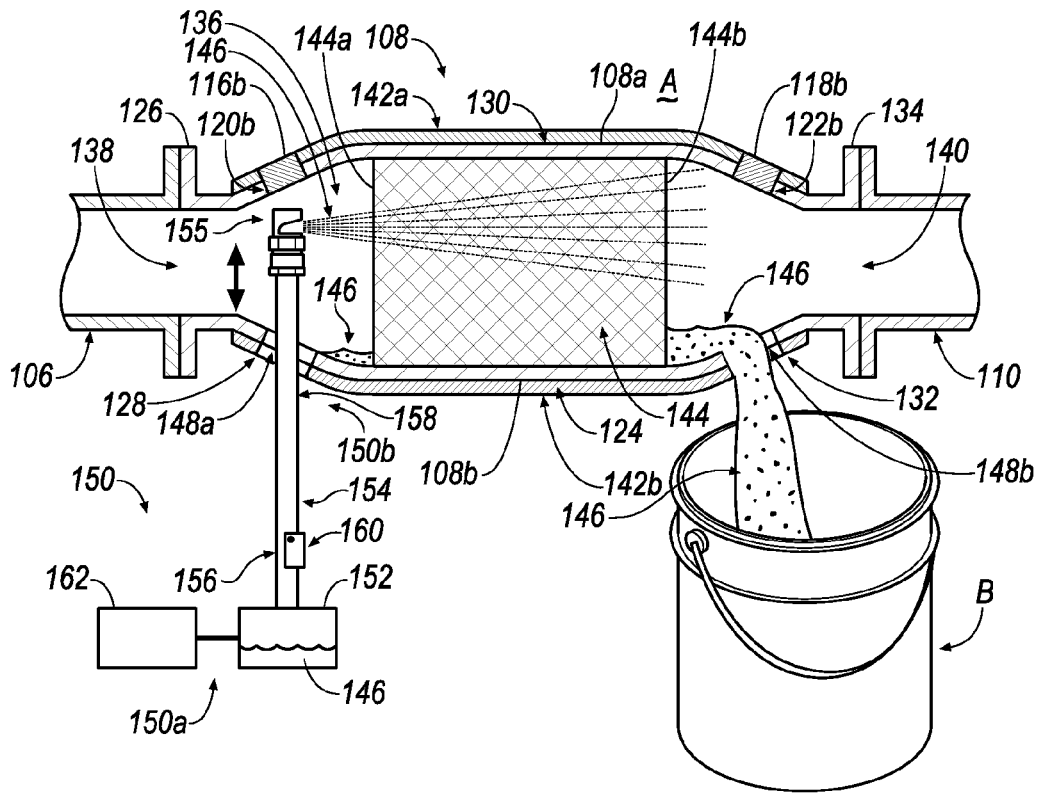
Figure 11E:
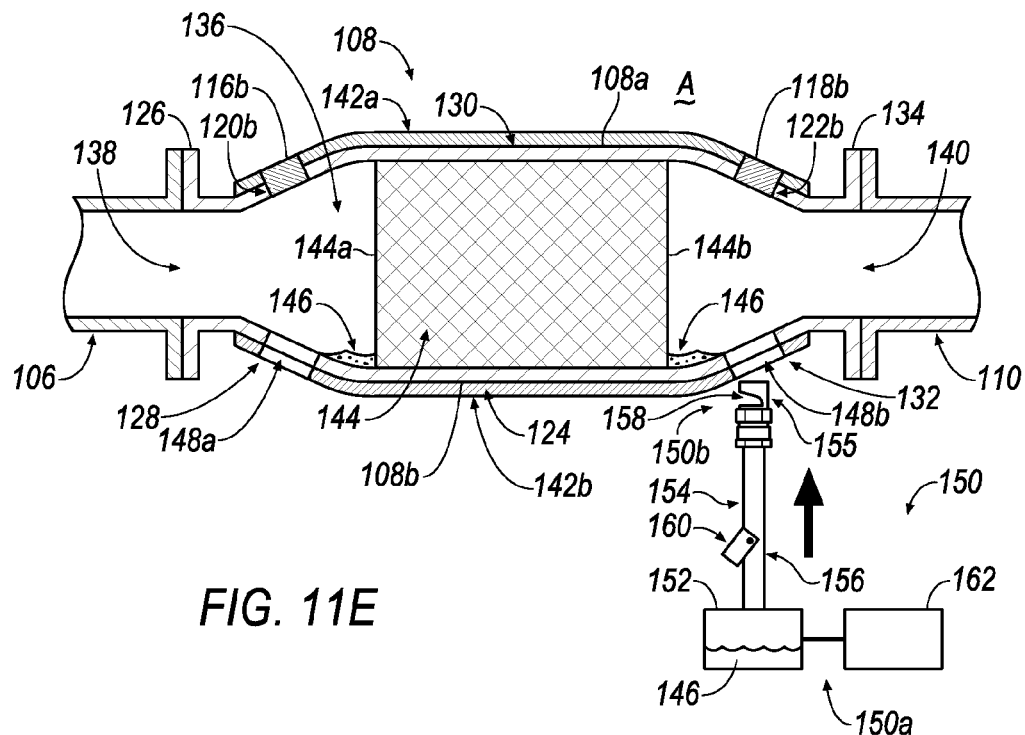
Figure 11F:
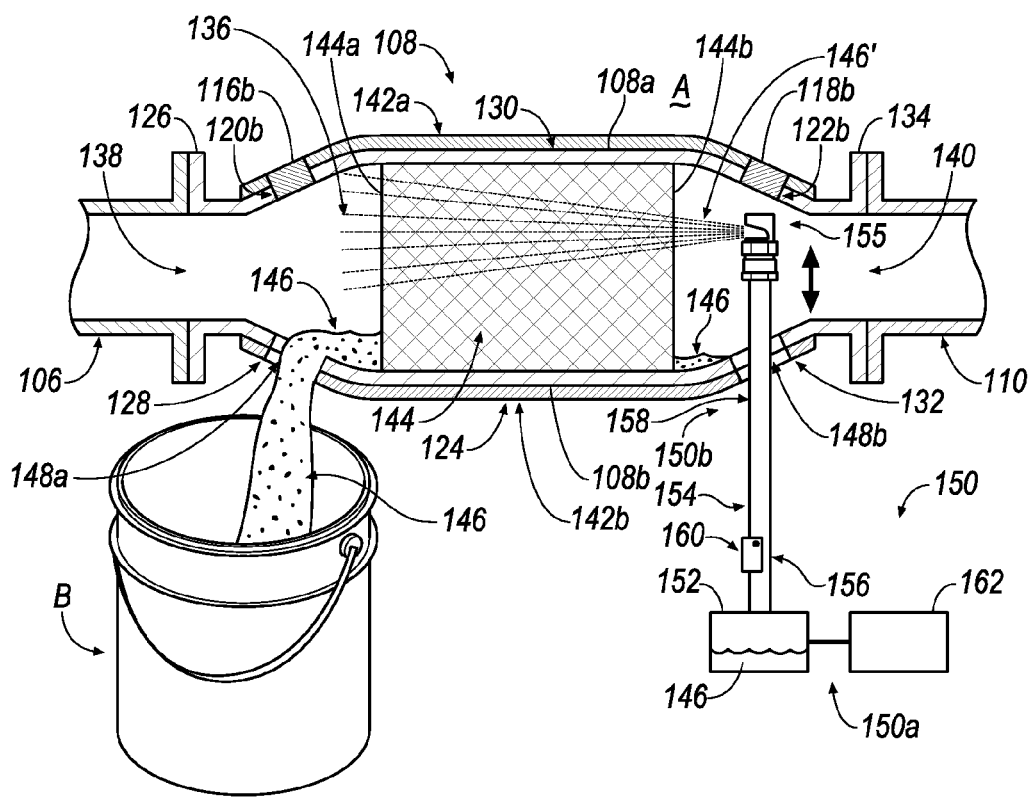

As seen in FIGS. 11C-11D, the servicing agent/owner, A/O, of the vehicle, V, may firstly insert the distal end 150b of dilute acidic solution dispensing system 150 into the first 'post-fabricated' opening 148a of the 'post-fabricated' at least two openings 148a, 148b for directing the dilute acidic solution 146 toward an upstream surface 144a of the honeycomb catalyst substrate 144. Then, as seen in FIGS. 11E-11F, the servicing agent/owner, A/O, of the vehicle, V, may secondly insert the distal end 150b of dilute acidic solution dispensing system 150 into the second 'post-fabricated' opening 148b of the 'post-fabricated' at least two openings 148a, 148b for directing the dilute acidic solution 146 toward a downstream surface 144b of the honeycomb catalyst substrate 144.

As seen in FIG. 11D, when the distal end 150b of dilute acidic solution dispensing system 150 is inserted into the first 'post-fabricated' opening 148a such that the dilute acidic solution 146 is directed directly toward the upstream surface 144a of the honeycomb catalyst substrate 144, the servicing agent/owner, A/O, of the vehicle, V, may arrange a container or discharge bucket, B, under the second 'post-fabricated' opening 148b in order to catch the dilute acidic solution 146 that is directed through the honeycomb catalyst substrate 144 by firstly entering the upstream surface 144a of the honeycomb catalyst substrate 144 and secondly exiting the downstream surface 144b of the honeycomb catalyst substrate 144. As seen in FIG. 11F, when the distal end 150b of dilute acidic solution dispensing system 150 is inserted into the second 'post-fabricated' opening 148b such that the dilute acidic solution 146 is directed directly toward the downstream surface 144b of the honeycomb catalyst substrate 144, the servicing agent/owner, A/O, of the vehicle, V, may arrange a container or discharge bucket, B, under the first 'post-fabricated' opening 148a in order to catch the dilute acidic solution 146 that is directed through the honeycomb catalyst substrate 144 by firstly entering the downstream surface 144b of the honeycomb catalyst substrate 144 and secondly exiting the upstream surface 144a of the honeycomb catalyst substrate 144.

Because the first and second 'post-fabricated' openings 148a, 148b are formed in the lower surface 108b of the body 124 of the catalytic converter 108, the dilute acidic solution 146 (and contaminates removed from the honeycomb catalyst substrate 144) may escape the body 124 of the catalytic converter 108 with the assistance of gravity. Additionally, by preparing the 'post-fabricated' at least two openings 148a, 148b (as opposed to the 'pre-fabricated' at least one opening 148 described above), the honeycomb catalyst substrate 144 may be 'double washed' in two directions being a downstream direction (as seen in FIG. 11D) and an upstream direction (as seen in FIG. 11F).

The dispenser 154 that is formed by distal end 150b of the dilute acidic solution dispensing system 150 may be defined by a nozzle 155 of an elongated fluid-dispensing wand 156. The nozzle 155 may have an orifice size of approximately about 0.12" in order to dispense the dilute acidic solution 146 as a fine mist.

The nozzle 155 may include a right-angle spray deflector 158 for directing the dilute acidic solution 146 in a particular direction. The fluid-dispensing wand 156 may also include an actuating handle 160 that permits the servicing agent/owner, A/O, of the vehicle, V, to selectively dispense the dilute acidic solution 146 from the nozzle 155. When the vehicle, V, is arranged upon a lift, L (as seen in, e.g., FIG. 6), or, alternatively, when the vehicle, V, is arranged over a servicing pit, P (not shown), the servicing agent/owner, A/O, of the vehicle, V, may be located under the exhaust system 100, and, therefore, may easily insert the distal end 150b of the dilute acidic solution dispensing system 150 into the 'post-fabricated' at least one opening 148 that is formed in the lower surface 108b of the body 124 of the catalytic converter 108.

The proximal end 150a of the dilute acidic solution dispensing system 150 may include a positive pressure source 162 that is fluidly-connected to the source, reservoir or container 152 of the dilute acidic solution 146. The positive pressure source 162 may include, for example, a shop air source (e.g., an air line supplying regulated air pressure at 30-60 psi), or, alternatively, a manually-operated pump that pressurizes the source, reservoir or container 152 of the dilute acidic solution 146 in order to force the dilute acidic solution 146 through the fluid-dispensing wand 156 and out of the nozzle 155 as described above. In an embodiment, the actuating handle 160 may open or close a valve (not shown) disposed in the fluid-dispensing wand 156; when the valve is arranged in the open orientation, the positive pressure source 162 may force the dilute acidic solution 146 out of the nozzle 155 (as seen in, e.g., FIGS. 11D and 11F), and, conversely, when the valve is arranged in the closed orientation, the dilute acidic solution 146, which is pressurized by the positive pressure source 162, is not permitted to be expelled from the nozzle 155 (as seen in, e.g., FIGS. 11C and 11E).

The dilute acidic solution dispensing device 150 may commercially available from MCMASTER-CARR® and sold as Model 7044T42. The nozzle 155 may be commercially available from MCMASTER-CARR® and sold as Model 30995K15.

The cleaning method performed by the dilute acidic solution dispensing device 150 may be conducted for a predetermined period of time deemed effective for cleaning a particular type of catalytic converter 108, or, alternatively, a longer time period considered generally suitable for any catalytic converter 108. The cleaning operation performed by the dilute acidic solution dispensing device 150 may be verified using a gas analyzer, GA (see, e.g., FIG. 13). The gas analyzer, GA, may be, for example, a five-gas analyzer that is commercially available from Snap-On Tools and sold as model HHGA5BP. The gas analyzer, GA, may be fluidly-connected to the exhaust system 100 by, for example, by inserting a sample probe, P, of the gas analysis, GA, into the tailpipe 114 of the exhaust system 100 in order to detect an acceptable, predetermined exhaust gas level (e.g., a predetermined level of hydrocarbons (HC), carbon monoxide (CO), and/or oxides of nitrogen ($NO_x$)) when the engine, E, is keyed-on. Accordingly, the step of introducing the dilute acidic solution 146 into the catalytic converter 108 may be repeated until the gas analyzer, GA, detects a predetermined exhaust gas level.

In another embodiment, the gas analyzer, GA, may be utilized for determining if the first and second close-out members 175a, 175b seals the 'post-fabricated' first and second openings 148a, 148b that are formed in the lower surface 108b of the body 124 of the catalytic converter 108. Referring to FIG. 13, in an example, a heat-resistant flexible tube 250 formed by, for example, a silicone material may be fluidly-connected to the gas analyzer by a hose 252. The heat-resistant flexible tube 250 may be placed adjacent the lower surface 108b of the body 124 of the catalytic converter 108 and circumferentially about the first and second close-out members 175a, 175b for fluidly-isolating the 'post-fabricated' first and second openings 148a, 148b and the first and second close-out members 175a, 175b from the surrounding atmosphere. After keying-on the engine, E, if an exhaust leak occurs about one or more of the close-out members 175a, 175b, the heat-resistance flexible tube 250 may isolate the exhaust leak which may then be detected by the gas analyzer, GA.

Referring to FIGS. 11G-11J, a dilute acidic solution flushing system 150' is shown according to an embodiment. The dilute acidic solution flushing system 150' may be substantially similar to the dilute acidic solution dispensing system 150 as described above with the exception that the source, reservoir or container 152' of the dilute acidic solution flushing system 150' does not include the dilute acidic solution 146, but, rather, includes a flushing medium/fluid 146', such as, for example, water (i.e., a fluid, such as water, is utilized for flushing the dilute acidic solution 146 and contaminates off of the honeycomb catalyst substrate 144). In some implementations, however, the source, reservoir or container 152' of the dilute acidic solution flushing system 150' may be omitted and the fluid (e.g., air) of the positive pressure source 162 (e.g., a shop air source) may be utilized for flushing the dilute acidic solution 146 and contaminates off of the honeycomb catalyst substrate 144.

Figure 11G:
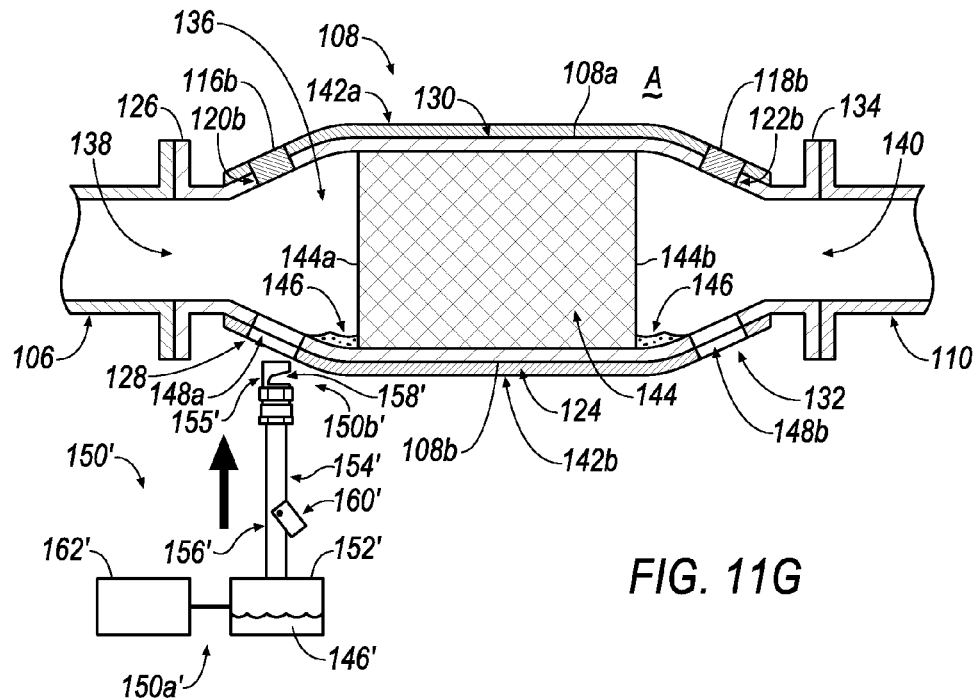
Figure 11H:
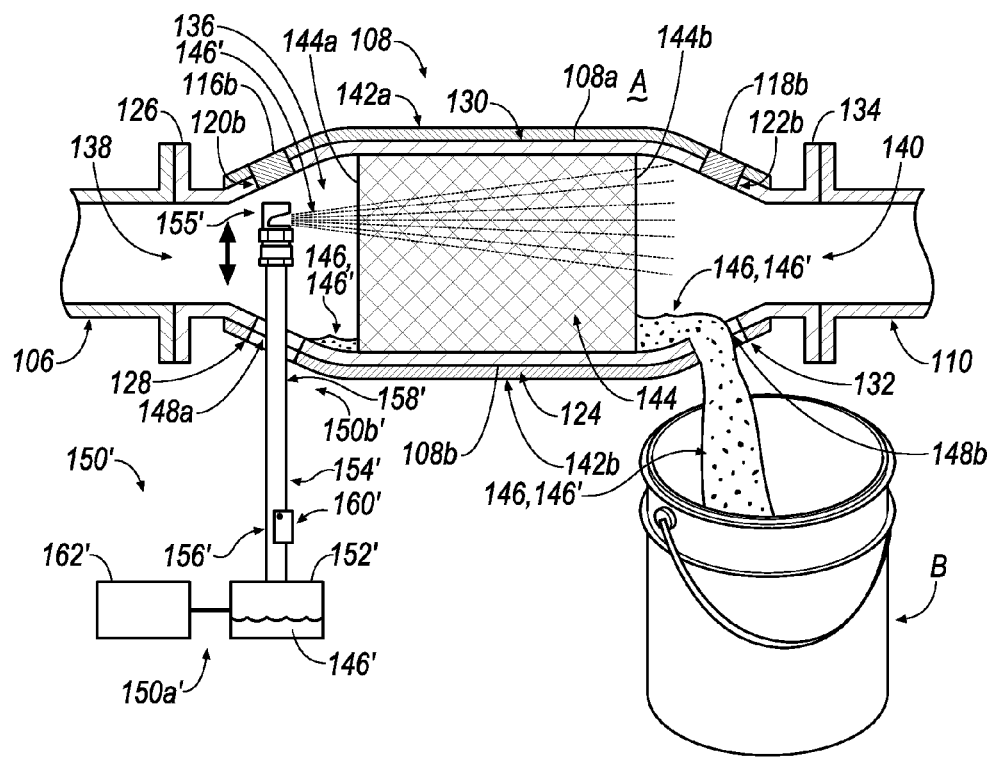
Figure 11I:
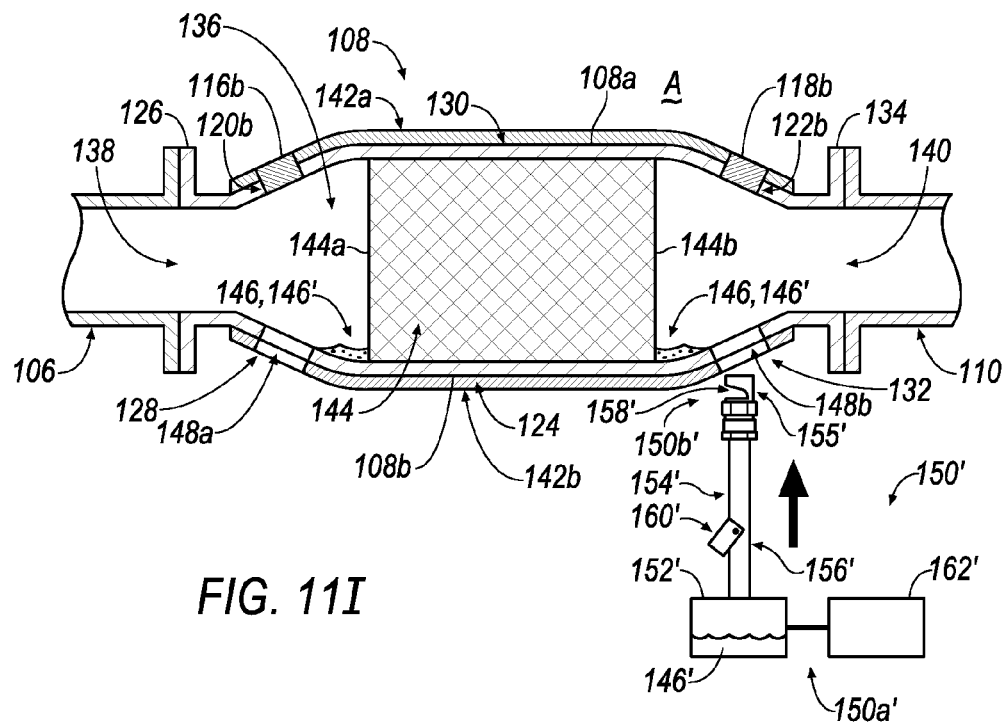
Figure 11J:
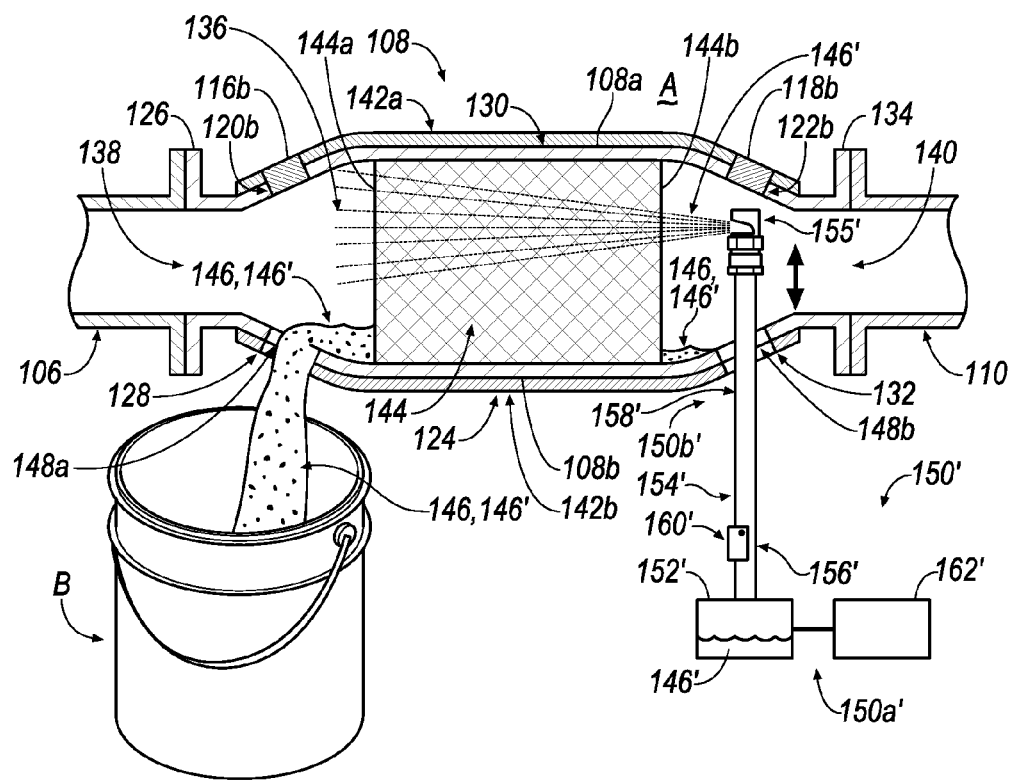

With reference to FIGS. 11G-11J, in a substantially similar manner as described above at FIGS. 11C-11F, when the vehicle, V, is arranged upon a lift, L (as seen in, e.g., FIG. 6), or, alternatively, when the vehicle, V, is arranged over a servicing pit, P (not shown), the servicing agent/owner, A/O, of the vehicle, V, may be located under the exhaust system 100, and, therefore, may easily firstly (as seen in FIGS. 11G-11H)

insert a distal end 150*b*' of the dilute acidic solution flushing system 150' into the first 'post-fabricated' opening 148*a* of the 'post-fabricated' at least two openings 148*a*, 148*b* that is formed in the lower surface 108*b* of the body 124 of the catalytic converter 108. Then, the servicing agent/owner, A/O, of the vehicle, V, may easily secondly (as seen in FIGS. 11I-11J) insert the distal end 150*b*' of the dilute acidic solution flushing system 150' into the second 'post-fabricated' opening 148*b* of the 'post-fabricated' at least two openings 148*a*, 148*b* that is formed in the lower surface 108*b* of the body 124 of the catalytic converter 108. Upon the servicing agent/owner, A/O, of the vehicle, V, actuating the actuating handle 160' of the dilute acidic solution flushing system 150', the actuating handle 160' may open or close a valve (not shown) disposed in the fluid-dispensing wand 156'; when the valve is arranged in the open orientation, the positive pressure source 162' may force the flushing medium 146' out of the nozzle 155' (as seen in FIGS. 11H, 11J), and, conversely, when the valve is arranged in the closed orientation, the flushing medium 146', which is pressurized by the positive pressure source 162', is not permitted to be expelled from the nozzle 155' (as seen in FIGS. 11G, 11I). Upon the flushing medium 146' being directed through the passage 136 formed by the housing portion 130 of the body 124 of the catalytic converter 108, the flushing medium 146' may remove the earlier-dispensed dilute acidic solution 146 and the contaminates from the honeycomb catalyst substrate 144.

In a substantially similar manner as described above, the servicing agent/owner, A/O, of the vehicle, V, may arrange the container or discharge bucket, B, under the first 'post-fabricated' opening 148*a* (as seen in FIG. 11H) and the second 'post-fabricated' opening 148*b* (as seen in FIG. 11J) in order to catch the flushing medium 146' and the dilute acidic solution 146 (and contaminates removed from the honeycomb catalyst substrate 144) that is directed through the honeycomb catalyst substrate 144. Further, as similarly explained above, because the first and second 'post-fabricated' openings 148*a*, 148*b* are formed in the lower surface 108*b* of the body 124 of the catalytic converter 108, the flushing medium 146' and the dilute acidic solution 146 (and contaminates removed from the honeycomb catalyst substrate 144) may escape the body 124 of the catalytic converter 108 with the assistance of gravity. Additionally, by preparing the 'post-fabricated' at least two openings 148*a*, 148*b* (as opposed to the 'pre-fabricated' at least one opening 148 described above), the honeycomb catalyst substrate 144 may be 'double flushed' in two directions being a downstream direction (as seen in FIG. 11D) and an upstream direction (as seen in FIG. 11F).

Figure 11K:
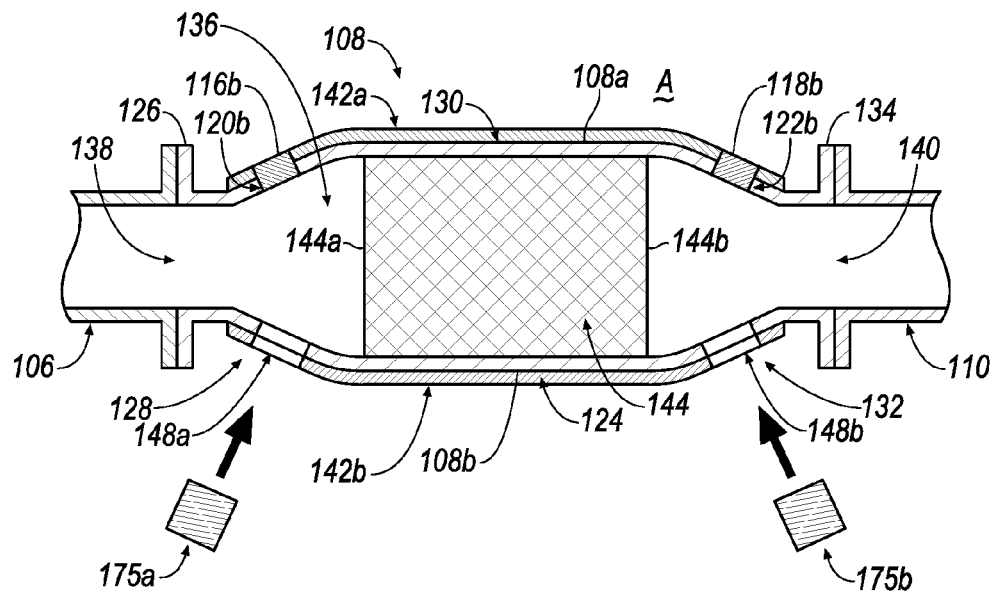
Figure 11L:
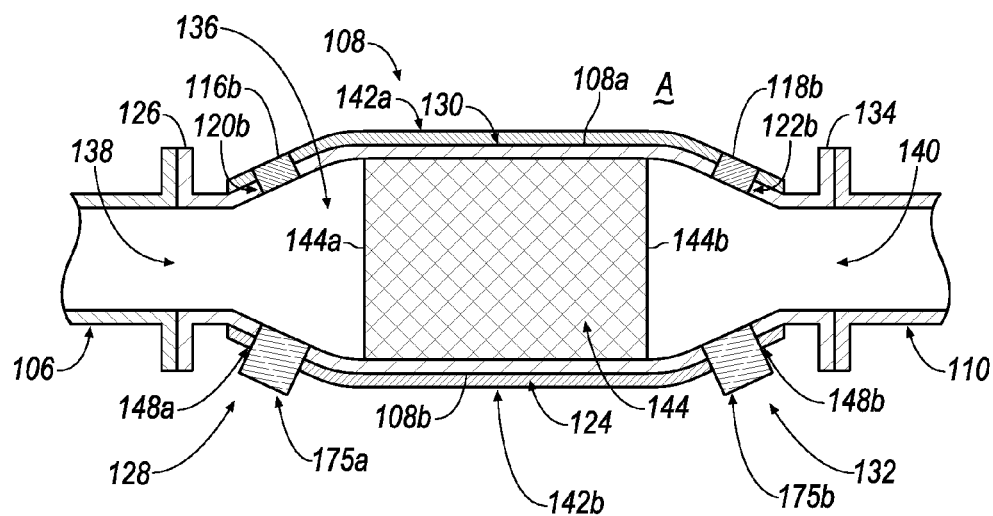

Referring to FIGS. 11K-11L, once the step of flushing the dilute acidic solution 146 and contaminates from the honeycomb catalyst substrate 144 with the flushing medium 146' is complete, the servicing agent/owner, A/O, of the vehicle, V, may close-out the 'post-fabricated' at least two openings 148*a*, 148*b* of the body 124 of the catalytic converter 108 by disposing a first close-out member 175*a* of at least two close-out members 175*a*, 175*b* in the first 'post-fabricated' opening 148*a* and a second close-out member 175*b* of the at least two close-out members 175*a*, 175*b* in the second 'post-fabricated' opening 148*b*. Each of the first and second close-out members 175*a*, 175*b* may include a material that is resistant to, for example, road debris, salt, sand, rocks and the like while also being suitable for withstanding automotive heat cycles while sealing exhaust fumes (resulting from, for example, approximately 3 psi of internal exhaust pressure) contained within the fluid-flow passage 136. In an implementation each of the first and second close-out members 175*a*, 175*b* may be a 'swaging nut' that is commercially available from MCMASTER-CARR® and sold under the trade-name 'A-T Series Insert.' In another implementation, the first and second close-out members 175*a*, 175*b* may each be a knurled threaded insert commercially available from AVK Industrial Products and sold as model number ATC2-813; an installation tool sold as model number AAT916-813 commercially available from AVK Industrial Products may be utilized for swaging the knurled threaded inserts 175*a*, 175*b* into the 'post-fabricated' at least two openings 148*a*, 148*b*. In the event that the catalytic converter 108 has to be re-serviced at a later time in a substantially similar manner as described above, the first and second close-out member 175*a*, 175*b* may be selectively removed from the first and second 'post-fabricated' openings 148*a*, 148*b* in order to permit one or more of the dilute acidic solution dispensing system 150 and the dilute acidic solution flushing system 150' to remove contaminates from the honeycomb catalyst substrate 144 in a subsequent cleaning process.

During or after the step of applying the dilute acidic solution 146 upon the honeycomb catalyst substrate 144 with the dilute acidic solution dispensing system 150, or, alternatively, before, during or after the step of flushing the dilute acidic solution 146 from the honeycomb catalyst substrate 144 with the flushing medium 146' of the dilute acidic solution flushing system 150', the dilute acidic solution 146 and/or the flushing medium 146' may be removed from the exhaust system 100 in a fluid removal step. Referring to FIG. 9, in an embodiment, the fluid removal step may be conducted by a vacuum source 164. If desired, the fluid removal step conducted by the vacuum source 164 may be alternatively conducted after the first or second 'post-fabricated' openings 148*a*, 148*b* of the body 124 of the catalytic converter 108 are closed-out by the first and second close-out members 175*a*, 175*b*; by closing-out the first or second 'post-fabricated' openings 148*a*, 148*b* with the first and second close-out members 175*a*, 175*b*, a vacuum imparted to the exhaust system 100 by the vacuum source 164 will be greater due to the fact that ambient air, from the surrounding atmosphere, A, will not be pulled into the first or second 'post-fabricated' openings 148*a*, 148*b* due to the fact that the first and second close-out members 175*a*, 175*b* seal the body 124 of the catalytic converter 108 from the surrounding atmosphere, A.

The vacuum source 164 may be attached to the tailpipe 114 of the exhaust system 100 such that the vacuum source 164 may be fluidly-connected to the distal, downstream end 100*b* of the exhaust system 100. In an embodiment, the vacuum source 164 may be attached to the tailpipe 114 by a heat-resistant connector 166 and a hose 168. The vacuum source 164 may be commercially sold under the trade-name, a SHOP-VAC®, and may include, for example, a stainless steel tank that receives one or more of the dilute acidic solution 146 and/or the flushing medium 146' that is pulled, by way of a vacuum applied by the vacuum source 164, from the catalytic converter 108, the third pipe portion 110, the muffler 112 and then the tailpipe 114.

The heat-resistant tailpipe connector 166 may be formed by a silicone material in the form of a cylindrical or oval sleeves that frictionally-attaches to the tailpipe 114. In some instances, if a vehicle, V, has been driven for a period of time prior to being arranged upon a lift, L (as seen in, e.g., FIG. 6), or, alternatively, over a servicing pit, P (not shown), the catalytic converter 108 may be heated to a temperature that would delay the contaminate removal process associated with the application of the dilute acidic solution 146 upon the honeycomb catalyst substrate 144; additionally, the tailpipe 114 may be heated in a substantially similar manner. Accordingly, the heat-resistant tailpipe connector 166 is formed from a material that will thermally insulate the hose 168 from the tailpipe 114 if the tailpipe 114 is heated. The cross-section of the heat-resistant tailpipe connector 166 may be any desirable shape that corresponds to the geometry of the tailpipe 114; accordingly, in some circumstances, the heat-resistant tailpipe connector 166 may be sized to a fixed dimension that corresponds to a specific tailpipe 114 of a specific vehicle, V, or, alternatively, the heat-resistant tailpipe connector 166 may be adjustable in order to 'universally' correspond to tailpipes 114 of different sizes.

The hose 168 may fluidly-connect the heat-resistant tailpipe connector 166 to the vacuum source 164. The hose 168 may be formed from a rubber or plastic material and include, for example, a corrugated body. In some implementations, the hose 168 may be transparent in order for the servicing agent/owner, A/O, of the vehicle, V, to inspect the amount of dilute acidic solution 146 and/or the flushing medium 146' being drawn from the exhaust system 100 and into the stainless steel tank of the vacuum source 164.

Referring to FIG. 10, a fluid removal step may be performed after the first and second 'post-fabricated' openings 148a, 148b of the body 124 of the catalytic converter 108 are closed-out by the first and second close-out members 175a, 175b in order to remove the dilute acidic solution 146 and/or the flushing medium 146' from the exhaust system 100. In some implementations, the fluid removal step of FIG. 10 may be performed after the fluid removal step is performed by the vacuum source 164 as described above. The purpose of utilizing the fluid removal step of FIG. 10 after performing the fluid removal step of FIG. 9 is to flush out a remainder of the dilute acidic solution 146 and/or the flushing medium 146' that is contained by the catalytic converter as seen in, for example, FIG. 11L.

The fluid removal step of FIG. 10 may be performed by keying-on the engine, E. In an example, the exhaust gas produced by the engine, E, may 'push' the dilute acidic solution 146 and/or the flushing medium 146' downstream through the exhaust system 100 such that the dilute acidic solution 146 and/or the flushing medium 146' are expelled through the catalytic converter 108, the third pipe portion 110, the muffler 112 and out of the tailpipe 114. Although some implementations may utilize the engine, E, for removing the dilute acidic solution 146 and/or the flushing medium 146' from the exhaust system 100 after the vacuum source 164 has removed the dilute acidic solution 146 and/or the flushing medium 146', some implementations for removing the dilute acidic solution 146 and/or the flushing medium 146' from the exhaust system 100 may be conducted by utilizing the engine, E, alone without using the vacuum source 164. In some implementations, the engine, E, may be ran above idle speed in order to discharge exhaust gas with an adequate amount of force for removing the dilute acidic solution 146 and/or the flushing medium 146' from the exhaust system 100.

When the engine, E, is utilized for discharging the dilute acidic solution 146 and/or the flushing medium 146' from the exhaust system 100, the servicing agent/owner, A/O, of the vehicle, V, may fluidly-connect a discharge bucket 170 (which may be the same discharge bucket, B, described above in FIGS. 11D, 11F, 11H and 11J) to the tailpipe 114. In an implementation, the discharge bucket 170 may be attached to the tailpipe 114 by, for example, one or more of a tailpipe connector 172, a hose portion 174 and an elbow portion 176. In some implementations, the discharge bucket 170 may include a cover 178 having a first opening 180 that is fluidly-connected to one or more of the tailpipe connector 172, the hose portion 174 and the elbow portion 176. The cover 178 may also include a second opening 182 that permits the discharge bucket 170 to be vented to atmosphere, A. In some implementations, the discharge bucket 170 may also include one or more clamps 184 for removably-securing the cover 178 to the body 186 of the discharge bucket 170. In some instances, the body 186 of the discharge bucket 170 may be formed from a relatively heavy material in order to maintain the discharge bucket 170 in an upright orientation. In other instances, a weight 188 may be arranged within the body 186 of the discharge bucket 170 for maintain the discharge bucket 170 in an upright orientation.

Irrespective of the method for removing the dilute acidic solution 146 and/or the flushing medium 146' from the exhaust system 100 (i.e., by way of the vacuum source 164 as seen in FIG. 9 or by keying-on the engine, E, as seen in FIG. 10), the dilute acidic solution 146 and/or the flushing medium 146' are neutralized prior to disposal. In an implementation, the dilute acidic solution 146 and/or the flushing medium 146' may be neutralized by mixing the dilute acidic solution 146 and/or the flushing medium 146' with a neutralizing medium, NM (see, e.g., FIG. 14) that is disposed within a first container, C1 (see, e.g., FIG. 14). The neutralizing medium, NM, may include, for example, baking soda, soda ash (e.g., CAS No. 497-19-8), alkaline powder or the like.

A predetermined amount of oxalic acid in powder form, AP (see, e.g., FIG. 14), for making the dilute acidic solution 146 that is utilized for cleaning the catalytic converter 108 as described above may be supplied in a second container, C2 (see, e.g., FIG. 14). The oxalic acid in powder form, AP, may be mixed with approximately about two-to-four gallons of water in the source, reservoir or container 152 of the dilute acidic solution dispensing system 150 in order to prepare dilute acidic solution 146. The two-to-four gallons of water may be distilled or purified by using, for example, a reverse osmosis filter. The amount (e.g., two-to-four gallons) of water may be dependent upon the number of catalytic converters 108 to be cleaned by the servicing agent/owner, A/O, of the vehicle, V (i.e., some vehicles, V, may have one or two catalytic converters 108). In an implementation, two gallons of water may be sufficient for cleaning one catalytic converter 108. The amount (by weight) of the oxalic acid in powder form, AP, to be mixed with the water may be equal to approximately about five-one-hundredths (0.05) of the weight of the amount of water.

Referring to FIG. 14, the first container, C1, including the neutralizing medium, NM, and the second container, C2, including the predetermined amount of oxalic acid in powder form, AP, may be included in a kit, K. The kit, K, may be bundled (i.e., enclosed together) in an enclosure, EN (e.g., a box, shrink-wrap film bag or the like).

Although an exemplary kit, K, is described above, the kit, K, is not limited to including the first container, C1, including the neutralizing medium, NM, and the second container, C2, including the predetermined amount of oxalic acid in powder form, AP. For example, the kit, K, may include any of the components described above that are interfaced with the exhaust system 100. In one example, the kit, K, may include one or more of: one or a plurality of close-out member(s) 175, 175a, 175b, the heat-resistant connector 166, the discharge bucket 170, the tailpipe connector 172, the hose portion 174 and the elbow portion 176, the cover 178 and the weight 188. In some implementations, the kit, K, could also include the drill, D, the dilute acidic solution dispensing system 150, the dilute acidic solution flushing system 150' and the vacuum source 164.

In an optional step, the dilute acidic solution flushing system 150' may be utilized in a substantially similar manner as described above prior to the introduction of the dilute acidic solution 146 by the dilute acidic solution dispensing system 150. In some instances, if a vehicle, V, has been driven for a period of time prior to being arranged upon a lift, L (as seen in, e.g., FIG. 6), or, alternatively, over a servicing pit, P (not shown), the catalytic converter 108 may be heated to a temperature that would delay the contaminate removal process associated with the application of the dilute acidic solution 146 upon the honeycomb catalyst substrate 144. Therefore, if the flushing medium 146' of the dilute acidic solution flushing system 150' is water, the water 146' may be utilized in a preliminary step for the purpose of cooling the honeycomb catalyst substrate 144 of the catalytic converter 108; once the honeycomb catalyst substrate 144 of the catalytic converter 108 has been sufficiently cooled, the dilute acidic solution dispensing system 150 may be utilized for applying the dilute acidic solution 146 to the honeycomb catalyst substrate 144. In an implementation, a temperature sensor (not shown), such as for example, a thermocouple or thermistor, an infrared temperature sensor, or the like may be temporarily attached to one or more of the upper surface 108a and/or the lower surface 108b of the catalytic converter 108, and, the application of the water 146' by the dilute acidic solution flushing system 150' may be performed until the temperature sensor indicates a predetermined temperature (e.g., approximately about 140° F.) of the catalytic converter 108 has been reached. In some implementations, the temperature sensor may be held by hand against the catalytic converter 108, or, alternatively, the temperature sensor may be attached to the catalytic converter 108 with, for example, a VELCRO® strap (not shown). An exemplary temperature sensor may be sold under the trade name Fluke 54 II B.

As a result of post-fabricating' the 'post-fabricated' at least one opening 148 in the body 124 of the catalytic converter 108, the catalytic converter 108 may be serviced without removing and disconnecting the catalytic converter 108 from the exhaust system 100 such that the catalytic converter 108 is permitted to be cleaned while remaining installed on the vehicle, V. Further, by post-fabricating the 'post-fabricated' at least two openings 148a, 148b in the lower surface 108b of the body 124 of the catalytic converter 108, accessibility to the fluid-flow passage 136 extending through the body 124 of the catalytic converter 108 is improved when, for example, a servicing agent/owner, A/O, of the vehicle, V, is located under the vehicle, V, when the vehicle, V, is arranged upon a lift, L (as seen in, e.g., FIG. 6), or, alternatively, when the vehicle, V, is arranged over a servicing pit, P (not shown).

Further, although the at least two openings 148a, 148b formed in the lower surface 108b of the catalytic converter 108 are described as being 'post-fabricated,' the 'post-fabricated' at least two openings 148a, 148b is not limited to being formed in such a fashion. For example, the at least two openings 148a, 148b formed in the lower surface 108b of the catalytic converter 108 may be formed by the manufacturer of the catalytic converter 108, or, alternatively, the at least two openings 148a, 148b formed in the lower surface 108b of the catalytic converter 108 may be formed by the OEM before the vehicle, V, has been released by the OEM. Accordingly, in such an implementation, the at least two openings 148a, 148b formed in the lower surface 108b of the catalytic converter 108 may be referred to as 'pre-fabricated' at least two openings 148a, 148b (i.e., the at least two openings are not formed in an 'after-market' environment by, for example, a servicing agent or owner, A/O (see, e.g., FIG. 6), of the vehicle, V); in an implementation, the at least one opening 148 formed in the lower surface 108b of the catalytic converter 108 may be pre-fabricated in any desirable manner such as, for example:

drilling, welding, casting, molding, stamping or the like. In the event that the at least two openings 148a, 148b are 'pre-fabricated' as described above, the manufacturer of the catalytic converter 108 or the OEM may pre-dispose the at least two close-out members 175a, 175b in the 'pre-fabricated' at least two openings 148a, 148b. Therefore, the step of removing material from the lower surface 108b of the body 124 of the catalytic converter 108 by utilizing, for example, a drill, D, for forming the at least two openings 148a, 148b in an after-market modification step by a servicing agent or owner, A/O (see, e.g., FIG. 6), of the vehicle, V, may be omitted. In the implementation either of 'pre-fabricating' the at least two openings 148a, 148b as described above, the 'pre-fabricated' at least two openings 148a, 148b are not the ports 120b, 122b that supportably-receives the first, upstream oxygen sensor 116b and the second, downstream oxygen sensor 118b, and, further, either of the at least two close-out members 175a, 175b are not the first, upstream oxygen sensor 116b and the second, downstream oxygen sensor 118b.

Figure 12A:
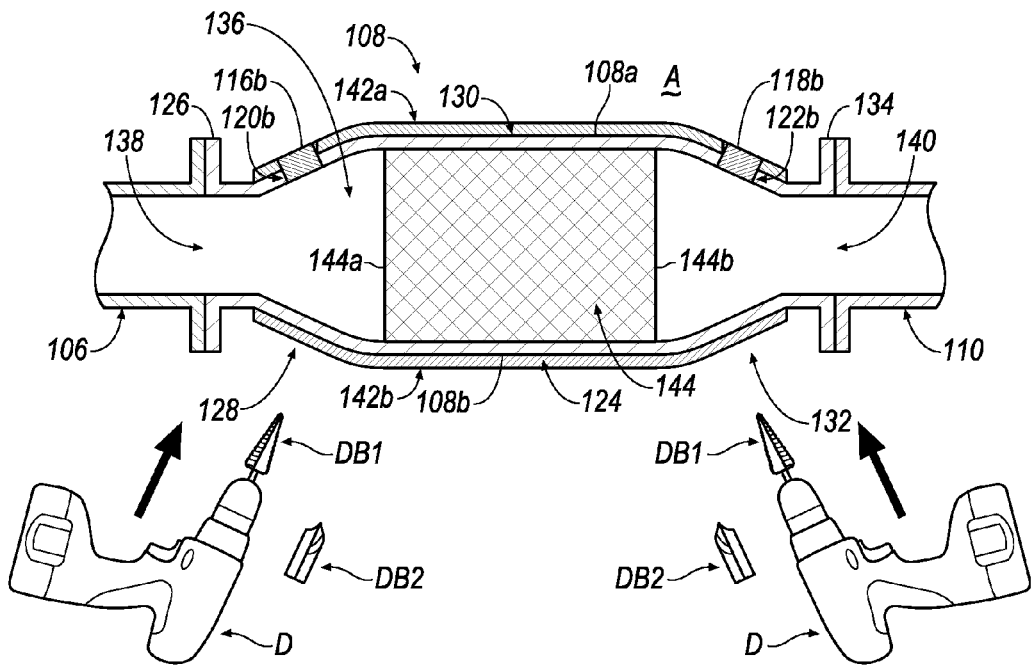
FIG. 12A is a cross-sectional view of the catalytic converter according to line 12A-12A of FIG. 7C but may alternatively be any of FIG. 7A, 7B or 7D.

Referring to FIGS. 12A-12J, another embodiment for removing contaminates from the honeycomb catalyst substrate 144 disposed within the fluid-flow passage 136 formed by the housing portion 130 of the body 124 of the catalytic converter 108 is described. Firstly, referring to FIG. 12A, the fluid-flow passage 136 may extend through the body 124 of the catalytic converter 108. Besides the catalytic converter 108, the fluid-flow passage 136 also extends through all of the components 102-106, 110-114 of the exhaust system 100. As seen in FIG. 12A, the fluid-flow passage 136 is isolated from the surrounding atmosphere, A (except for the opening of the tailpipe 114 that defines the distal, downstream end 100b of the exhaust system 100).

Access to the fluid-flow passage 136 is permitted by an upstream opening 138 formed by the upstream connecting flange 126 and a downstream opening 140 formed by the downstream connecting flange 134. The upstream connecting flange 126 is coupled (e.g., welded, bolted or the like) and fluidly-coupled to the mid-pipe 106, and, the downstream connecting flange 134 is coupled (e.g., welded, bolted or the like) and fluidly-coupled to the third pipe portion 110.

An upper heat shield 142a (see also FIGS. 7A-7D) may be arranged upon the upper surface 108a of the catalytic converter 108, and, a lower heat shield 142b (see also FIGS. 7A-7D) may be arranged upon the lower surface 108b of the catalytic converter 108. A honeycomb catalyst substrate 144 may be disposed within the fluid-flow passage 136 formed by the housing portion 130 of the body 124 of the catalytic converter 108; the honeycomb catalyst substrate 144 reduces NOx emissions when the vehicle is operated.

After a prolonged use of the vehicle, V, the honeycomb catalyst substrate 144 may be coated and/or plugged with contaminants, which may result in the exhaust system 100 failing an emissions test. The contaminants may be removed from the honeycomb catalyst substrate 144 by introducing a cleaning solution 146 (e.g., a dilute acidic solution as seen in, e.g., FIG. 12D, 12F) into the passage 136 formed by the housing portion 130 of the body 124 of the catalytic converter 108 that contains the contaminated honeycomb catalyst substrate 144. An exemplary dilute acidic solution 146 may be made from oxalic acid, CAS No. 6153-56-6, which may be commercially available from Indian Oxalate Limited, Mumbai, India. An exemplary concentration level of the dilute acidic solution 146 that may be suitable for removing contaminants from the honeycomb catalyst substrate 144 may be approximately about 5-10%. While an oxalic acid is described above as exemplary acid that is utilized for preparing the dilute acidic solution 146, it will be appreciated that other acids may be utilizing for preparing the dilute acidic solution 146; for example, another type of acid that may be utilized for preparing the dilute acidic solution 146 may include, for example, an organic acid. An exemplary organic acid may include, for example, an acetic acid, a citric acid or the like. Other acids that may be utilized for preparing the dilute acidic solution 146 may include, for example, a sulphamic acid, a phosphoric acid or the like.

Figure 12B:
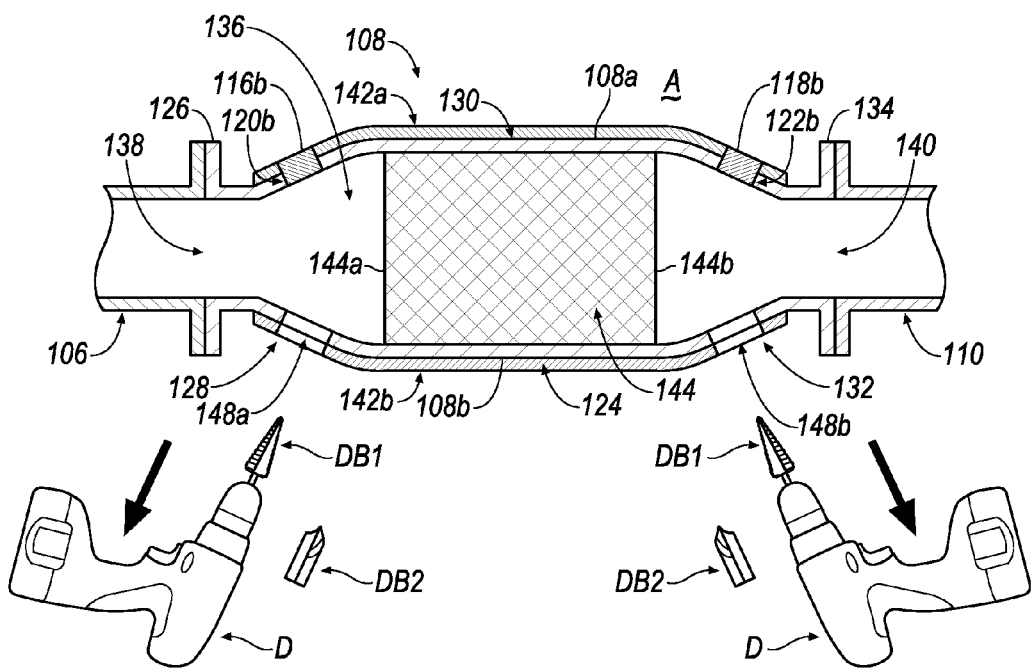
FIGS. 12B-12J are cross-sectional views illustrating a method for servicing the exemplary catalytic converter of FIG. 12A.

Referring to FIGS. 12A-12B, the dilute acidic solution 146 may be introduced into the passage 136 formed by the housing portion 130 of the body 124 of the catalytic converter 108 by 'post-fabricating' at least two openings 148a, 148b (see, e.g., FIG. 12B) in the body 124 of the catalytic converter 108. According to the embodiment shown at FIGS. 12A-12J, a first 'post-fabricated' opening 148a of the 'post-fabricated' at least two openings 148a, 148b is prepared at the upstream neck portion or transition portion 128 of the body 124 of the catalytic converter 108 such that the first 'post-fabricated opening 148a of the' 'post-fabricated' at least two openings 148a, 148b is located upstream of the honeycomb catalyst substrate 144. According to the embodiment shown at FIGS. 12A-12J, a second 'post-fabricated' opening 148b of the 'post-fabricated' at least two openings 148a, 148b is prepared at the downstream neck portion or transition portion 132 of the body 124 of the catalytic converter 108 such that the second 'post-fabricated' opening 148b of the 'post-fabricated' at least two openings 148a, 148b is located downstream of the honeycomb catalyst substrate 144.

The term, 'post-fabricating' may be defined as an act that occurs after the catalytic converter 108 has been released by the manufacturer of the catalytic converter 108. The term, 'post-fabricating' may alternatively be defined as an act that occurs after the vehicle, V, has been released by an original equipment manufacturer (OEM) that assembled the vehicle, V. Other definitions of the term, 'post-fabricating' may mean that the 'post-fabricated' at least two openings 148a, 148b are formed in an 'after-market' environment by, for example, a servicing agent or owner, A/O (see, e.g., FIG. 6), of the vehicle, V.

The 'post-fabricated' at least two openings 148a, 148b may be formed in the body 124 of the catalytic converter 108 by removing material from the lower surface 108b of the body 124 of the catalytic converter 108. Referring to FIGS. 6 and 12A-12B, an exemplary method for removing material from the lower surface 108b of the body 124 of the catalytic converter 108 is the utilization of a drill, D. In an example, the drill, D, may include a drill bit, DB1/DB2, having a diameter for 'post-fabricating' the at least two openings 148a, 148b; the 'post-fabricated' at least two openings may any diameter, and, in some implementations may be as small as approximately about 0.25" and as large as approximately about 0.75". In an example, the drill bit, DB1, may be a conical/tapered, step drill bit. In an example, the drill bit, DB2, may be a spotting, stubby drill bit.

The lower surface 108b of the body 124 of the catalytic converter 108 may be a preferable location for post-fabricating the 'post-fabricated' at least two openings 148a, 148b. As seen in, for example, FIG. 6, accessibility of the lower surface 108b of the body 124 of the catalytic converter 108 by the servicing agent or owner, A/O, (when the servicing agent or owner, A/O, is locate under the vehicle, V) is not impeded when, for example, the vehicle, V, is arranged upon a lift, L, or, alternatively, when the vehicle, V, is arranged over a servicing pit, P (not shown).

Referring to FIGS. 12C-12F, a dilute acidic solution dispensing system 150 is shown according to an embodiment. The dilute acidic solution dispensing system 150 includes a proximal end 150a and a distal end 150b. The proximal end 150a of the dilute acidic solution dispensing system 150 may include a source, reservoir or container 152 of the dilute acidic solution 146, and, the distal end 150b of the dilute acidic solution dispensing system 150 may include a dispenser 154 that dispenses the dilute acidic solution 146 into the passage 136 formed by the housing portion 130 of the body 124 of the catalytic converter 108.

Figure 12C:
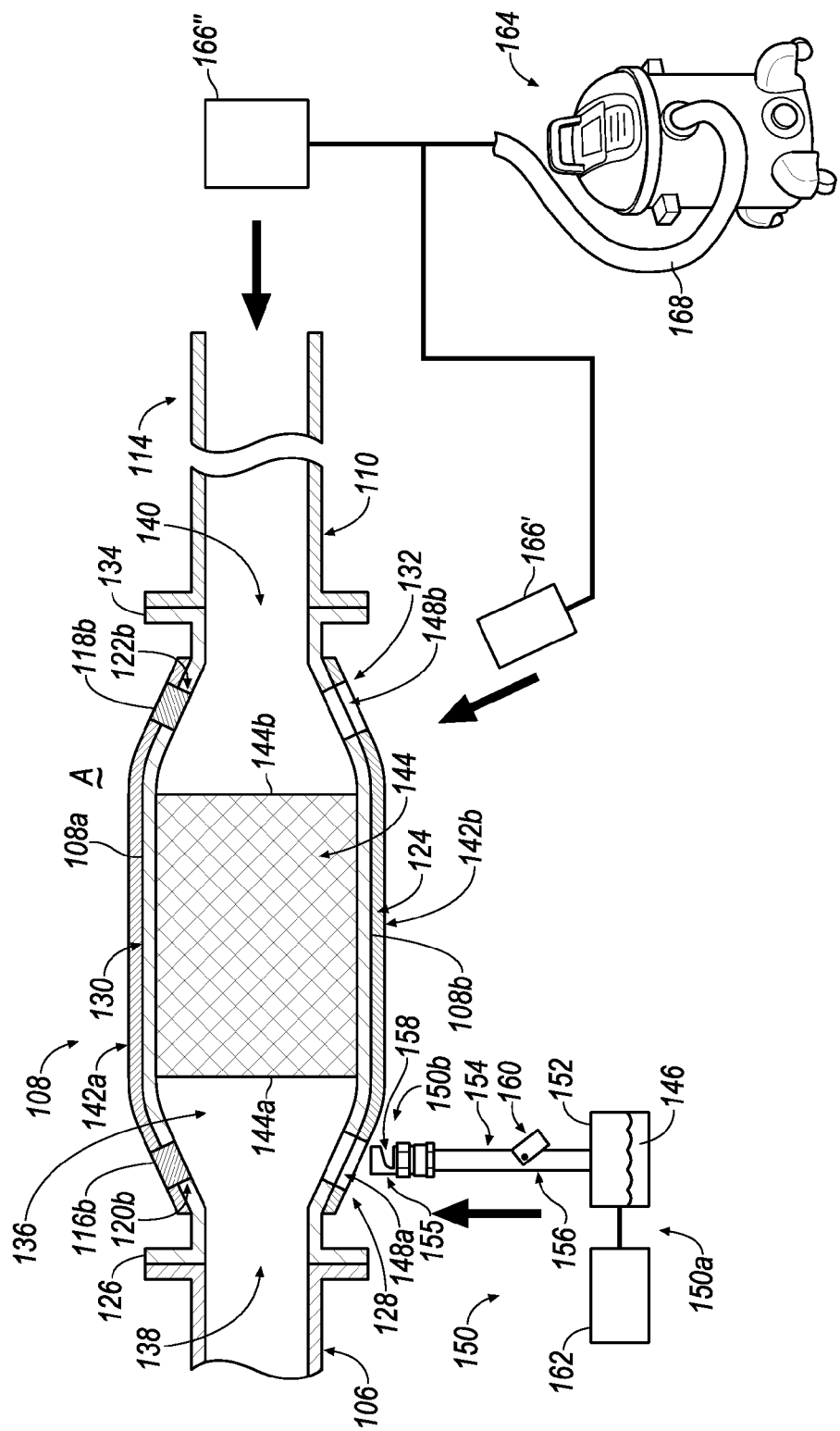
Figure 12D:
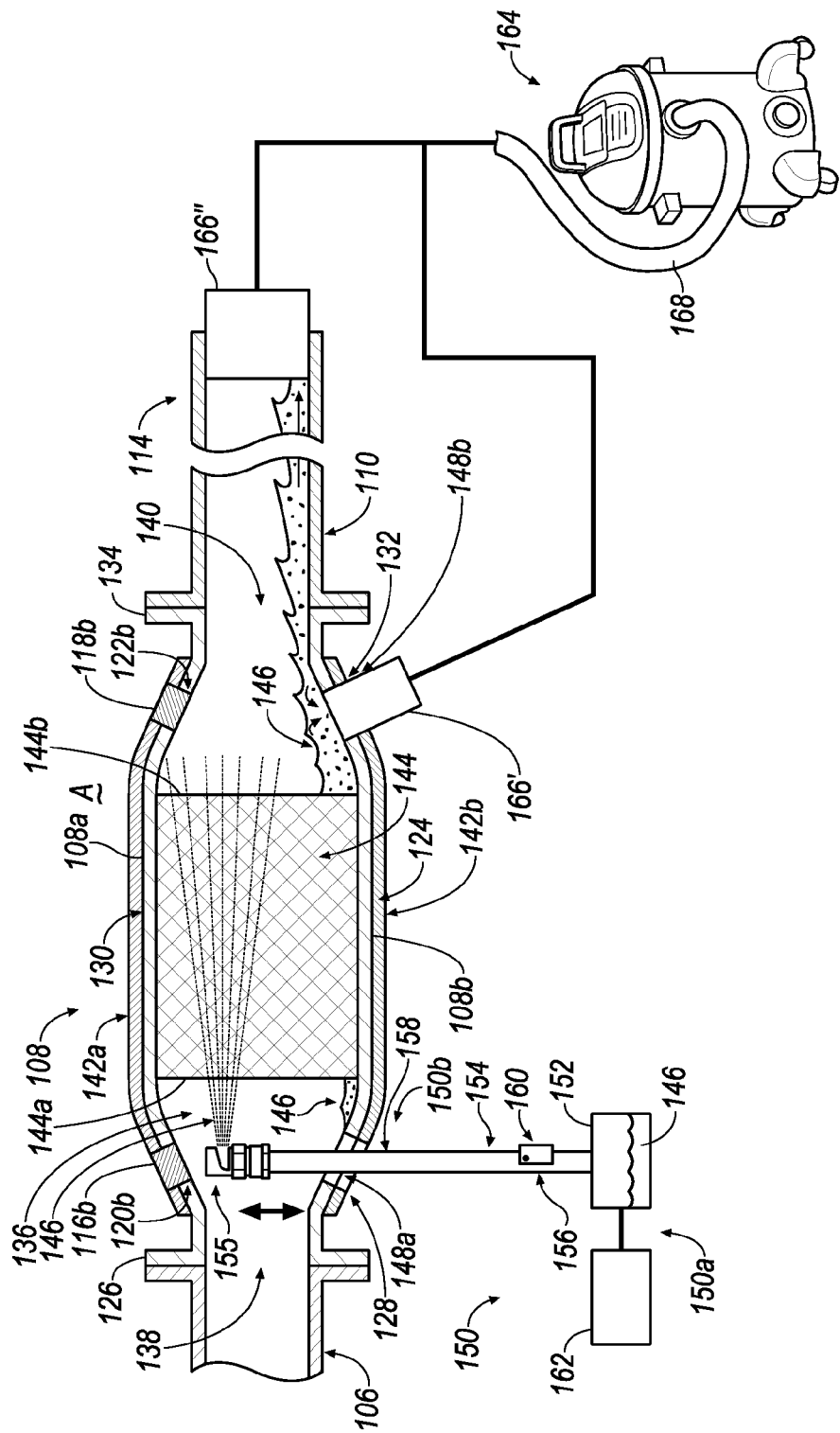

As seen in FIGS. 12C-12D, the servicing agent/owner, A/O, of the vehicle, V, may firstly insert the distal end 150b of dilute acidic solution dispensing system 150 into the first 'post-fabricated' opening 148a of the 'post-fabricated' at least two openings 148a, 148b for directing the dilute acidic solution 146 toward an upstream surface 144a of the honeycomb catalyst substrate 144. Then, as seen in FIGS. 12E-12F, the servicing agent/owner, A/O, of the vehicle, V, may secondly insert the distal end 150b of dilute acidic solution dispensing system 150 into the second 'post-fabricated' opening 148b of the 'post-fabricated' at least two openings 148a, 148b for directing the dilute acidic solution 146 toward a downstream surface 144b of the honeycomb catalyst substrate 144.

As seen in FIGS. 12C-12D, when the distal end 150b of dilute acidic solution dispensing system 150 is inserted into the first 'post-fabricated' opening 148a such that the dilute acidic solution 146 is directed directly toward the upstream surface 144a of the honeycomb catalyst substrate 144, the servicing agent/owner, A/O, of the vehicle, V, may also fluidly connect a vacuum source 164 to both of the second 'post-fabricated' opening 148b and the tailpipe 114 by a first heat-resistant connector 166' disposed in the second 'post-fabricated' opening 148b and a second heat-resistant connected 166" disposed in the tailpipe 114; both of the first and second heat-resistant connects 166', 166" may be fluidly-connected to a hose 168 extending from the vacuum source 164. The vacuum source 164 may be commercially sold under the trade-name, a SHOP-VAC®, and may include, for example, a stainless steel tank that receives the dilute acidic solution 146 that is pulled, by way of a vacuum applied by the vacuum source 164, directly from the second 'post-fabricated' opening 148b and along a portion of the exhaust system 100 defined by the catalytic converter 108, the third pipe portion 110, the muffler 112 and then the tailpipe 114 in order to catch the dilute acidic solution 146 that is directed through the honeycomb catalyst substrate 144 by firstly entering the upstream surface 144a of the honeycomb catalyst substrate 144 and secondly exiting the downstream surface 144b of the honeycomb catalyst substrate 144.

Figure 12E:
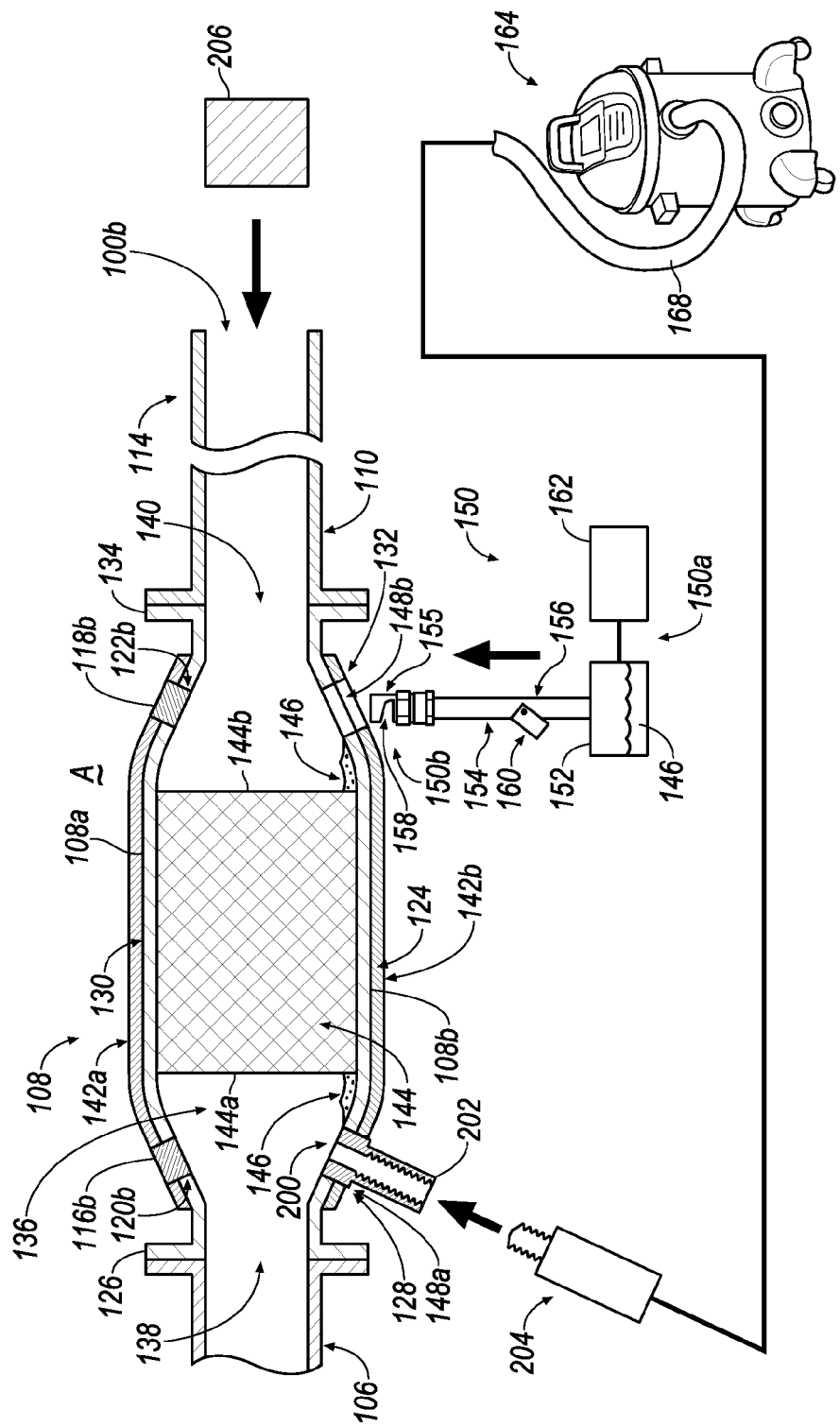

Referring now to FIG. 12E, prior to arranging the distal end 150b of dilute acidic solution dispensing system 150 is inserted into the second 'post-fabricated' opening 148b, an adapter 200 having a female-threaded fluid flow passage 202 is arranged in the first 'post-fabricated' opening 148a. A male threaded adapter 204 that is connected to the hose 168 extending from the vacuum source 164 may then be threadingly and fluidly-connected to the female-threaded fluid flow passage 202 of the adapter 200. Once the male threaded adapter 204 is connected to the female-threaded fluid flow passage 202 of the adapter 200, the vacuum source 164 is fluidly-connected to the fluid-flow passage 136 proximate the upstream surface 144a of the honeycomb catalyst substrate 144 of the catalytic converter 108. Additionally, a fluid-flow plug 206 may be arranged within the opening formed by the tailpipe 114 for fluidly-isolating the distal end 100b of the exhaust system from the surrounding atmosphere, A, in order to concentrate a vacuum imparted by the vacuum source 164 at the first 'post-fabricated' opening 148a.

Figure 12F:
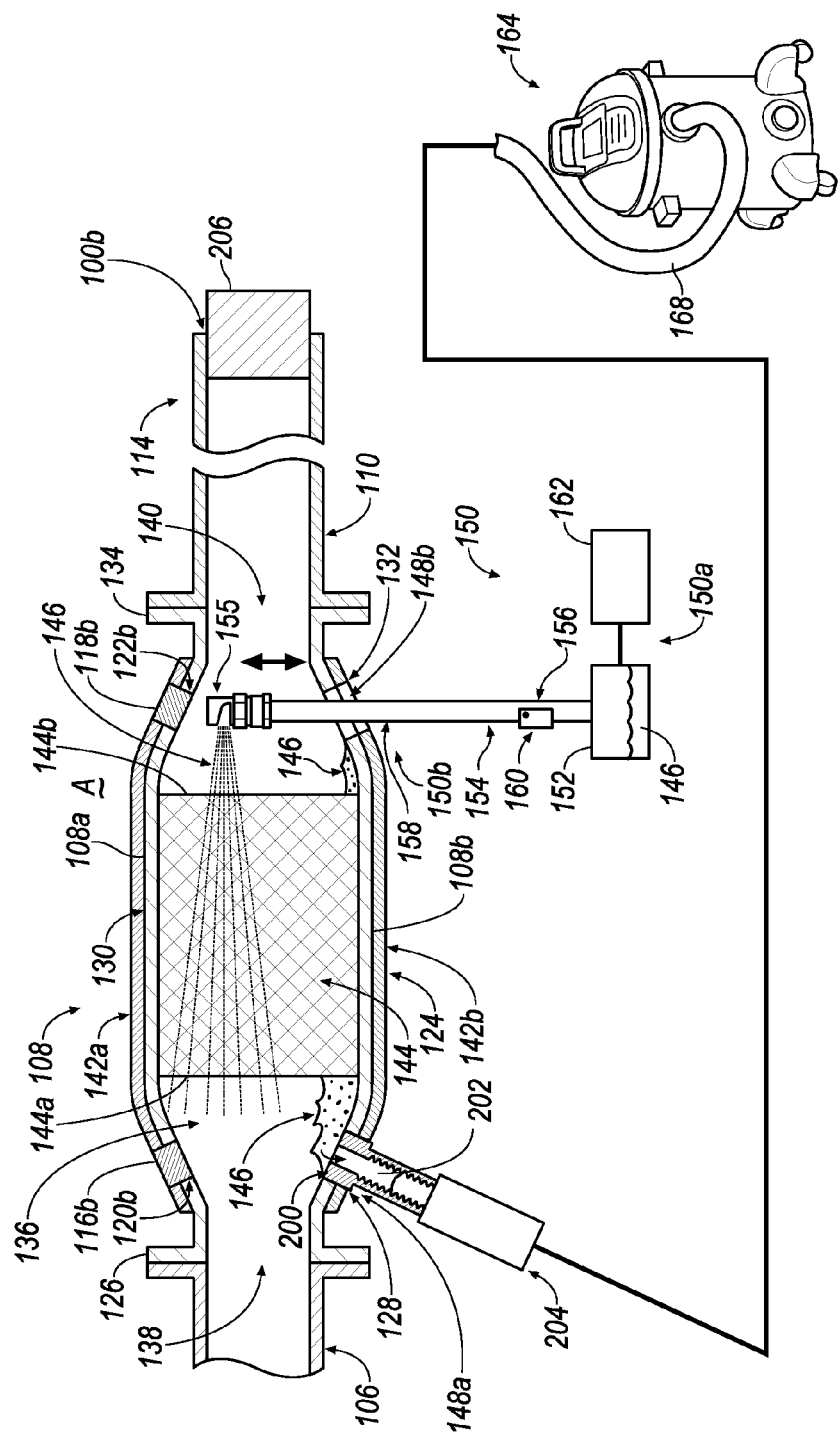
Figure 12G:
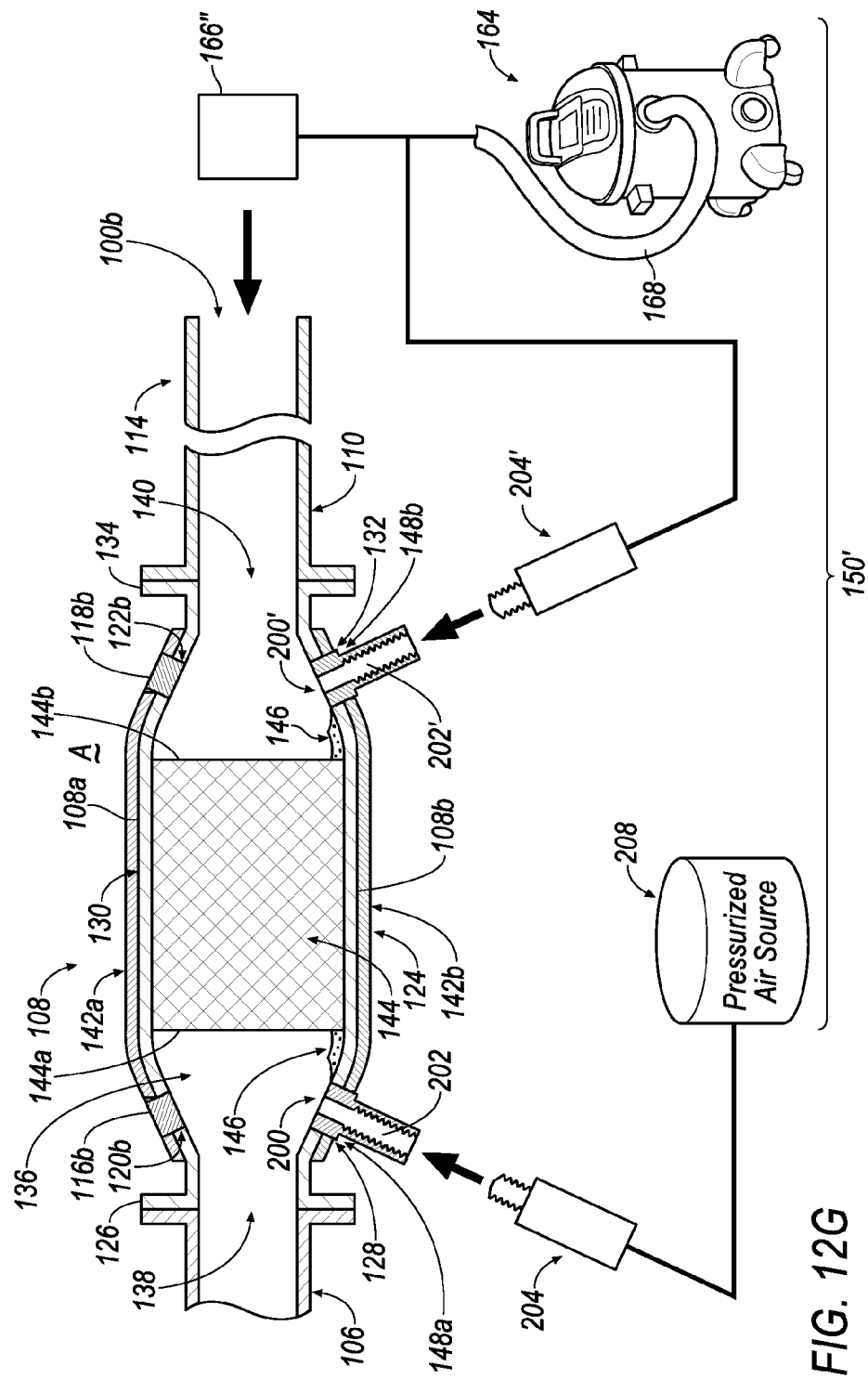
Figure 12H:
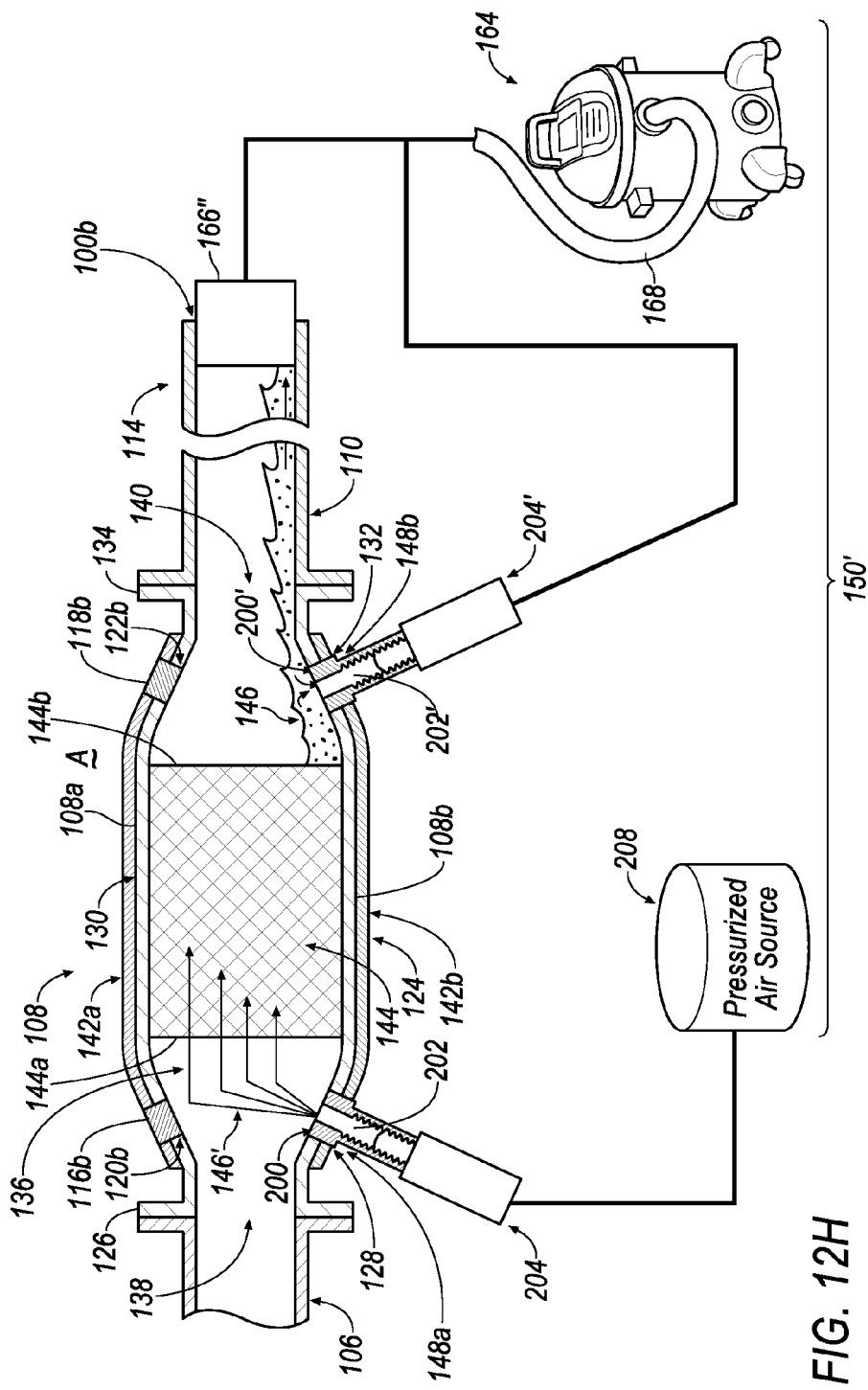

Then, as seen in FIGS. 12E-12F, when the distal end 150b of dilute acidic solution dispensing system 150 is inserted into the second 'post-fabricated' opening 148b such that the dilute acidic solution 146 is directed directly toward the downstream surface 144b of the honeycomb catalyst substrate 144, the servicing agent/owner, A/O, of the vehicle, V, may then actuate the vacuum source 164 that is fluidly-coupled to the fluid-flow passage 136 by way of the first 'post-fabricated' opening 148a in order to draw out the dilute acidic solution 146 that is directed through the honeycomb catalyst substrate 144 by firstly entering the downstream surface 144b of the honeycomb catalyst substrate 144 and secondly exiting the upstream surface 144a of the honeycomb catalyst substrate 144.

Because of fluid coupling of the vacuum source 164 to each of the first and second 'post-fabricated' openings 148a, 148b are formed in the lower surface 108b of the body 124 of the catalytic converter 108, the dilute acidic solution 146 (and contaminates removed from the honeycomb catalyst substrate 144) may be drawn from the body 124 of the catalytic converter 108 by way of a vacuum created by the vacuum source 164. Additionally, by preparing the 'post-fabricated' at least two openings 148a, 148b (as opposed to the 'pre-fabricated' at least one opening 148 described above), the honeycomb catalyst substrate 144 may be 'double washed' in two directions being a downstream direction (as seen in FIG. 12D) and an upstream direction (as seen in FIG. 12F).

The dispenser 154 that is formed by distal end 150b of the dilute acidic solution dispensing system 150 may be defined by a nozzle 155 of an elongated fluid-dispensing wand 156. The nozzle 155 may have an orifice size of approximately about 0.12" in order to dispense the dilute acidic solution 146 as a fine mist.

The nozzle 155 may include a right-angle spray deflector 158 for directing the dilute acidic solution 146 in a particular direction. The fluid-dispensing wand 156 may also include an actuating handle 160 that permits the servicing agent/owner, A/O, of the vehicle, V, to selectively dispense the dilute acidic solution 146 from the nozzle 155. When the vehicle, V, is arranged upon a lift, L (as seen in, e.g., FIG. 6), or, alternatively, when the vehicle, V, is arranged over a servicing pit, P (not shown), the servicing agent/owner, A/O, of the vehicle, V, may be located under the exhaust system 100, and, therefore, may easily insert the distal end 150b of the dilute acidic solution dispensing system 150 into the 'post-fabricated' at least one opening 148 that is formed in the lower surface 108b of the body 124 of the catalytic converter 108.

The proximal end 150a of the dilute acidic solution dispensing system 150 may include a positive pressure source 162 that is fluidly-connected to the source, reservoir or container 152 of the dilute acidic solution 146. The positive pressure source 162 may include, for example, a shop air source (e.g., an air line supplying regulated air pressure at 30-60 psi), or, alternatively, a manually-operated pump that pressurizes the source, reservoir or container 152 of the dilute acidic solution 146 in order to force the dilute acidic solution 146 through the fluid-dispensing wand 156 and out of the nozzle 155 as described above. In an embodiment, the actuating handle 160 may open or close a valve (not shown) disposed in the fluid-dispensing wand 156; when the valve is arranged in the open orientation, the positive pressure source 162 may force the dilute acidic solution 146 out of the nozzle 155 (as seen in, e.g., FIGS. 12D and 12F), and, conversely, when the valve is arranged in the closed orientation, the dilute acidic solution 146, which is pressurized by the positive pressure source 162, is not permitted to be expelled from the nozzle 155 (as seen in, e.g., FIGS. 12C and 12E).

The dilute acidic solution dispensing device 150 may commercially available from MCMASTER-CARR® and sold as Model 7044T42. The nozzle 155 may be commercially available from MCMASTER-CARR® and sold as Model 30995K15.

The cleaning method performed by the dilute acidic solution dispensing device 150 may be conducted for a predetermined period of time deemed effective for cleaning a particular type of catalytic converter 108, or, alternatively, a longer time period considered generally suitable for any catalytic converter 108. The cleaning operation performed by the dilute acidic solution dispensing device 150 may be verified using a gas analyzer, GA (see, e.g., FIG. 13). The gas analyzer, GA, may be, for example, a five-gas analyzer that is commercially available from Snap-On Tools and sold as model HHGA5BP. The gas analyzer, GA, may be fluidly-connected to the exhaust system 100 by, for example, by inserting a sample probe, P, of the gas analysis, GA, into the tailpipe 114 of the exhaust system 100 in order to detect an acceptable, predetermined exhaust gas level (e.g., a predetermined level of hydrocarbons (HC), carbon monoxide (CO), and/or oxides of nitrogen ($NO_X$)) when the engine, E, is keyed-on. Accordingly, the step of introducing the dilute acidic solution 146 into the catalytic converter 108 may be repeated until the gas analyzer, GA, detects a predetermined exhaust gas level.

In another embodiment, the gas analyzer, GA, may be utilized for determining if the first and second close-out members 175a, 175b seal the 'post-fabricated' first and second openings 148a, 148b that are formed in the lower surface 108b of the body 124 of the catalytic converter 108. Referring to FIG. 13, in an example, a heat-resistant flexible tube 250 formed by, for example, a silicone material may be fluidly-connected to the gas analyzer by a hose 252. The heat-resistant flexible tube 250 may be placed adjacent the lower surface 108b of the body 124 of the catalytic converter 108 and circumferentially about the first and second close-out members 175a, 175b for fluidly-isolating the 'post-fabricated' first and second openings 148a, 148b and the first and second close-out members 175a, 175b from the surrounding atmosphere. After keying-on the engine, E, if an exhaust leak occurs about one or more of the close-out members 175a, 175b, the heat-resistance flexible tube 250 may isolate the exhaust leak which may then be detected by the gas analyzer, GA.

Referring to FIGS. 12G-12J, a male threaded adapter 204 of a pressurized air source 208 (e.g., a pressurized, substantially oil-free air source) may be connected to the female-threaded fluid flow passage 202 of the adapter 200 arranged in the first 'post-fabricated' opening 148a, and, a male threaded adapter 204' connected to the hose 168 of the vacuum source 168 may be connected to a female-threaded fluid flow passage 202' of an adapter 200' arranged in the second 'post-fabricated' opening 148b; further, the second heat-resistant connected 166" may be re-disposed in the tailpipe 114 for fluidly-connecting the hose 168 extending from the vacuum source 164 to the tailpipe 114. The arrangement of the pressurized air source 208 and the vacuum source 168 as described above provides a flushing system 150' for flushing the dilute acidic solution 146 from the exhaust system 100.

In operation, the pressurized air source 208 is activated for jetting air into the fluid-flow passage 136 by way of the first 'post-fabricated' opening 148a such that the injected air pushes the dilute acidic solution 146 through the honeycomb catalyst substrate 144 from the upstream surface 144a of the honeycomb catalyst substrate 144 toward the downstream surface 144b of the honeycomb catalyst substrate 144. Simultaneously or after the actuation of the pressurized air source 208, the vacuum source 164 may be activated for further assisting the drawing of the dilute acidic solution 146 through the honeycomb catalyst substrate 144 from the upstream surface 144a of the honeycomb catalyst substrate 144 toward the downstream surface 144b of the honeycomb catalyst substrate 144. Because the vacuum source 164 is fluidly-connected to both of the second 'post-fabricated' opening 148b and the tailpipe 114, the vacuum source may remove the dilute acidic solution 146 from the exhaust system with a vacuum at both of the second 'post-fabricated' opening 148b and the tailpipe 114.

Figure 12I:
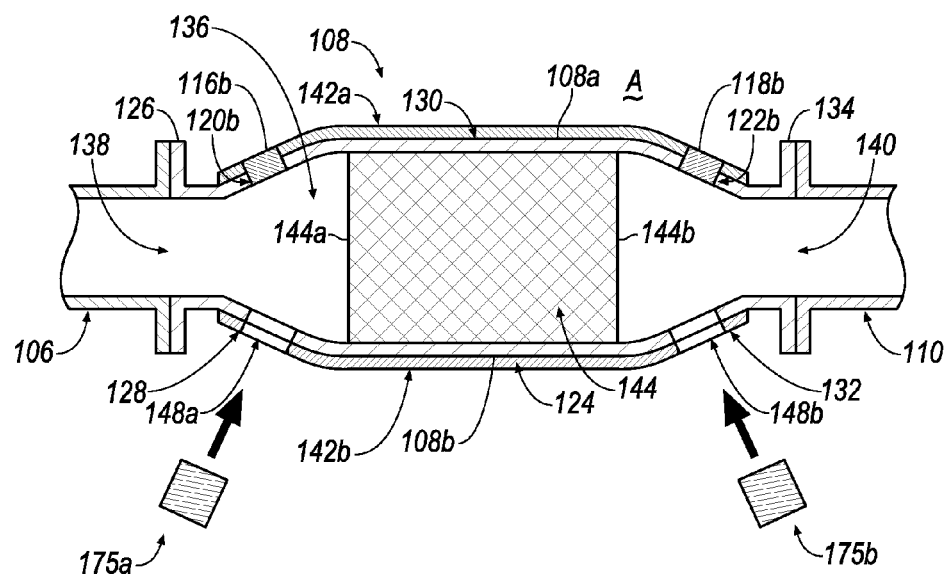
Figure 12J:
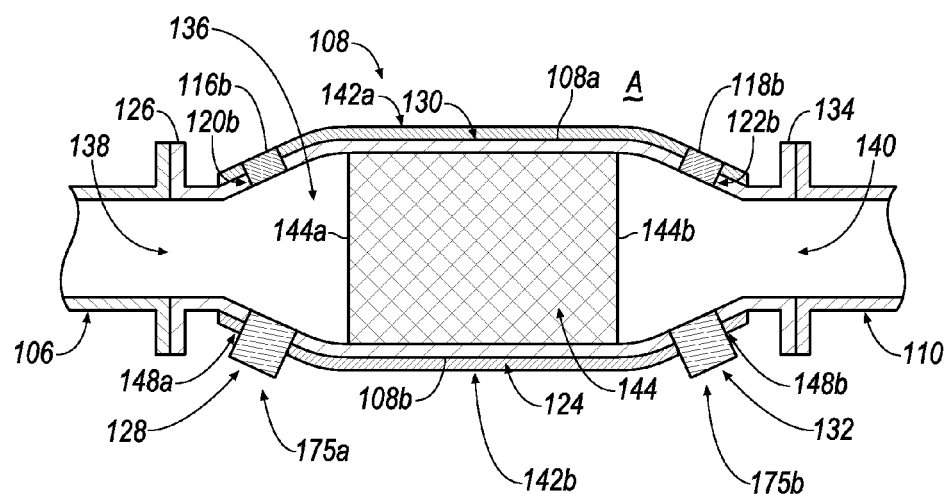

Referring to FIGS. 12I-12J, once the step of flushing the dilute acidic solution 146 and contaminates from the honeycomb catalyst substrate 144 is complete, the servicing agent/ owner, A/O, of the vehicle, V, may close-out the 'post-fabricated' at least two openings 148a, 148b of the body 124 of the catalytic converter 108 by disposing a first close-out member 175a of at least two close-out members 175a, 175b in the first 'post-fabricated' opening 148a and a second close-out member 175b of the at least two close-out members 175a, 175b in the second 'post-fabricated' opening 148b. Each of the first and second close-out members 175a, 175b may include a material that is resistant to, for example, road debris, salt, sand, rocks and the like while also being suitable for withstanding automotive heat cycles while sealing exhaust fumes (resulting from, for example, approximately 3 psi of internal exhaust pressure) contained within the fluid-flow passage 136. In an implementation each of the first and second close-out members 175a, 175b may be a 'swaging nut' that is commercially available from MCMASTER-CARR® and sold under the trade-name 'A-T Series Insert.' In another implementation, the first and second close-out members 175a, 175b may each be a knurled threaded insert commercially available from AVK Industrial Products and sold as model number ATC2-813; an installation tool sold as model number AAT916-813 commercially available from AVK Industrial Products may be utilized for swaging the knurled threaded inserts 175a, 175b into the 'post-fabricated' at least two openings 148a, 148b. In the event that the catalytic converter 108 has to be re-serviced at a later time in a substantially similar manner as described above, the first and second close-out member 175a, 175b may be selectively removed from the first and second 'post-fabricated' openings 148a, 148b in order to permit one or more of the dilute acidic solution dispensing system 150 and the dilute acidic solution flushing system 150' to remove contaminates from the honeycomb catalyst substrate 144 in a subsequent cleaning process.

During or after the step of applying the dilute acidic solution 146 upon the honeycomb catalyst substrate 144 with the dilute acidic solution dispensing system 150, or, alternatively, before, during or after the step of flushing the dilute acidic solution 146 from the honeycomb catalyst substrate 144 with the dilute acidic solution flushing system 150', the dilute acidic solution 146 may be removed from the exhaust system 100 in a fluid removal step. Referring to FIG. 9, in an embodiment, the fluid removal step may be conducted by a vacuum source 164. If desired, the fluid removal step conducted by the vacuum source 164 may be alternatively conducted after the first or second 'post-fabricated' openings 148a, 148b of the body 124 of the catalytic converter 108 are closed-out by the first and second close-out members 175a, 175b; by closing-out the first or second 'post-fabricated' openings 148a, 148b with the first and second close-out members 175a, 175b, a vacuum imparted to the exhaust system 100 by the vacuum source 164 will be greater due to the fact that ambient air, from the surrounding atmosphere, A, will not be pulled into the first or second 'post-fabricated' openings 148a, 148b due to the fact that the first and second close-out members 175a, 175b seal the body 124 of the catalytic converter 108 from the surrounding atmosphere, A.

The vacuum source 164 may be attached to the tailpipe 114 of the exhaust system 100 such that the vacuum source 164 may be fluidly-connected to the distal, downstream end 100b of the exhaust system 100. In an embodiment, the vacuum source 164 may be attached to the tailpipe 114 by a heat-resistant connector 166 and a hose 168. The vacuum source 164 may be commercially sold under the trade-name, a SHOP-VAC®, and may include, for example, a stainless steel tank that receives the dilute acidic solution 146 that is pulled, by way of a vacuum applied by the vacuum source 164, from the catalytic converter 108, the third pipe portion 110, the muffler 112 and then the tailpipe 114.

The heat-resistant tailpipe connector 166 may be formed by a silicone material in the form of a cylindrical or oval sleeves that frictionally-attaches to the tailpipe 114. In some instances, if a vehicle, V, has been driven for a period of time prior to being arranged upon a lift, L (as seen in, e.g., FIG. 6), or, alternatively, over a servicing pit, P (not shown), the catalytic converter 108 may be heated to a temperature that would delay the contaminate removal process associated with the application of the dilute acidic solution 146 upon the honeycomb catalyst substrate 144; additionally, the tailpipe 114 may be heated in a substantially similar manner. Accordingly, the heat-resistant tailpipe connector 166 is formed from a material that will thermally insulate the hose 168 from the tailpipe 114 if the tailpipe 114 is heated. The cross-section of the heat-resistant tailpipe connector 166 may be any desirable shape that corresponds to the geometry of the tailpipe 114; accordingly, in some circumstances, the heat-resistant tailpipe connector 166 may be sized to a fixed dimension that corresponds to a specific tailpipe 114 of a specific vehicle, V, or, alternatively, the heat-resistant tailpipe connector 166 may be adjustable in order to 'universally' correspond to tailpipes 114 of different sizes.

The hose 168 may fluidly-connect the heat-resistant tailpipe connector 166 to the vacuum source 164. The hose 168 may be formed from a rubber or plastic material and include, for example, a corrugated body. In some implementations, the hose 168 may be transparent in order for the servicing agent/owner, A/O, of the vehicle, V, to inspect the amount of dilute acidic solution 146 being drawn from the exhaust system 100 and into the stainless steel tank of the vacuum source 164.

Referring to FIG. 10, a fluid removal step may be performed after the first and second 'post-fabricated' openings 148a, 148b of the body 124 of the catalytic converter 108 are closed-out by the first and second close-out members 175a, 175b in order to remove the dilute acidic solution 146 from the exhaust system 100. In some implementations, the fluid removal step of FIG. 10 may be performed after the fluid removal step is performed by the vacuum source 164 as described above. The purpose of utilizing the fluid removal step of FIG. 10 after performing the fluid removal step of FIG. 9 is to flush out a remainder of the dilute acidic solution 146 that is contained by the catalytic converter as seen in, for example, FIG. 12H.

The fluid removal step of FIG. 10 may be performed by keying-on the engine, E. In an example, the exhaust gas produced by the engine, E, may 'push' the dilute acidic solution 146 downstream through the exhaust system 100 such that the dilute acidic solution 146 is expelled through the catalytic converter 108, the third pipe portion 110, the muffler 112 and out of the tailpipe 114. Although some implementations may utilize the engine, E, for removing the dilute acidic solution 146 from the exhaust system 100 after the vacuum source 164 has removed the dilute acidic solution 146, some implementations for removing the dilute acidic solution 146 from the exhaust system 100 may be conducted by utilizing the engine, E, alone without using the vacuum source 164. In some implementations, the engine, E, may be ran above idle speed in order to discharge exhaust gas with an adequate amount of force for removing the dilute acidic solution 146 from the exhaust system 100.

When the engine, E, is utilized for discharging the dilute acidic solution 146 from the exhaust system 100, the servicing agent/owner, A/O, of the vehicle, V, may fluidly-connect a discharge bucket 170 (which may be the same discharge bucket, B, described above in FIGS. 11D, 11F, 11H and 11J) to the tailpipe 114. In an implementation, the discharge bucket 170 may be attached to the tailpipe 114 by, for example, one or more of a tailpipe connector 172, a hose portion 174 and an elbow portion 176. In some implementations, the discharge bucket 170 may include a cover 178 having a first opening 180 that is fluidly-connected to one or more of the tailpipe connector 172, the hose portion 174 and the elbow portion 176. The cover 178 may also include a second opening 182 that permits the discharge bucket 170 to be vented to atmosphere, A. In some implementations, the discharge bucket 170 may also include one or more clamps 184 for removably-securing the cover 178 to the body 186 of the discharge bucket 170. In some instances, the body 186 of the discharge bucket 170 may be formed from a relatively heavy material in order to maintain the discharge bucket 170 in an upright orientation. In other instances, a weight 188 may be arranged within the body 186 of the discharge bucket 170 for maintain the discharge bucket 170 in an upright orientation.

Irrespective of the method for removing the dilute acidic solution 146 from the exhaust system 100 (i.e., by way of the vacuum source 164 as seen in FIG. 9 or by keying-on the engine, E, as seen in FIG. 10), the dilute acidic solution 146 is neutralized prior to disposal. In an implementation, the dilute acidic solution 146 may be neutralized by mixing the dilute acidic solution 146 with a neutralizing medium, NM (see, e.g., FIG. 14) that is disposed within a first container, C1 (see, e.g., FIG. 14). The neutralizing medium, NM, may include, for example, baking soda, soda ash (e.g., CAS No. 497-19-8), alkaline powder or the like.

A predetermined amount of oxalic acid in powder form, AP (see, e.g., FIG. 14), for making the dilute acidic solution 146 that is utilized for cleaning the catalytic converter 108 as described above may be supplied in a second container, C2 (see, e.g., FIG. 14). The oxalic acid in powder form, AP, may be mixed with approximately about two-to-four gallons of water in the source, reservoir or container 152 of the dilute acidic solution dispensing system 150 in order to prepare dilute acidic solution 146. The two-to-four gallons of water may be distilled or purified by using, for example, a reverse osmosis filter. The amount (e.g., two-to-four gallons) of water may be dependent upon the number of catalytic converters 108 to be cleaned by the servicing agent/owner, A/O, of the vehicle, V (i.e., some vehicles, V, may have one or two catalytic converters 108). In an implementation, two gallons of water may be sufficient for cleaning one catalytic converter 108. The amount (by weight) of the oxalic acid in powder form, AP, to be mixed with the water may be equal to approximately about five-one-hundredths (0.05) of the weight of the amount of water.

Referring to FIG. 14, the first container, C1, including the neutralizing medium, NM, and the second container, C2, including the predetermined amount of oxalic acid in powder form, AP, may be included in a kit, K. The kit, K, may be bundled (i.e., enclosed together) in an enclosure, EN (e.g., a box, shrink-wrap film bag or the like).

Although an exemplary kit, K, is described above, the kit, K, is not limited to including the first container, C1, including the neutralizing medium, NM, and the second container, C2, including the predetermined amount of oxalic acid in powder form, AP. For example, the kit, K, may include any of the components described above that are interfaced with the exhaust system 100. In one example, the kit, K, may include one or more of: one or a plurality of close-out member(s) 175, 175a, 175b, the heat-resistant connector 166, the discharge bucket 170, the tailpipe connector 172, the hose portion 174 and the elbow portion 176, the cover 178, the weight 188, first heat-resistant connector 166', second heat-resistant connector 166", adapter 200, adapter 200', male threaded adapter 204, male threaded adapter 204', fluid-flow plug 206 or the like. In some implementations, the kit, K, could also include the drill, D, the dilute acidic solution dispensing system 150, the dilute acidic solution flushing system 150' and the vacuum source 164.

As a result of post-fabricating' the 'post-fabricated' at least one opening 148 in the body 124 of the catalytic converter 108, the catalytic converter 108 may be serviced without removing and disconnecting the catalytic converter 108 from the exhaust system 100 such that the catalytic converter 108 is permitted to be cleaned while remaining installed on the vehicle, V. Further, by post-fabricating the 'post-fabricated' at least two openings 148a, 148b in the lower surface 108b of the body 124 of the catalytic converter 108, accessibility to the fluid-flow passage 136 extending through the body 124 of the catalytic converter 108 is improved when, for example, a servicing agent/owner, A/O, of the vehicle, V, is located under the vehicle, V, when the vehicle, V, is arranged upon a lift, L (as seen in, e.g., FIG. 6), or, alternatively, when the vehicle, V, is arranged over a servicing pit, P (not shown).

Further, although the at least two openings 148a, 148b formed in the lower surface 108b of the catalytic converter 108 are described as being 'post-fabricated,' the 'post-fabricated' at least two openings 148a, 148b is not limited to being formed in such a fashion. For example, the at least two openings 148a, 148b formed in the lower surface 108b of the catalytic converter 108 may be formed by the manufacturer of the catalytic converter 108, or, alternatively, the at least two openings 148a, 148b formed in the lower surface 108b of the catalytic converter 108 may be formed by the OEM before the vehicle, V, has been released by the OEM. Accordingly, in such an implementation, the at least two openings 148a, 148b formed in the lower surface 108b of the catalytic converter 108 may be referred to as 'pre-fabricated' at least two openings 148a, 148b (i.e., the at least two openings are not formed in an 'after-market' environment by, for example, a servicing agent or owner, A/O (see, e.g., FIG. 6), of the vehicle, V); in an implementation, the at least one opening 148 formed in the lower surface 108b of the catalytic converter 108 may be pre-fabricated in any desirable manner such as, for example: drilling, welding, casting, molding, stamping or the like. In the event that the at least two openings 148a, 148b are 'pre-fabricated' as described above, the manufacturer of the catalytic converter 108 or the OEM may pre-dispose the at least two close-out members 175a, 175b in the 'pre-fabricated' at least two openings 148a, 148b. Therefore, the step of removing material from the lower surface 108b of the body 124 of the catalytic converter 108 by utilizing, for example, a drill, D, for forming the at least two openings 148a, 148b in an after-market modification step by a servicing agent or owner, A/O (see, e.g., FIG. 6), of the vehicle, V, may be omitted. In the implementation either of 'pre-fabricating' the at least two openings 148a, 148b as described above, the 'pre-fabricated' at least two openings 148a, 148b are not the ports 120b, 122b that supportably-receives the first, upstream oxygen sensor 116b and the second, downstream oxygen sensor 118b, and, further, either of the at least two close-out members 175a, 175b are not the first, upstream oxygen sensor 116b and the second, downstream oxygen sensor 118b.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method, comprising the steps of:
    servicing a catalytic converter while the catalytic converter remains connected to an exhaust system by:
        forming at least one opening in a lower surface of a body of the catalytic converter for permitting access to a fluid-flow passage that extends through the body of the catalytic converter that contains a catalyst substrate;
        inserting a cleaning instrument into the at least one opening formed in the lower surface of the body of the catalytic converter;
        directing a cleaning solution from the cleaning instrument toward the catalyst substrate such that the cleaning solution removes contaminates from the catalyst substrate; and
        disposing at least one close-out member in the at least one opening formed in the lower surface of the body of the catalytic converter for:
            fluidly-sealing the at least one opening,
    wherein the at least one opening formed in the lower surface of the body of the catalytic converter is not a port that supportably-receives an oxygen sensor.

2. The method according to claim 1, wherein, after the directing step and prior to the disposing step, further comprising the steps of:
    removing the cleaning instrument from the at least one opening formed in the lower surface of the body of the catalytic converter;
    inserting a flushing instrument into the at least one opening formed in the lower surface of the body of the catalytic converter; and
        directing a flushing medium from the flushing instrument toward the catalyst substrate such that the flushing medium removes the cleaning solution and the contaminates from the catalyst substrate.

3. The method according to claim 1, wherein, after the directing step, further comprising the step of:
    fluidly-connecting a vacuum source to exhaust system; and
        utilizing the vacuum source for drawing the cleaning solution and the contaminates from the catalyst substrate.

4. The method according to claim 1, wherein, after the directing step, further comprising the step of:
    fluidly-connecting a discharge bucket to a distal end of the exhaust system;
        keying-on an engine of the vehicle for utilizing an exhaust gas produced by the engine for advancing the cleaning solution and the contaminates away from the catalyst substrate and further downstream through the exhaust system; and
        utilizing the discharge bucket for capturing the cleaning solution and the contaminates that are discharged from the exhaust system.

5. The method according to claim 1, wherein the forming step, the inserting step and directing step includes:
    forming the at least one opening in the lower surface of the body of the catalytic converter upstream of a catalyst substrate;
    inserting the cleaning instrument into the at least one opening formed in the lower surface of the body of the catalytic converter; and
    directing the cleaning solution from the cleaning instrument toward the catalyst substrate such that the cleaning solution firstly enters an upstream surface of the catalyst substrate and secondly exits a downstream surface of the catalyst substrate.

6. The method according to claim 1, wherein the at least one opening includes a first opening and a second opening, wherein the forming step includes:
    forming the first opening in the lower surface of the body of the catalytic converter upstream of a catalyst substrate; and
    forming the second opening in the lower surface of the body of the catalytic converter downstream of a catalyst substrate.

7. The method according to claim 1, wherein the forming step includes:
    drilling the at least one opening in the lower surface of the body of the catalytic converter.

8. The method according to claim 6, wherein the inserting step and the directing step includes:
    inserting the cleaning instrument into the first opening formed in the lower surface of the body of the catalytic converter; and
    directing the cleaning solution from the cleaning instrument toward the catalyst substrate such that the cleaning solution firstly enters an upstream surface of the catalyst substrate and secondly exits a downstream surface of the catalyst substrate.

9. The method according to claim 6, wherein the inserting step and the directing step includes:
    inserting the cleaning instrument into the second opening formed in the lower surface of the body of the catalytic converter; and
    directing the cleaning solution from the cleaning instrument toward the catalyst substrate such that the cleaning solution firstly enters a downstream surface of the catalyst substrate and secondly exits an upstream surface of the catalyst substrate.

10. The method according to claim 6, further comprising the steps of:
    inserting the cleaning instrument into the first opening formed in the lower surface of the body of the catalytic converter; and
    applying a vacuum to both of the second opening and an opening formed by a tailpipe of the exhaust system for removing the cleaning solution that firstly enters an upstream surface of the catalyst substrate and secondly exits a downstream surface of the catalyst substrate.

11. The method according to claim 10, further comprising the steps of:

inserting the cleaning instrument into the second opening formed in the lower surface of the body of the catalytic converter;

inserting a fluid-flow plug into the opening formed by the tailpipe; and applying a vacuum to the first opening for removing the cleaning solution that firstly enters the downstream surface of the catalyst substrate and secondly exits the upstream surface of the catalyst substrate.

12. The method according to claim 11, further comprising the steps of:

imparting pressurized air into the first opening formed in the lower surface of the body of the catalytic converter; and applying a vacuum to both of the second opening and the opening formed by the tailpipe of the exhaust system for removing the cleaning solution from the catalyst substrate and fluid-flow passage.

13. A method, comprising the steps of:

servicing a catalytic converter while the catalytic converter remains connected to an exhaust system by:

forming at least one opening in a lower surface of a body of the catalytic converter for permitting access to a fluid-flow passage that extends through the body of the catalytic converter that contains a catalyst substrate;

inserting a cleaning instrument into the at least one opening formed in the lower surface of the body of the catalytic converter;

directing a cleaning solution from the cleaning instrument toward the catalyst substrate such that the cleaning solution removes contaminates from the catalyst substrate; and disposing at least one close-out member in the at least one opening formed in the lower surface of the body of the catalytic converter for:

fluidly-sealing the at least one opening, wherein the at least one opening includes a first opening and a second opening, wherein the forming step includes:

forming the first opening in the lower surface of the body of the catalytic converter upstream of a catalyst substrate; and forming the second opening in the lower surface of the body of the catalytic converter downstream of a catalyst substrate, wherein the inserting step and the directing step includes:

inserting the cleaning instrument into the second opening formed in the lower surface of the body of the catalytic converter; and directing the cleaning solution from the cleaning instrument toward the catalyst substrate such that the cleaning solution firstly enters a downstream surface of the catalyst substrate and secondly exits an upstream surface of the catalyst substrate.

14. The method according to claim 13, wherein, after the directing step and prior to the disposing step, further comprising the steps of:

removing the cleaning instrument from the at least one opening formed in the lower surface of the body of the catalytic converter;

inserting a flushing instrument into the at least one opening formed in the lower surface of the body of the catalytic converter; and directing a flushing medium from the flushing instrument toward the catalyst substrate such that the flushing medium removes the cleaning solution and the contaminates from the catalyst substrate.

15. The method according to claim 13, wherein, after the directing step, further comprising the step of:

fluidly-connecting a vacuum source to exhaust system; and utilizing the vacuum source for drawing the cleaning solution and the contaminates from the catalyst substrate.

16. The method according to claim 13, wherein, after the directing step, further comprising the step of:

fluidly-connecting a discharge bucket to a distal end of the exhaust system;

keying-on an engine of the vehicle for utilizing an exhaust gas produced by the engine for advancing the cleaning solution and the contaminates away from the catalyst substrate and further downstream through the exhaust system; and utilizing the discharge bucket for capturing the cleaning solution and the contaminates that are discharged from the exhaust system.

17. The method according to claim 13, wherein the forming step, the inserting step and directing step includes:

forming the at least one opening in the lower surface of the body of the catalytic converter upstream of a catalyst substrate;

inserting the cleaning instrument into the at least one opening formed in the lower surface of the body of the catalytic converter; and directing the cleaning solution from the cleaning instrument toward the catalyst substrate such that the cleaning solution firstly enters an upstream surface of the catalyst substrate and secondly exits a downstream surface of the catalyst substrate.

18. The method according to claim 13, wherein the inserting step and the directing step includes:

inserting the cleaning instrument into the first opening formed in the lower surface of the body of the catalytic converter; and directing the cleaning solution from the cleaning instrument toward the catalyst substrate such that the cleaning solution firstly enters an upstream surface of the catalyst substrate and secondly exits a downstream surface of the catalyst substrate.

19. The method according to claim 13, further comprising the step of:

arranging a discharge bucket under the first opening formed in the lower surface of the body of the catalytic converter in order to capture the cleaning solution and the contaminates that exit the upstream surface of the catalyst substrate.

20. The method according to claim 13, wherein the forming step includes:

drilling the at least one opening in the lower surface of the body of the catalytic converter.

21. The method according to claim 13, further comprising the steps of:

inserting the cleaning instrument into the first opening formed in the lower surface of the body of the catalytic converter; and applying a vacuum to both of the second opening and an opening formed by a tailpipe of the exhaust system for removing the cleaning solution that firstly enters an upstream surface of the catalyst substrate and secondly exits a downstream surface of the catalyst substrate.

22. The method according to claim 13, wherein the at least one opening formed in the lower surface of the body of the catalytic converter is not a port that supportably-receives an oxygen sensor.

23. The method according to claim 21, further comprising the steps of:
inserting the cleaning instrument into the second opening formed in the lower surface of the body of the catalytic converter;
inserting a fluid-flow plug into the opening formed by the tailpipe; and
applying a vacuum to the first opening for removing the cleaning solution that firstly enters the downstream surface of the catalyst substrate and secondly exits the upstream surface of the catalyst substrate.

24. The method according to claim 23, further comprising the steps of:
imparting pressurized air into the first opening formed in the lower surface of the body of the catalytic converter; and
applying a vacuum to both of the second opening and the opening formed by the tailpipe of the exhaust system for removing the cleaning solution from the catalyst substrate and fluid-flow passage.

25. A method, comprising the steps of:
servicing a catalytic converter while the catalytic converter remains connected to an exhaust system by:
forming at least one opening in a lower surface of a body of the catalytic converter for permitting access to a fluid-flow passage that extends through the body of the catalytic converter that contains a catalyst substrate;
inserting a cleaning instrument into the at least one opening formed in the lower surface of the body of the catalytic converter;
directing a cleaning solution from the cleaning instrument toward the catalyst substrate such that the cleaning solution removes contaminates from the catalyst substrate; and
disposing at least one close-out member in the at least one opening formed in the lower surface of the body of the catalytic converter for:
fluidly-sealing the at least one opening,
wherein the at least one opening includes a first opening and a second opening, wherein the forming step includes:
forming the first opening in the lower surface of the body of the catalytic converter upstream of a catalyst substrate; and
forming the second opening in the lower surface of the body of the catalytic converter downstream of a catalyst substrate,
further comprising the steps of:
inserting the cleaning instrument into the first opening formed in the lower surface of the body of the catalytic converter; and
applying a vacuum to both of the second opening and an opening formed by a tailpipe of the exhaust system for removing the cleaning solution that firstly enters an upstream surface of the catalyst substrate and secondly exits a downstream surface of the catalyst substrate.

26. The method according to claim 25, wherein, after the directing step and prior to the disposing step, further comprising the steps of:
removing the cleaning instrument from the at least one opening formed in the lower surface of the body of the catalytic converter;
inserting a flushing instrument into the at least one opening formed in the lower surface of the body of the catalytic converter; and
directing a flushing medium from the flushing instrument toward the catalyst substrate such that the flushing medium removes the cleaning solution and the contaminates from the catalyst substrate.

27. The method according to claim 25, wherein, after the directing step, further comprising the step of:
fluidly-connecting a vacuum source to exhaust system; and
utilizing the vacuum source for drawing the cleaning solution and the contaminates from the catalyst substrate.

28. The method according to claim 25, wherein, after the directing step, further comprising the step of:
fluidly-connecting a discharge bucket to a distal end of the exhaust system;
keying-on an engine of the vehicle for utilizing an exhaust gas produced by the engine for advancing the cleaning solution and the contaminates away from the catalyst substrate and further downstream through the exhaust system; and
utilizing the discharge bucket for capturing the cleaning solution and the contaminates that are discharged from the exhaust system.

29. The method according to claim 25, wherein the forming step, the inserting step and directing step includes:
forming the at least one opening in the lower surface of the body of the catalytic converter upstream of a catalyst substrate;
inserting the cleaning instrument into the at least one opening formed in the lower surface of the body of the catalytic converter; and
directing the cleaning solution from the cleaning instrument toward the catalyst substrate such that the cleaning solution firstly enters an upstream surface of the catalyst substrate and secondly exits a downstream surface of the catalyst substrate.

30. The method according to claim 25, wherein the inserting step and the directing step includes:
inserting the cleaning instrument into the first opening formed in the lower surface of the body of the catalytic converter; and
directing the cleaning solution from the cleaning instrument toward the catalyst substrate such that the cleaning solution firstly enters an upstream surface of the catalyst substrate and secondly exits a downstream surface of the catalyst substrate.

31. The method according to claim 25, wherein the inserting step and the directing step includes:
inserting the cleaning instrument into the second opening formed in the lower surface of the body of the catalytic converter; and
directing the cleaning solution from the cleaning instrument toward the catalyst substrate such that the cleaning solution firstly enters a downstream surface of the catalyst substrate and secondly exits an upstream surface of the catalyst substrate.

32. The method according to claim 25, wherein the forming step includes:
drilling the at least one opening in the lower surface of the body of the catalytic converter.

33. The method according to claim 25, further comprising the steps of:

inserting the cleaning instrument into the second opening formed in the lower surface of the body of the catalytic converter;

inserting a fluid-flow plug into the opening formed by the tailpipe; and applying a vacuum to the first opening for removing the cleaning solution that firstly enters the downstream surface of the catalyst substrate and secondly exits the upstream surface of the catalyst substrate.

34. The method according to claim 25, wherein the at least one opening formed in the lower surface of the body of the catalytic converter is not a port that supportably-receives an oxygen sensor.

35. The method according to claim 33, further comprising the steps of:

imparting pressurized air into the first opening formed in the lower surface of the body of the catalytic converter; and applying a vacuum to both of the second opening and the opening formed by the tailpipe of the exhaust system for removing the cleaning solution from the catalyst substrate and fluid-flow passage.

* * * * *

UNITED STATES PATENT AND TRADEMARK OFFICE
CERTIFICATE OF CORRECTION

PATENT NO. : 8,888,921 B2  
APPLICATION NO. : 13/957961  
DATED : November 18, 2014  
INVENTOR(S) : Paul Richard SerVaas et al.

Page 1 of 1

It is certified that error appears in the above-identified patent and that said Letters Patent is hereby corrected as shown below:

Title page, Item (63)

Related U.S. Application Data

Please delete the following paragraph "Continuation-in-part of application No. PCT/US2013/052321, filed on Jul. 26, 2013, which is a continuation of application No. 13/560,667, filed on Jul. 27, 2012." and insert --*Continuation of application No. PCT/US2013/052321, filed on Jul. 26, 2013, which is a continuation-in-part of application No. 13/560,667, filed on Jul. 27, 2012*--.

Signed and Sealed this  
Eleventh Day of August, 2015

Michelle K. Lee  
*Director of the United States Patent and Trademark Office*